United States Patent
Dolan et al.

(10) Patent No.: US 7,555,110 B2
(45) Date of Patent: *Jun. 30, 2009

(54) METHODS AND APPARATUS FOR PROVIDING EXPANDED TELECOMMUNICATIONS SERVICE

(75) Inventors: Robert A. Dolan, Santa Barbara, CA (US); David F. Hofstatter, Santa Barbara, CA (US); Robert Smith, Santa Barbara, CA (US); David S. Trandal, Santa Barbara, CA (US)

(73) Assignee: Callwave, Inc., Santa Barbara, CA (US)

( * ) Notice: Subject to any disclaimer, the term of this patent is extended or adjusted under 35 U.S.C. 154(b) by 311 days.

This patent is subject to a terminal disclaimer.

(21) Appl. No.: 11/294,682

(22) Filed: Dec. 5, 2005

(65) Prior Publication Data

US 2006/0227957 A1 Oct. 12, 2006

Related U.S. Application Data

(63) Continuation-in-part of application No. 11/062,182, filed on Feb. 18, 2005, which is a continuation of application No. 10/255,567, filed on Sep. 26, 2002, now Pat. No. 6,898,275, which is a continuation of application No. 09/539,375, filed on Mar. 31, 2000, now Pat. No. 6,477,246, application No. 11/294,682, which is a continuation-in-part of application No. 10/439,601, filed on May 16, 2003, now Pat. No. 7,103,167.

(60) Provisional application No. 60/127,434, filed on Apr. 1, 1999, provisional application No. 60/382,257, filed on May 20, 2002, provisional application No. 60/633,594, filed on Dec. 6, 2004, provisional application No. 60/634,124, filed on Dec. 8, 2004, provisional application No. 60/639,095, filed on Dec. 23, 2004, provisional application No. 60/659,265, filed on Mar. 7, 2005.

(51) Int. Cl.
H04M 3/42 (2006.01)
(52) U.S. Cl. .............................. 379/211.02; 379/88.11; 379/88.25; 379/93.23
(58) Field of Classification Search ............ 379/211.01, 379/211.02
See application file for complete search history.

(56) References Cited

U.S. PATENT DOCUMENTS 3,936,613 A 2/1976 Nishigori et al.

(Continued)

FOREIGN PATENT DOCUMENTS

CA 1329852 5/1994

(Continued)

OTHER PUBLICATIONS

International Search Report dated May 19, 2003.

(Continued)

*Primary Examiner*—Creighton Smith
(74) *Attorney, Agent, or Firm*—Knobbe, Martens, Olson & Bear LLP

(57) ABSTRACT

The present invention provides flexible call processing. For example, a call processor system can receive an inbound call intended for a called party and place an outbound call to the called party. The call processing system can provide the called party with a call transfer option.

60 Claims, 28 Drawing Sheets

U.S. PATENT DOCUMENTS

| | | |
|---|---|---|
| 3,956,595 A | 5/1976 | Sobanski |
| 4,009,337 A | 2/1977 | Sakai et al. |
| 4,022,983 A | 5/1977 | Braun et al. |
| 4,485,470 A | 11/1984 | Reali |
| 4,736,405 A | 4/1988 | Akiyama |
| 4,809,321 A | 2/1989 | Morganstein et al. |
| 4,893,336 A | 1/1990 | Wuthnow |
| 4,994,926 A | 2/1991 | Gordon et al. |
| 5,040,208 A | 8/1991 | Jolissaint |
| 5,046,087 A | 9/1991 | Sakai |
| 5,291,302 A | 3/1994 | Gordon et al. |
| 5,404,537 A | 4/1995 | Olnowich et al. |
| 5,434,908 A | 7/1995 | Klein |
| 5,459,584 A | 10/1995 | Gordon et al. |
| 5,467,388 A | 11/1995 | Redd, Jr. et al. |
| 5,526,524 A | 6/1996 | Madduri |
| 5,533,102 A | 7/1996 | Robinson et al. |
| 5,577,111 A | 11/1996 | Iida et al. |
| 5,583,918 A | 12/1996 | Nakagawa |
| 5,619,557 A | 4/1997 | Van Berkum |
| 5,640,677 A | 6/1997 | Karlsson |
| 5,651,054 A | 7/1997 | Dunn et al. |
| 5,668,861 A | 9/1997 | Watts |
| 5,751,795 A | 5/1998 | Hassler et al. |
| 5,774,067 A | 6/1998 | Olnowich et al. |
| 5,805,587 A | 9/1998 | Norris et al. |
| 5,809,128 A | 9/1998 | McMullin |
| 5,812,551 A | 9/1998 | Tsukazoe et al. |
| 5,825,867 A | 10/1998 | Epler et al. |
| 5,832,060 A | 11/1998 | Corlett et al. |
| 5,835,573 A | 11/1998 | Dee et al. |
| 5,894,504 A | 4/1999 | Alfred et al. |
| 5,946,386 A | 8/1999 | Rogers et al. |
| 5,960,064 A | 9/1999 | Foladare et al. |
| 5,960,073 A | 9/1999 | Kikinis et al. |
| 5,963,629 A | 10/1999 | Jung |
| 5,995,594 A | 11/1999 | Shaffer et al. |
| 5,995,603 A | 11/1999 | Anderson |
| 6,014,436 A | 1/2000 | Florence et al. |
| 6,032,051 A | 2/2000 | Hall et al. |
| 6,034,956 A | 3/2000 | Olnowich et al. |
| 6,035,031 A | 3/2000 | Silverman |
| 6,044,059 A | 3/2000 | Olnowich et al. |
| 6,078,581 A | 6/2000 | Shtivelman et al. |
| 6,104,800 A | 8/2000 | Benson |
| 6,144,644 A | 11/2000 | Bajzath et al. |
| 6,160,881 A | 12/2000 | Beyda et al. |
| 6,167,127 A | 12/2000 | Smith et al. |
| 6,169,795 B1 | 1/2001 | Dunn et al. |
| 6,169,796 B1 | 1/2001 | Bauer et al. |
| 6,178,183 B1 | 1/2001 | Buskirk, Jr. |
| 6,181,691 B1 | 1/2001 | Markgraf et al. |
| 6,208,638 B1 | 3/2001 | Rieley et al. |
| 6,212,261 B1 | 4/2001 | Meubus et al. |
| 6,230,009 B1 | 5/2001 | Holmes et al. |
| 6,243,378 B1 | 6/2001 | Olnowich |
| 6,253,249 B1 | 6/2001 | Belzile |
| 6,278,704 B1 | 8/2001 | Creamer et al. |
| 6,304,565 B1 | 10/2001 | Ramamurthy |
| 6,310,939 B1 | 10/2001 | Varney |
| 6,350,066 B1 | 2/2002 | Bobo, II |
| 6,353,660 B1 | 3/2002 | Burger et al. |
| 6,353,663 B1 | 3/2002 | Stevens et al. |
| 6,363,414 B1 | 3/2002 | Nicholls et al. |
| 6,405,035 B1 | 6/2002 | Singh |
| 6,411,601 B1 | 6/2002 | Shaffer et al. |
| 6,411,805 B1 | 6/2002 | Becker et al. |
| 6,438,216 B1 | 8/2002 | Aktas |
| 6,438,222 B1 | 8/2002 | Burg |
| 6,477,246 B1 | 11/2002 | Dolan et al. |
| 6,496,569 B2 | 12/2002 | Pelletier et al. |
| 6,496,576 B2 | 12/2002 | Tanaka et al. |
| 6,501,750 B1 | 12/2002 | Shaffer et al. |
| 6,505,163 B1 | 1/2003 | Zhang et al. |
| 6,510,162 B1 | 1/2003 | Fijolek et al. |
| 6,510,417 B1 | 1/2003 | Woods et al. |
| 6,512,930 B2 | 1/2003 | Sandegren |
| 6,519,258 B1 | 2/2003 | Tsukazoe et al. |
| 6,539,084 B1 | 3/2003 | Long |
| 6,542,596 B1 | 4/2003 | Hill et al. |
| 6,546,087 B2 | 4/2003 | Shaffer et al. |
| 6,549,612 B2 | 4/2003 | Gifford et al. |
| 6,553,222 B1 | 4/2003 | Weiss |
| 6,564,264 B1 | 5/2003 | Creswell et al. |
| 6,564,321 B2 | 5/2003 | Bobo, II |
| 6,567,505 B1 | 5/2003 | Omori et al. |
| 6,574,319 B2 | 6/2003 | Latter et al. |
| 6,621,892 B1 | 9/2003 | Banister et al. |
| 6,643,034 B1 | 11/2003 | Gordon et al. |
| 6,662,232 B1 | 12/2003 | Nicholls et al. |
| 6,690,785 B1 | 2/2004 | Stelter et al. |
| 6,721,408 B1 | 4/2004 | Bain et al. |
| 6,751,299 B1 | 6/2004 | Brown et al. |
| 6,775,370 B2 | 8/2004 | Burg |
| 6,782,088 B1 | 8/2004 | Gabara et al. |
| 6,785,021 B1 | 8/2004 | Gordon et al. |
| 6,792,094 B1 | 9/2004 | Kirkpatrick |
| 6,857,074 B2 | 2/2005 | Bobo, II |
| 6,898,275 B2 | 5/2005 | Dolan et al. |
| 6,968,174 B1 | 11/2005 | Trandal et al. |
| 6,999,572 B1 | 2/2006 | Shaffer et al. |
| 7,003,087 B2 | 2/2006 | Spencer et al. |
| 7,397,910 B2 | 7/2008 | Dolan et al. |
| 2002/0010616 A1 | 1/2002 | Itzhaki |
| 2002/0097710 A1 | 7/2002 | Burg |
| 2003/0039339 A1 | 2/2003 | Luehrig et al. |
| 2003/0156700 A1 | 8/2003 | Brown et al. |
| 2004/0028203 A1 | 2/2004 | Wurster et al. |
| 2004/0190706 A1 | 9/2004 | Fleischer, III et al. |
| 2004/0258220 A1 | 12/2004 | Levine et al. |
| 2005/0053216 A1 | 3/2005 | Spencer et al. |
| 2005/0123118 A1 | 6/2005 | Terry et al. |
| 2005/0201534 A1 | 9/2005 | Ignatin |
| 2005/0207556 A1 | 9/2005 | Gonzalez et al. |
| 2006/0013374 A1 | 1/2006 | Fleischer, III et al. |
| 2006/0227957 A1 | 10/2006 | Dolan et al. |

FOREIGN PATENT DOCUMENTS

| | | |
|---|---|---|
| EP | 1 120 954 | 8/2001 |
| JP | 10-513632 | 12/1998 |
| JP | 11-506292 | 6/1999 |
| JP | 2001-168989 | 6/2001 |
| WO | WO 97/26749 | 7/1997 |
| WO | WO 98/36551 | 8/1998 |
| WO | WO 00/60840 | 10/2000 |
| WO | WO 01/76210 | 10/2001 |

OTHER PUBLICATIONS

Article: Johnson, Dave; "Now You're Talking-voice-response systems for home offices—Product Information"; *Home Office Computing*: http://www.findarticles.com: Feb. 1999.

PROCESS FLOW STEPS

1401. Calling Party 1102 originates call to Called Party Phone Line 1114

1402. Called Party LEC switch 1128 detects Called Party Telephone Line 1114 busy 1403. Called Party LEC switch 1128 forwards the call to the IAM Line/Trunk 1118

1404. IAM system 1124 notifies online Computer 1110 of incoming call via Internet 1104

1405. IAM system 1124 answers incoming call from Calling Party 1102

1406. PSTN 1104 establishes 2-way talk path between IAM system 1124 and Calling Party 1102

1407. IAM system 1124 plays greeting to Calling Party 1124

1408. Calling Party 1102 can talk over the greeting to Called Party 1112

1409. IAM system 1124 streams Calling Party's 1102 audio comments to the online Computer 1110

1410. IAM system 1124 generates tone to signal Calling Party 1102 to begin message recording 1411. Calling Party 1102 begins recording voice message 1412. IAM system 1124 streams Calling Party's voice message to the online Computer 1110

1413. Called Party 1112 signals IAM system 1124 to pickup the call to TALK to the Calling Party using their HOME PC 1414. IAM system 1124 interrupts Calling Party 1102 message recording by generating tone 415. IAM system 1124 requests that Calling Party 1102 hold while bridging resources are allocated 1416. IAM system 1124 bridges the Calling Party 1102 call with the Called Party 1112 call 1417. (Normal 2-way conversation between Calling Party telephone 102 and Called Party Computer1110)

418. Calling Party 102 or Called Party 1112 terminates call by hanging up

1419. IAM system 1124 releases bridging resources and signals call completion to second Party
   - Internet 1104 control message sent to Called Party computer for display
   - Call release signal sent to PSTN 1104 to alert Calling Party Telephone 1102

FIG. 19B

PROCESS FLOW STEPS

1501. Calling Party 1102 originates call to Called Party Phone Line 1114

1502. Called Party LEC switch 1128 detects Called Party Telephone Line1 114 busy 1503. Called Party LEC switch 1128 forwards the call to the IAM Line/Trunk 1118

1504. IAM system 1124 notifies online Computer 1110 of incoming call via Internet 1104

1505. IAM system 1124 answers incoming call from Calling Party 1102

1506. PSTN 1104 establishes 2-way talk path between IAM system 1124 and Calling Party 1102

1507. IAM system 1124 plays greeting to Calling Party 1124

1508. Calling Party 1102 can talk over the greeting, to Called Party 1112

1509. IAM system 1124 streams Calling Party's audio comments to the online Computer 1110

1510. IAM system 1124 generates tone to signal Calling Party 1102 to begin message recording 1511. Calling Party 1102 begins recording voice message 1512. IAM system 1124 streams Calling Party's voice message to the online Computer 1110

1513. Called Party 1112 signals IAM system 1124 to pickup the call to TALK to the caller using their HOME PHONE 1514. IAM system 1124 interrupts Calling Party 1102 message recording by generating tone 1515. IAM system 1124 requests that Calling Party 1112 hold while bridging resources are allocated 1516. Client application 1116 running on Called Party's Computer 1110 terminates Internet session (releasing phone Line 1114)

1517. IAM system 1124 originates new call to Called Party telephone 1112

1518. Called Party 1112 answers Incoming call from IAM system 1124

1519. IAM system 1124 announces call to Called Party 1112

1520. IAM system 1124 bridges the Calling Party 1102 call with the Called Party 1112 call 1521. (Normal 2-way conversation between Calling Party Telephone 1102 and Called Party Telephone 1112)

1522. Calling Party 1102 or Called Party 1112 terminates call by hanging up

1523. IAM system 1124 releases bridging resources and signals call completion to second Party

FIG. 20B

METHODS AND APPARATUS FOR PROVIDING EXPANDED TELECOMMUNICATIONS SERVICE

RELATED APPLICATION

This application is related to copending U.S. application Ser. No. 11/039,374, filed Jan. 19, 2005, entitled METHODS AND APPARATUS FOR PROVIDING EXPANDED TELECOMMUNICATIONS SERVICE, and is related to copending application, entitled METHODS AND SYSTEMS FOR TELEPHONY PROCESSING, INCLUDING LOCATION BASED CALL TRANSFERS, Ser. No. 11/294,638, and copending application, entitled METHODS AND SYSTEMS FOR TELEPHONY CALL-BACK PROCESSING, Ser. No. 11/294,641, filed on the same date as the present application, the entirety of which are hereby incorporated by reference.

PRIORITY CLAIM

This application is a continuation in part of U.S. application Ser. No. 11/062,182, filed Feb. 18, 2005, which is a continuation of U.S. application Ser. No. 10/255,567, filed Sep. 26, 2002, now U.S. Pat. No. 6,898,275, which is a continuation of U.S. application Ser. No. 09/539,375, filed Mar. 31, 2000, now U.S. Pat. No. 6,477,246, which claims priority from U.S. Provisional Patent Application No. 60/127,434, filed Apr. 1, 1999, the contents of which are incorporated herein in their entirety; this application is a continuation in part of U.S. application Ser. No. 10/439,601, filed May 16, 2003 now U.S. Pat. No. 7,103,167, which claims priority from U.S. Provisional Patent Application No. 60/382,257, filed May 20, 2002, the contents of which are incorporated herein in their entirety; this application further claims priority from U.S. Provisional Patent Application No. 60/633,594, filed Dec. 6, 2004, U.S. Provisional Patent Application No. 60/634,124, filed Dec. 8, 2004, U.S. Provisional Patent Application No. 60/639,095, filed Dec. 23, 2004, and U.S. Provisional Patent Application No. 60/659,265, filed Mar. 7, 2005, the contents of which are incorporated herein in their entirety.

BACKGROUND OF THE INVENTION

1. Field of the Invention

The present invention relates generally to telecommunications and in particular to systems and methods for processing and placing telephone calls.

2. Description of the Related Art

Many telephone subscribers have a personal computer on their desk and frequently the personal computer is logged in to the same telephone line that would normally be used by the telephone. This is for use of the computer on the Internet. Frequently, incoming telephone calls receive a busy signal because the computer is logged on to the Internet. Thus there are many lost calls. Many individuals and small businesses are searching for ways to simplify and control their telecommunications systems. Many of them are reluctant to acquire additional telephone lines at current prices.

Most telecommunications systems today have limited intelligence. Many calls end in voice mail, an often unsatisfactory conclusion. With respect to business calls, calls not completed may result in irritated customers and lost sales.

In addition, many telephone subscribers have caller ID blocking on their line in order to prevent call recipient from viewing the caller's number using a caller ID display. However, many call recipients have set-up their phone lines so that calls having caller ID blocking will not ring through to the called party's phone. Then, in many conventional systems, if a caller with caller ID blocking calls, a prompt will be played to the caller informing the caller that the called party will not accept calls with caller ID blocking, and that the caller needs to first hang up, and place a new call by entering and unblocking code, and then entering the called number again to unblock the caller's phone number. Disadvantageously, this is a time consuming, and for some, a confusing procedure.

SUMMARY OF THE INVENTION

The present invention relates generally to telecommunications, and more particularly to telephone call processing. By way of example and not limitation, several example embodiments will be described.

One example embodiment provides a method of providing a called party the ability to screen calls, the method comprising: receiving, at a call processing system, a call from a calling party intended for a called party; playing a greeting to the calling party; placing an outbound call from the call processing system to a first phone address associated with the called party; transmitting, in substantially real-time, at least a first portion of the voice communication from the calling party to a first communication device associated with the first phone address so that the called party can screen the call; providing at least the following call handling options to the called party: accept the call on the first communication device; transfer the call to a first alternate destination, with screening, wherein at least one portion of the voice communication from the calling party will be transmitted to the first alternate destination and the calling party will be prevented from hearing the called party for at least a first amount of time; transfer the call to a second alternate destination with screening; receiving a call handling instruction from the called party via the first communication device; and processing the call from the caller in accordance with called party's instruction.

Another example embodiment provides a method of providing a called party the ability to screen calls, the method comprising: receiving, at a call processing system, a call from a calling party intended for a called party; placing an outbound call from the call processing system to a first phone address associated with the called party; transmitting, in substantially real-time, at least a portion of a voice communication from the calling party to a first communication device associated with the first phone address so that the called party can screen the call; providing at least the following call handling options to the called party: accept the call on the first communication device; transfer the call to a first alternate destination; receiving a call handling instruction from the called party via the first communication device; and processing the call from the caller in accordance with called party's instruction.

In yet another example embodiment, a method of providing a called party the ability to screen calls is provided, the method comprising: receiving, at a call processing system, a call from a calling party intended for a called party; placing an outbound call from the call processing system to a first phone address associated with the called party; transmitting, in substantially real-time, at least a portion of a voice communication from the calling party to a first communication device associated with the first phone address so that the called party can screen the call; providing at least the following call handling options to the called party: transfer the call to a first alternate destination, with supervision, wherein the call processing system maintains the call to the first communication device until the at least one alternate destination is answered; transfer the call to the first alternate destination, without supervision, wherein the call processing system terminates the call to the first communication device after receiving the call handling instruction from the called party and before the at least one alternate destination is answered; receiving a call handling instruction from the called party via the first communication device; and, processing the call from the caller in accordance with called party's instruction.

Still another example embodiment provides a method of providing a called party the ability to screen calls, the method comprising: receiving, at a call processing system, a first call from a calling party that had been directed to a first phone associated with a called party and forwarded to the call processing system; providing a greeting to the calling party; receiving a voice communication from the calling party at the call processing system; placing an outbound call from the call processing system back to the first phone; and transmitting, in substantially real-time, at least a portion of the voice communication from the calling party to the first phone, wherein the calling party cannot hear the called party, so that the called party can screen the call, and wherein the called party can accept the call on the first phone or not accept the call.

Another example embodiment provides a method of providing a called party the ability to screen calls, the method comprising: receiving, at a call processing system, an inbound call from a calling party intended for a called party; playing a greeting to the calling party; placing an outbound call from the call processing system to a phone address associated with the called party; receiving a voice message from the calling party; transmitting over the outbound call, in substantially real-time, at least a portion of the voice message from the calling party to a telephonic device associated with the phone address as a message is being left; receiving a call handling instruction from the called party over the voice communications network; and processing the inbound call in accordance with called party's call handling instruction.

BRIEF DESCRIPTION OF THE DRAWINGS

Embodiments of the present invention will now be described with reference to the drawings summarized below. These drawings and the associated description are provided to illustrate example embodiments of the invention, and not to limit the scope of the invention.

FIGS. 19A-19B illustrate a first example call screening process in accordance with the present invention.

FIGS. 20A-20B illustrate a second example call screening process in accordance with the present invention.

Throughout the drawings, like reference numbers are used to refer to items that are identical or functionally similar.

DETAILED DESCRIPTION OF PREFERRED EMBODIMENTS

Embodiments of the present invention are directed methods and systems for providing call screening and/or call forwarding/transfer in conjunction with a variety of network-based telephone call answering processes and services.

Figure 1:
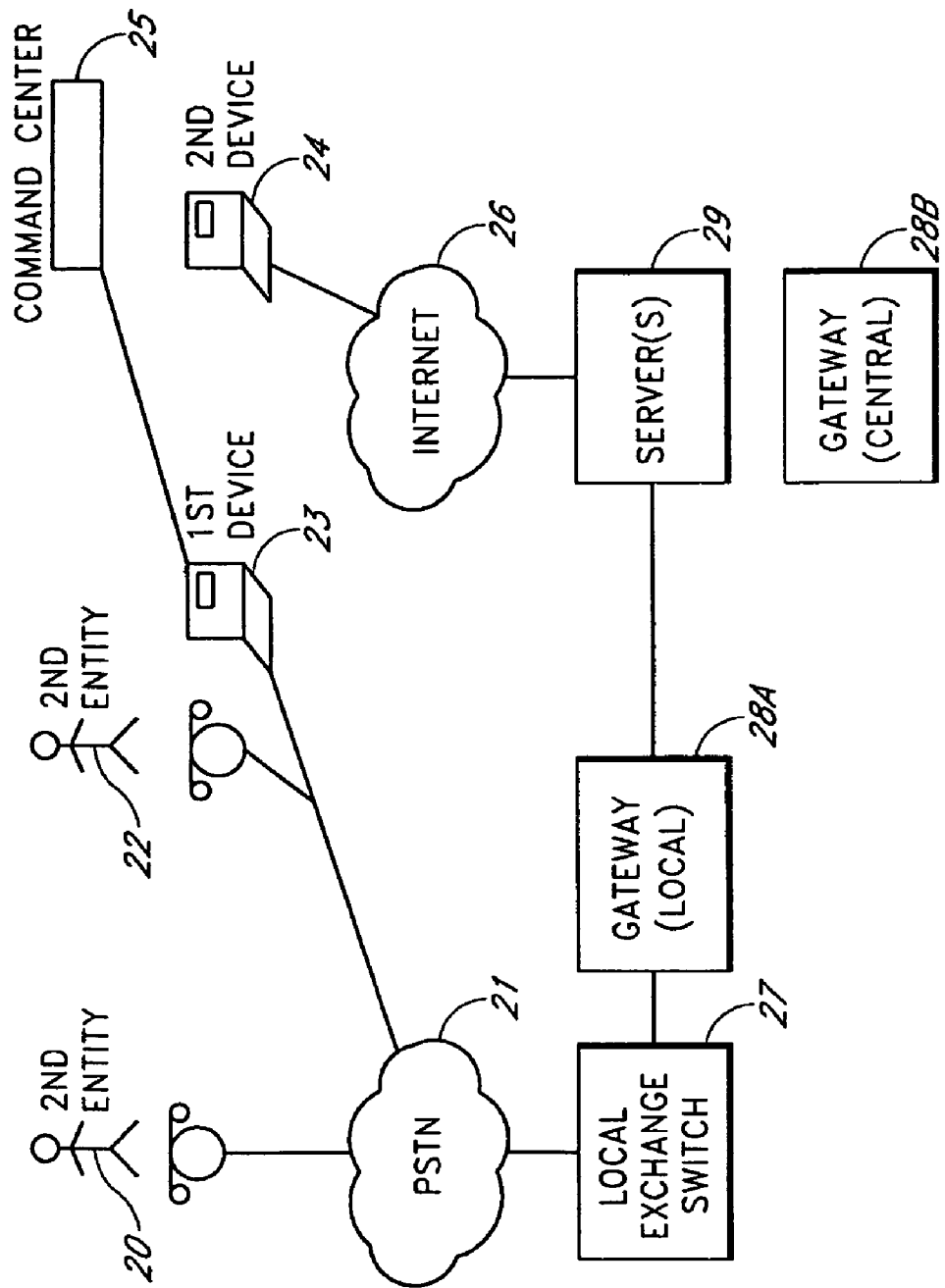
FIG. 1 is a schematic representation of one embodiment of the present invention.

FIG. 1 is a schematic representation of the organization of one embodiment of the present invention. FIG. 1 shows a first entity 20 connected to the Public Switched Telephone Network (PSTN) 21. A second entity 22 is also connected to the PSTN 21. The second entity 22 is illustrated as having a first device 23 indirectly connected to the Internet 26 through a PSTN 21 provided dial-up connection shared with the telephone of the second entity 22. The second entity 22 is also shown to have a second device 24 directly connected to the Internet 26. Both devices host a software based Command Center 25. The devices may or may not be logged onto the Internet 26. FIG. 1 also shows a local exchange switch 27 connected to the PSTN 21. The system directs the call and the call information of the first entity 20 through the PSTN 21 to the local exchange switch 27 and then to a gateway 28; said gateway can be implemented as a local gateway 28A near the switching system 27 or a centralized gateway 28B near the server 29. The gateway forwards the call information to the Server (or array of Servers) 29 which then communicates to the Command Center 25 over an Internet Protocol connection that is by a plurality of means, including a single phone line dial up connection (e.g. as shown in the case of the first device 23) an always on landline home connection (for example as shown in the case of the second device 24) an always on landline office connection or an always on wireless connection. The Server 29 and the Command Center 25 then interact to coordinate the dialog with the first entity 20 over the PSTN 21 and the second entity 22 over the appropriate device 23 or 24.

Figure 2:
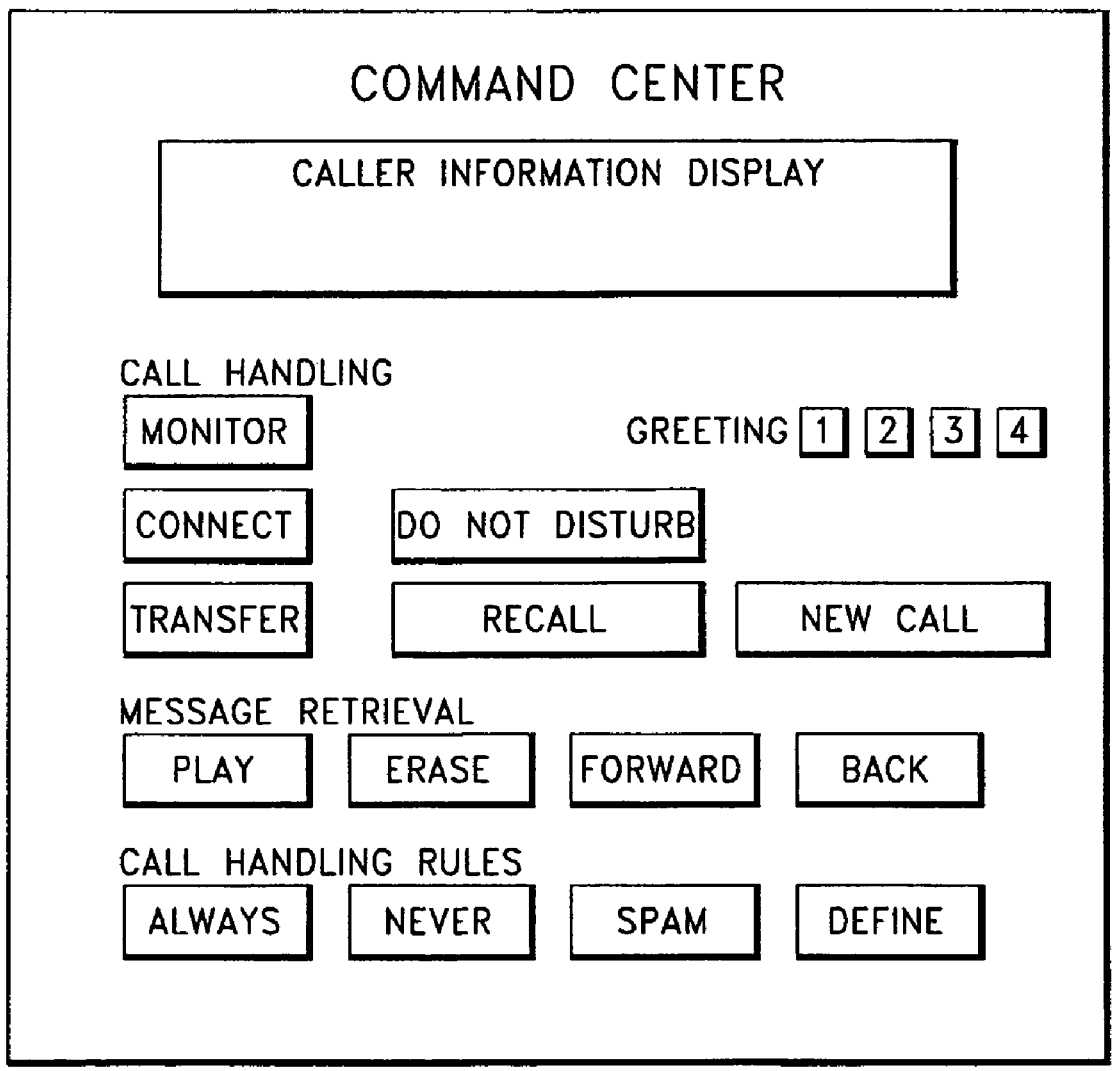
FIG. 2 is an example of a typical screen for a control panel.

Referring now to FIG. 2 of the drawings, an example of a typical screen for command center 25 a control panel is shown. It should be understood that the control panel may have messages on it other than the ones shown in the figure. The control panel of FIG. 2 would typically show up in a small area of the monitor screen of the subscriber's device desktop (e.g. computer) 23 & 24. For example, the control panel of FIG. 2 may occupy only a 1 inch by 2 inch corner of the screen. The control panel of FIG. 2 displays status of the incoming call and allows the second entity 22 to coordinate interactions with the server 29. The command center interface supports a plurality of call control inputs including a) no input b) transfer call over circuit switching network c) take call over Internet Protocol d) reoriginate the call over circuit switched or Internet Protocol network e) have the server interact with the caller to provide information or record the audible signal.

Figure 3:
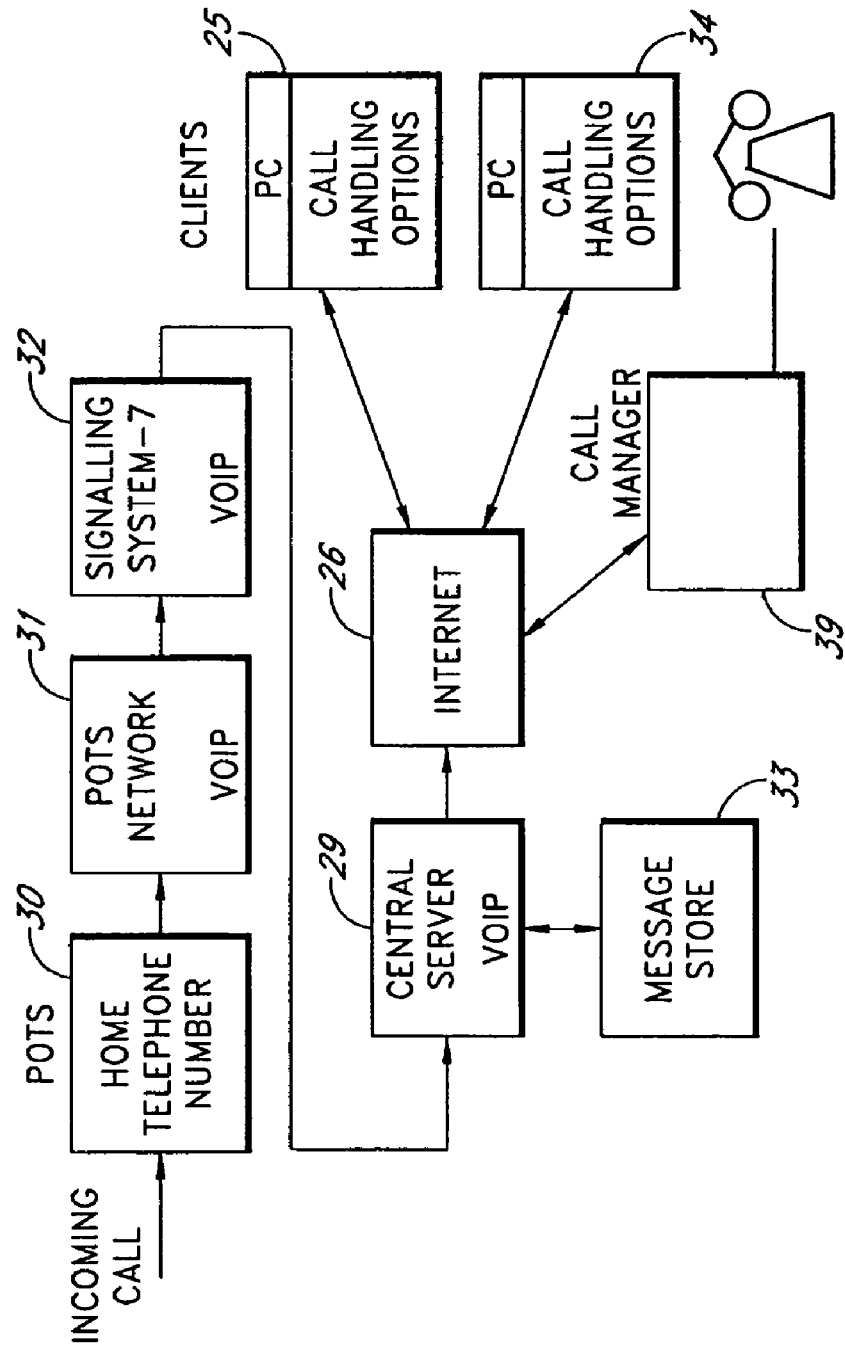
FIG. 3 is a more detailed version of the communication path of the system of the present invention.

Referring now to FIG. 3 of the drawings, there is shown a more detailed version of the communication path of the system of the present invention. An incoming call is illustrated as being directed to a home telephone number 30 in the Plain Old Telephone System (POTS) which is passed on to the POTS Network 31. The POTS Network 31 is shown connected to a Signaling System 7 (SS7) 32. The telephone system employs what is known as Common Channel Signaling (CCS). This is a signaling system used in telephone networks that separates signaling information from user data. A specified channel is exclusively designated to carry signaling information for all other channels in the system. The SS7 32 is one of the standard CCS systems used by the telephone company. The SS7 32 is connected to the central server 28. The SS7 32 normally connects between central offices. Because the present invention uses the SS7 32, it appears to be a central office to the telephone companies. The system can be or act as a class 5 telephone office. A message store memory 33 is located at the central server 29 for storing messages. The central server 29 communicates through the internet 26 to the personal desktop computer 25 of the client. The central server 29 is shown as also communicating to a second client having a personal desktop computer 34. A call merger 39 connects from the Internet 26 to a telephone instrument.

When an incoming call comes in to the home telephone number 30, the central server 29 interacts with the caller. It makes a record of the caller's telephone number or prompts the caller to unblock the telephone so as to give the caller's telephone number. The central server 29 may give the caller options that can be answered by a touch tone response, or it may ask for a voice message to be passed on to the subscriber. If an audio message is given to the central server 29, that message is passed along using Voice Over IP (VOIP) which is used in the telephone system and over the internet. The letters IP stand for Internet Protocol.

Teleconferencing over the internet is done using a standard developed by the International Telecommunications Union (ITU). This standard is known as ITU-T H.323. This provides for audio and video in a teleconferencing context. From the standpoint of VOIP, the video component of the teleconferencing signal is ignored and only the audio is used. This permits audio to be transferred from the incoming call at the home telephone number 30 to the client's personal desktop computer 25. The client can listen to the message from the incoming call before making a decision as to the handling of the call. The server communicates to a command center running on a multiplicity of platforms and providing a control interface to the second entity. The command center is a software and device solution that can be hosted alternatively on a personal computer, a handheld computing device, a wireless telephone, a television, a web interface appliance, or a command center server using voice and DTMF tone interaction with a telephone device.

Figure 4:
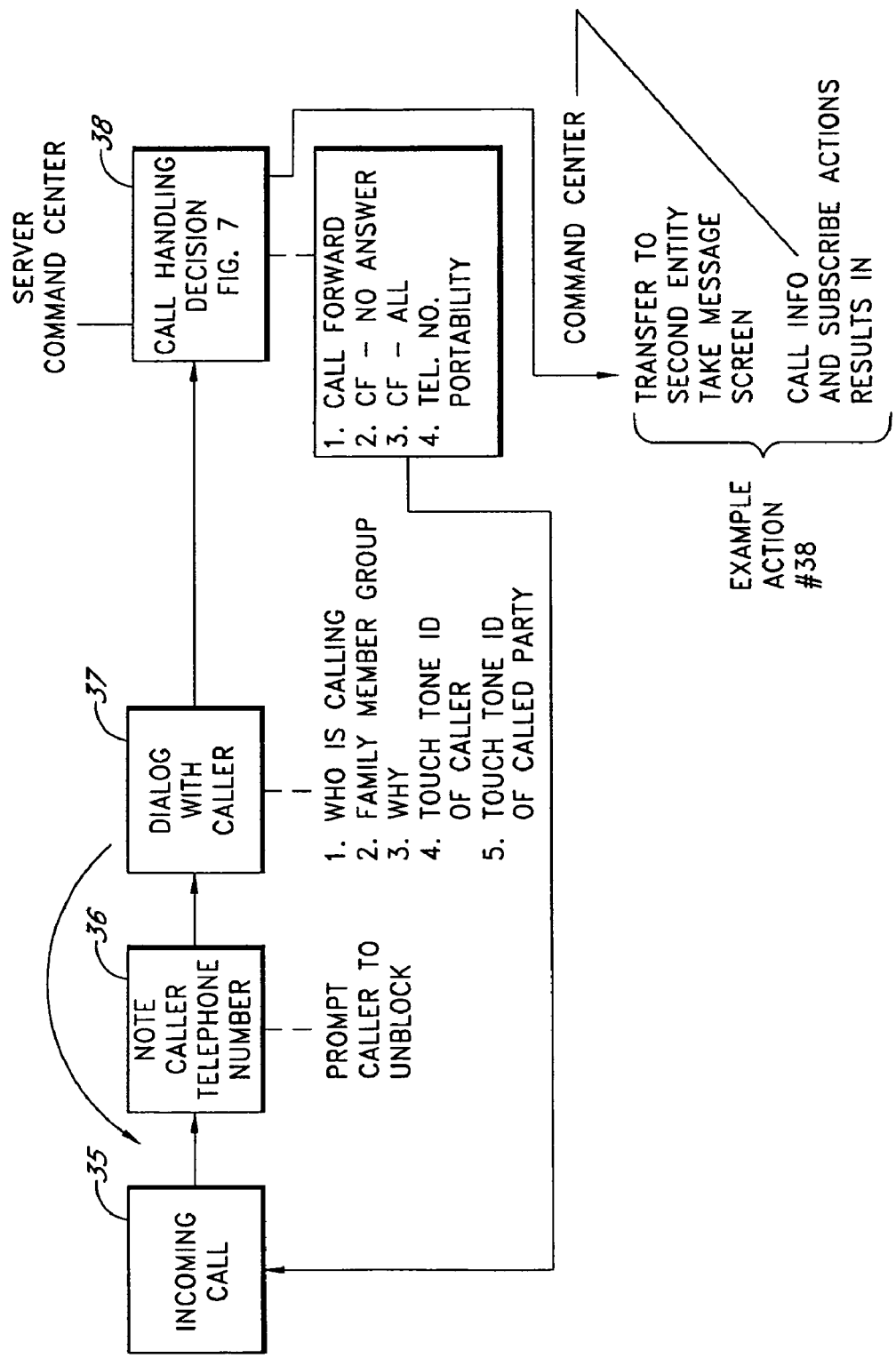
FIG. 4 is a schematic diagram of the call handling process.

Referring now to FIG. 4, there is shown a schematic diagram of the call handling process. Box 35 indicates the arrival of an incoming call. The options may include forward the call, call forward no-answer, forward the call always, and it may provide for switching the call to a different telephone number, for example that of a cell phone or other device. The caller may be presented with voice mail type options. For example, if you wish to talk with Mr. Jones, press 1, if you wish to talk with Mrs. Jones press 2, if you wish to talk with Susie Jones press 3. The caller may be required to give a touch tone ID, or to provide a touch tone ID of the called party. The dialog process is for the purpose of obtaining as much information as possible as to who is calling, which family member is being called, and why. The caller may be asked to speak a message into the telephone as would be done with an answering machine. This message is recorded and passed on to the subscriber so that he can listen to it to aid him in making the call handling decision. As shown at box 37, the caller's telephone number is noted by the central server 29, or the caller is prompted to unblock the telephone number. Box 36 indicates that a dialog is conducted by the central server 29 with the caller. Box 38 shows the call handling decision. The system identifies the first entity by the following methods: detecting caller ID and or called number information from the call information received from the switch, by means of voice prompts from the system and tone response from the first entity by which the first entity identifies their number, or the person whom they are calling, or by means of capturing an audible signal from the first entity.

Figure 5:
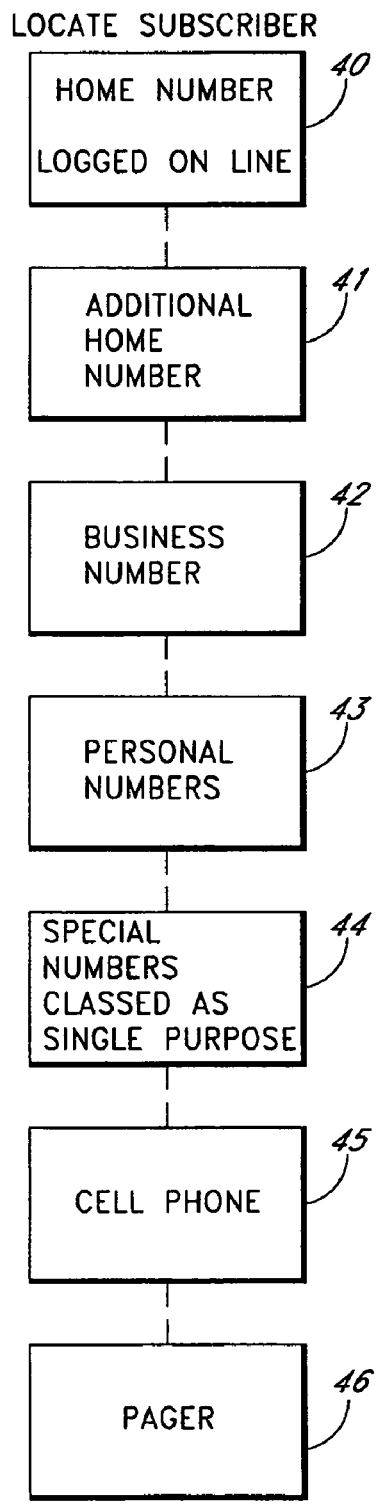
FIG. 5 is the process of locating the subscriber.

The central server 29 may go through a process of locating the subscriber. This is illustrated in FIG. 5. This service is sometimes referred to as find me/follow me. As indicated in FIG. 5, the subscriber may have his home number logged on line for the Internet as indicated in block 40. However, the subscriber may have an additional home number as shown in block 41 or the subscriber may have a business number as shown in block 42. The subscriber may have a personal number as in block 43, or a special number classed as a single purpose number as in block 44. In addition the subscriber may have a cell phone 45 or a pager 46.

It should be understood that as the central server 29 goes through the processes of locating the subscriber, the caller is not aware of any of the procedures that the central server 28 is going through. The caller is unaware of any of the special numbers that the subscriber may have, or equipment such as pagers or cell phones.

Figure 6:
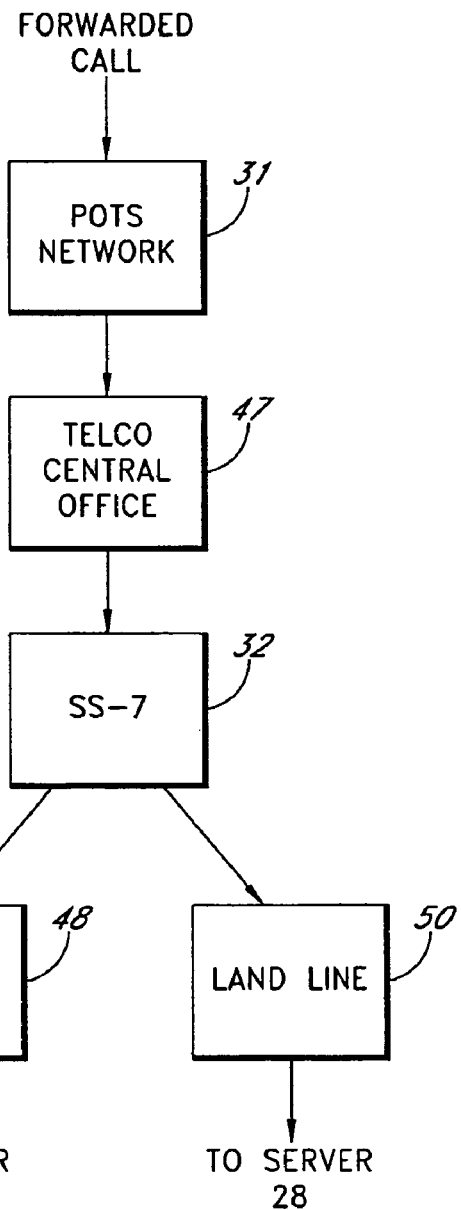
FIG. 6 is an expansion of FIG. 3 showing how a Telco central office can be connected by way of wireless connections or by way of land line connections to the server.

It is not necessary for the equipment used by the system such as the central server 29 to be located close to the subscriber or close to the called number. For example, as shown in FIG. 6, the POTS Network 31 can be connected through a Telco central office 47 via the SS7 32 by way of wireless connections 48 or by way of land line connections 50 to the server 29 at a remote location.

Figure 7:
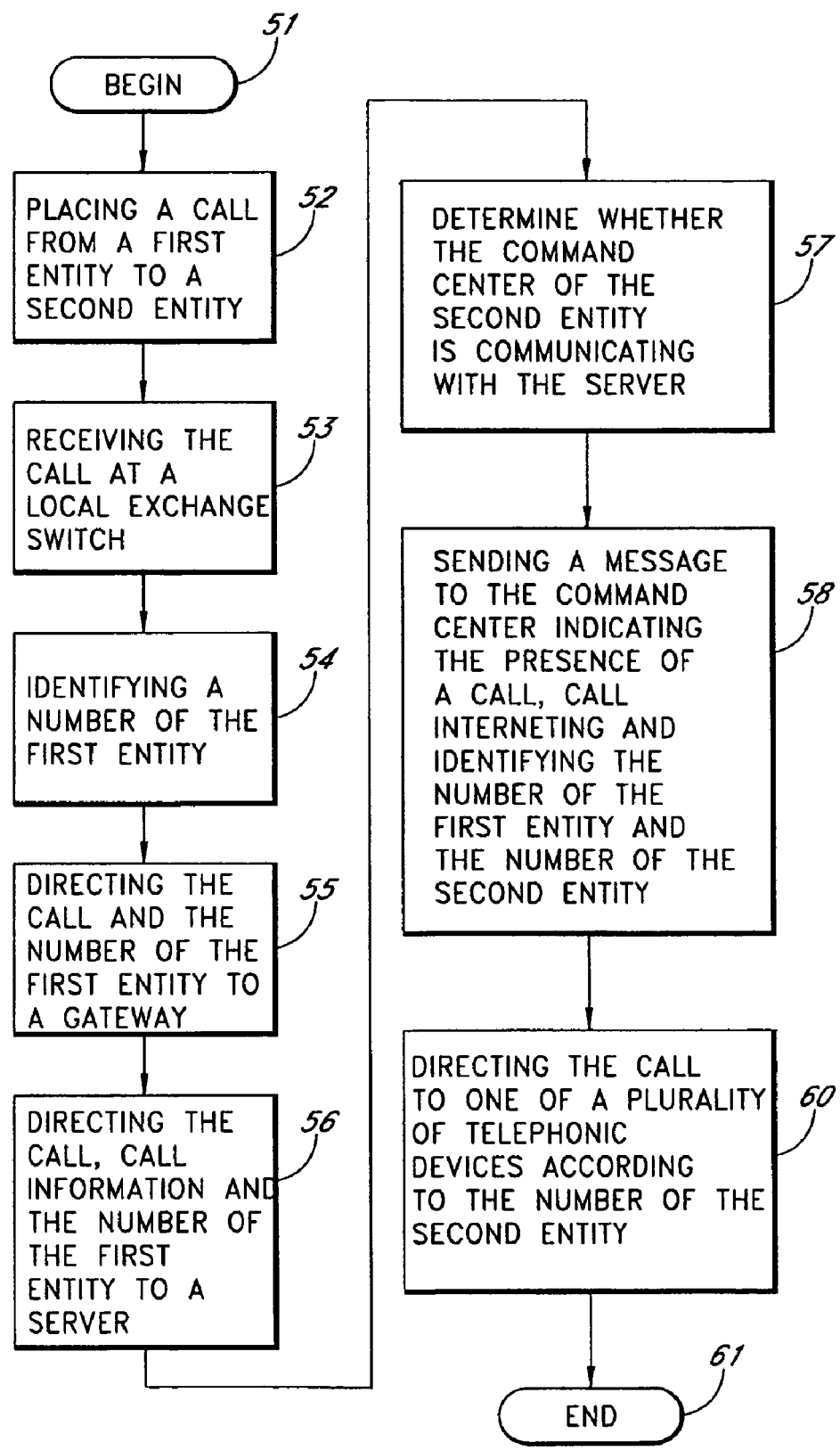
FIG. 7 is a sequence of steps on a flow chart indicating the handling of a call.

It should be understood that the message store memory 33 shown in FIG. 3 may include a list of numbers that the subscriber wishes to speak to always. These may be family members, or business partners, or the like. These may be added to at the subscriber's discretion. Other instructions for call handling may be recorded in the message store memory 33. One of the first things done by the central server 29 is to check to see if there are special instructions for handling of a given incoming call. FIG. 7 shows a sequence of steps on a flow chart indicating the handling of a call. The first box 51 is "begin". Box 52 is "placing a call from a first entity to a second entity". Box 53 is "receiving the call at a local exchange switch". The next step is shown in box 54 as "identifying a number of the first entity". Box 55 is "directing the call and the number of the first entity to a gateway". Box 56 is "directing the call, call information, and the number of the first entity to a server". Box 57 is "determining whether the Command Center of the second entity is communicating with the server". Box 58 is "sending a message to the Command Center indicating the presence of a call and identifying the number of the first entity and the number of the second entity". Box 60 is "directing the call to one of a plurality of telephonic devices according to the number of the second entity" and the last block on FIG. 7 is box 61 "end".

Figure 8:
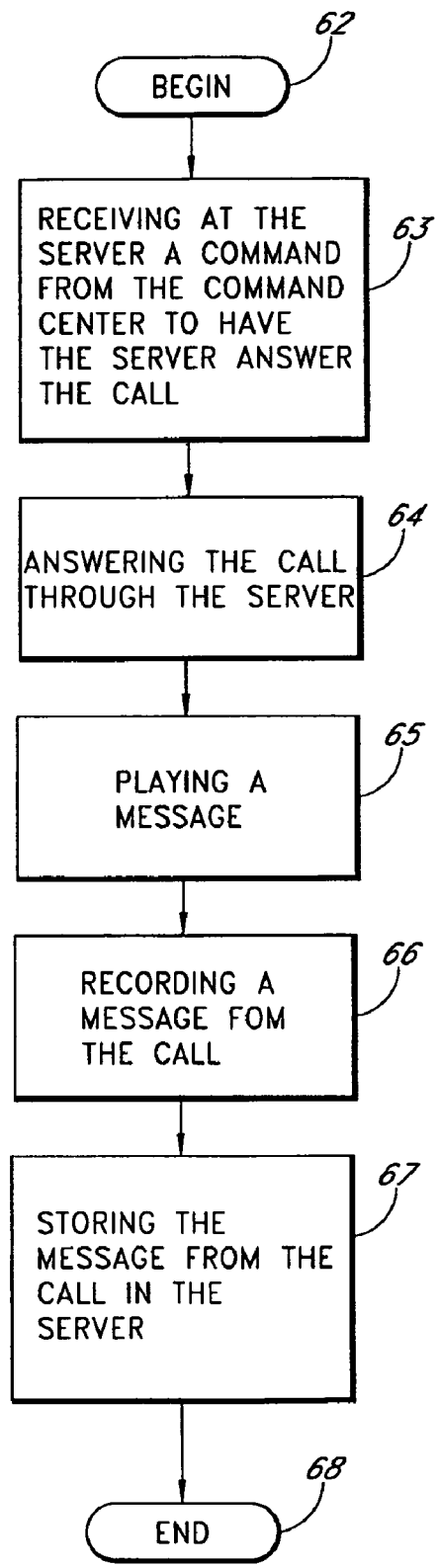
FIG. 8 is a flow chart showing a series of steps in the handling of incoming telephone calls.

FIG. 8 is a flow chart showing a series of steps in the handling of incoming telephone calls. The first block 62 is "begin". Block 63 is "receiving at the server a command from the command center to have the server answer the call". Block 64 is "answering the call through the server". Block 65 is "playing a message". Block 66 is "recording a message from the call". Block 67 is "storing the message from the call in the server". The last block is 68 "end".

Figure 9:
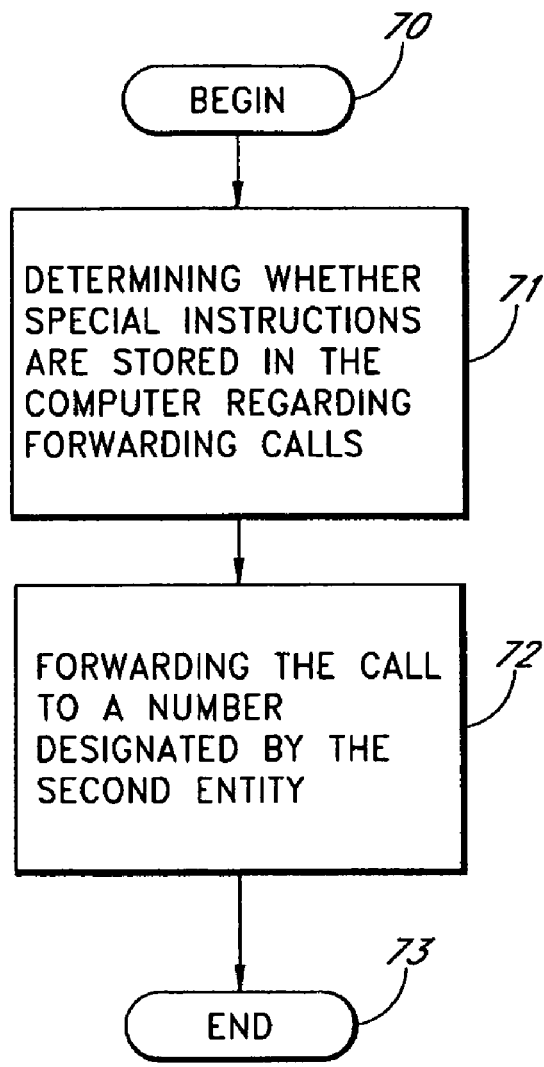
FIG. 9 is a flow chart illustrating further steps in the call handling flow chart.

FIG. 9 is a flow chart illustrating further steps in the call handling flow chart. The first block 70 is "begin". Block 71 is "determining whether special instructions are stored in the computer regarding forwarding calls". Block 72 is "forwarding the call to a number designated by the second entity". Block 73 is "end".

Figure 10:
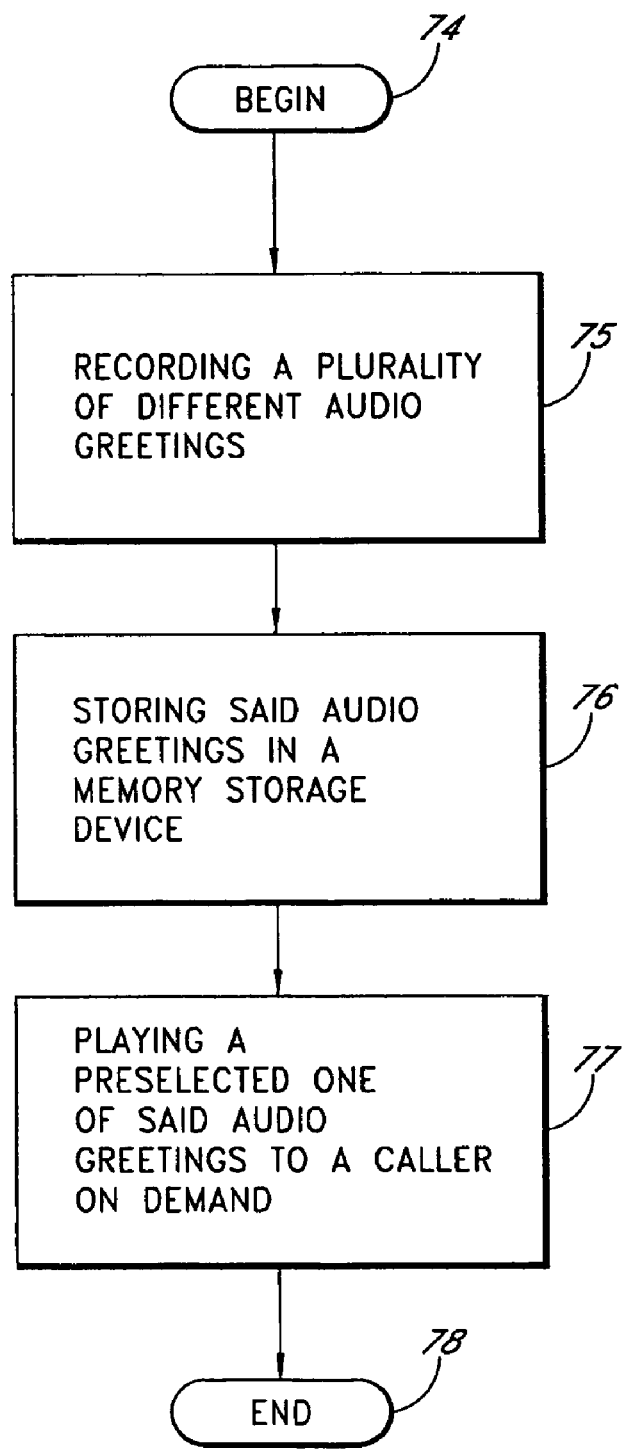
FIG. 10 is a sequence of steps in a flow chart.
Figure 11:
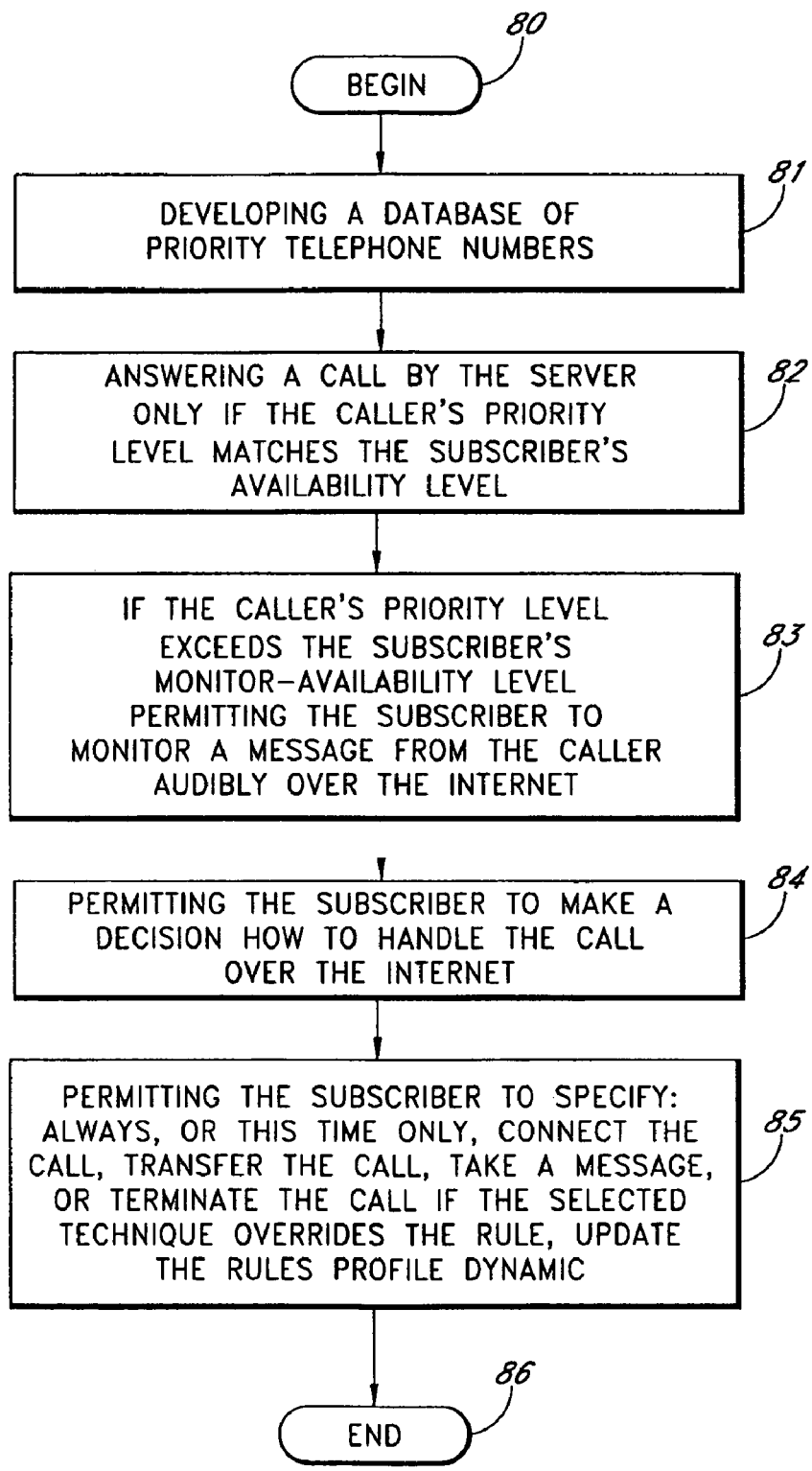
FIG. 11 is a flow chart for steps in deciding how the subscriber answers a call.

As has been indicated hereinbefore, an audible message from the caller may be played to the subscriber to aid him in making a decision for handling the call. However, the subscriber may also record messages, and these messages may be played to the caller as well. There may be a number of different messages depending upon the circumstances, and these may be selectively played as desired. Referring now to FIG. 10, there is shown a sequence of steps in a flow chart. Block 74 is "begin". Block 75 is "recording a plurality of different audio greetings". Block 76 is "storing said audio greetings in a memory storage device". Block 77 is "playing a preselected one of said audio greetings to a caller on demand". Block 78 is "end". Referring now to FIG. 11, this FIG. shows a flow chart for steps in deciding how the subscriber answers a call. The first block 80 is "begin". Block 81 is "developing a data base of important telephone numbers". Block 82 is "answering a call by the server only if the line is busy and the caller number is in the data base". Block 83 is "permitting the subscriber to monitor a message from the caller audibly over the Internet". Block 84 is "permitting the subscriber to make a decision how to handle the call over the Internet". Block 85 is "permitting the subscriber to specify: always, or this time only, connect the call, transfer the call, take a message, or terminate the call". Block 86 is "end".

Figure 12:
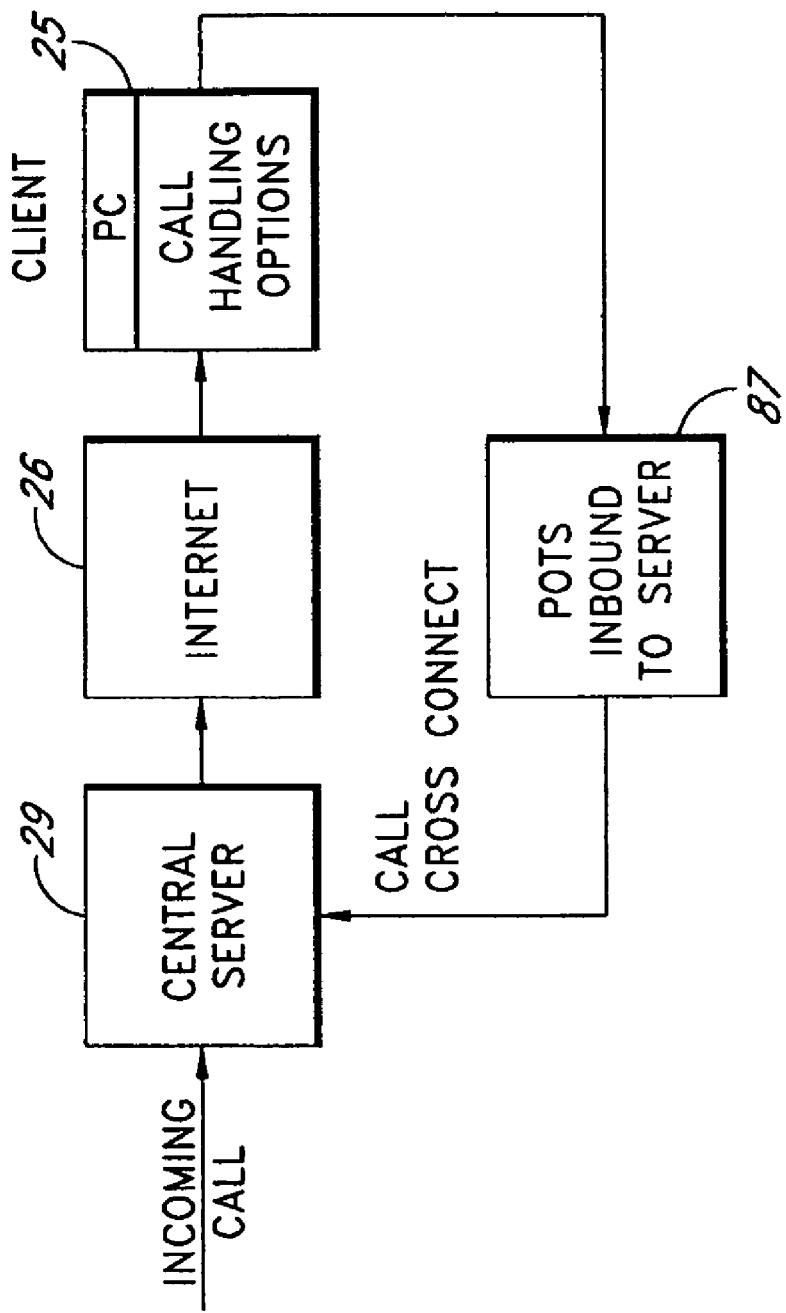
FIG. 12 illustrates calling back into the central server while an incoming call is being held at the server.

The client or subscriber has many ways to deal with an incoming call. He can elect not to answer and to take a message, or he can have the call played through the personal desktop computer 25 and talk to the caller via the Internet 26, or he can have the call transferred to a different instrument such as a second telephone 24 (FIG. 1) or a cell phone 45 (FIG. 5). There is another way for the subscriber to handle a call. While the central server 29 is holding the call, the client can pick up a cell phone or a regular POTS phone and call in to the central server 29 and have a call cross-connect right there. This is illustrated in FIG. 12. This FIG. illustrates an incoming call arriving at the central server 29. It is connected to the Internet 26 and to the client's personal desktop computer 25. Then, the client may elect to make a POTS inbound call to the server 87. This means, for example, picking up a cell phone or a regular POTS phone and dialing the number to the central server 29. At the central server 29, a call cross-connect is made, and the client can talk to the caller making the incoming call.

Figure 13:
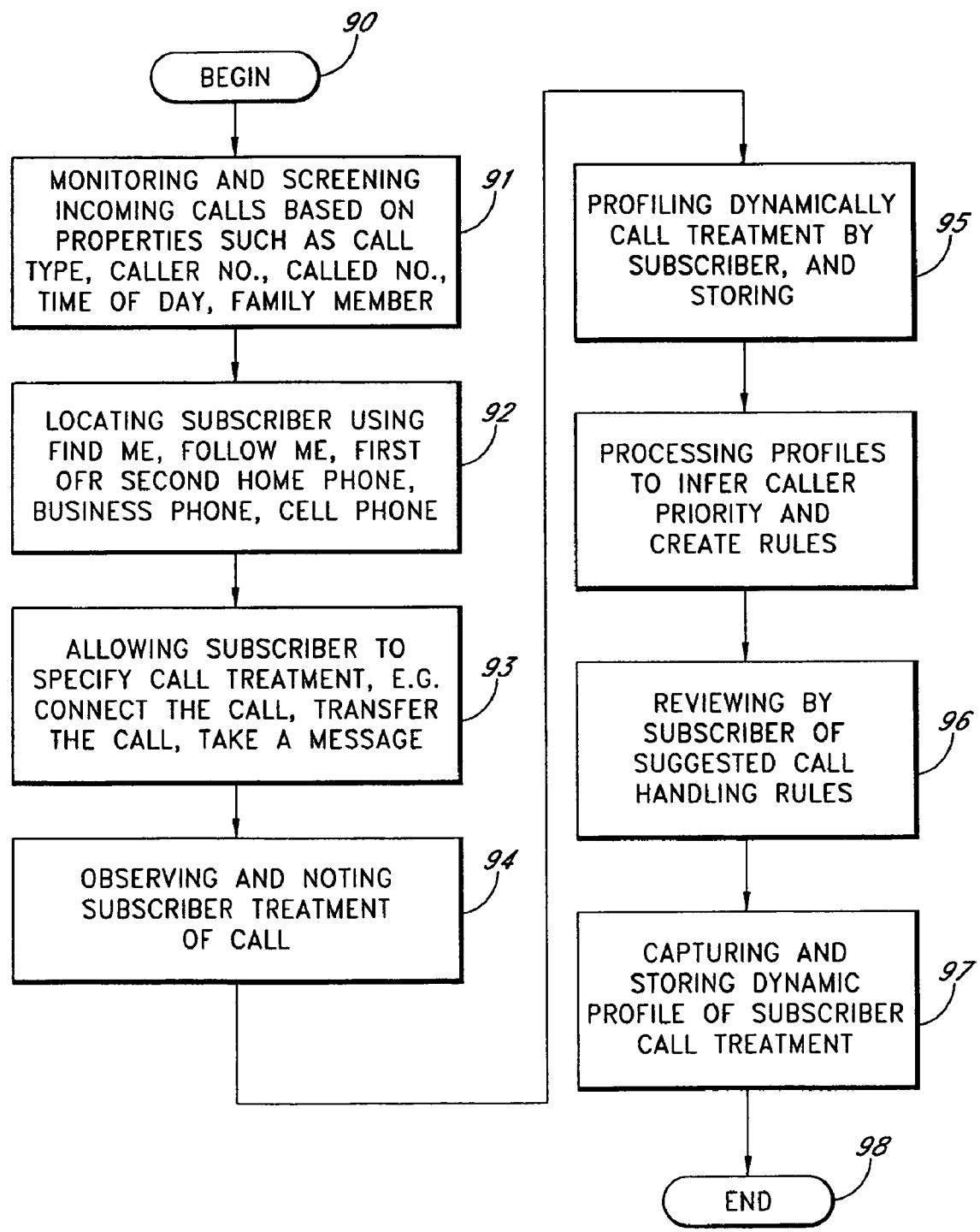
FIG. 13 is a sequence of steps in a method flow chart illustrating capturing the dynamic profile of a subscriber.

The central server 29 is able to capture and store the dynamic profile of the subscriber's rules for treatment of incoming calls. This is illustrated in FIG. 13. FIG. 13 is a sequence of steps in a method flow chart. Block 90 is "begin". Block 91 is "monitoring and screening incoming calls based on properties such as call type, caller number, called number, time of day, family member called". Block 92 is "locating subscriber using find me, follow me, first or second home phone, business phone, cell phone and various Internet devices". Block 93 is "allowing subscriber to specify call treatment, e.g., connect the call, transfer the call, take a message". Block 94 is "observing and noting subscriber treatment of call". Block 95 is "profiling dynamically call treatment by subscriber". Block 96 is "reviewing by subscriber of suggested call handling rules". The subscriber is not asked to enter his rules for handling calls but rather the subscriber is presented with rules determined implicitly by the central server 28. The subscriber then has an opportunity to approve or to reject the proposed rules. Block 97 is "capturing and storing dynamic profile of subscriber call treatment". This dynamic profile may be stored in the message store memory 33 of the central server 28. In addition an address book may be compiled at that same location so that if the subscriber wishes to place a call, or to return a call following a telephone message, it is easy to initiate using the numbers logged in the address book in the message store memory 33 of the central server 28. In FIG. 13, the last block 98 is "end".

The central server 28 of the system of the present invention gradually becomes more useful to the subscriber as it learns the subscriber's profile. This profiling also adds another dimension to the system of the present invention. This is an advertising or media dimension. The profiling creates a community of users. People that call each other on the telephone have a community of interests. Thus the profiling information that is stored becomes, in effect, a collaborative filter based on telephone numbers. Recording of calls made to other numbers indicates similar patterns of behavior. This is based on shared interests. Thus, this gradual interactive development of a profile based on decisions made by the client may be used for advertising purposes, if desired.

Figure 14:
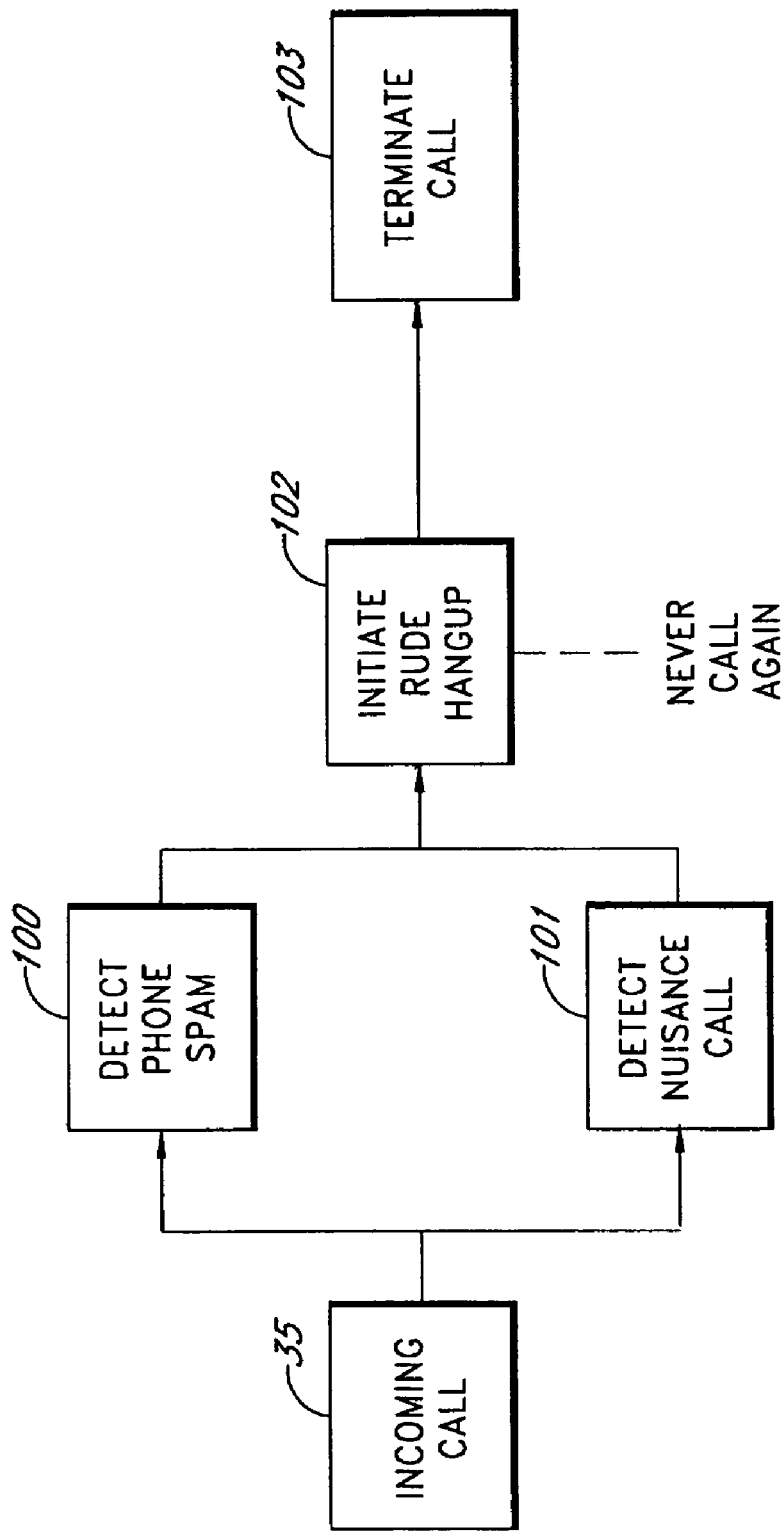
FIG. 14 is a schematic diagram indicating how the system can handle undesired incoming calls.

FIG. 14 is a schematic diagram indicating how the system can handle undesired incoming calls. At the left of FIG. 14 there is illustrated an incoming call 35. The call is coupled to a detector for detecting phone "spam" 100. The incoming call 35 is also connected to a detector for detecting nuisance calls 101. Both of these types of telephone calls are unsolicited, unwanted, and undesirable types of calls. When these types of calls are detected, they are forwarded to block 102 which initiates a "rude" hang-up. This type of hang-up would have an audible message to the caller saying something such as "never call again". Then, the signal is passed on to block 103 which terminates the call.

Figure 15:
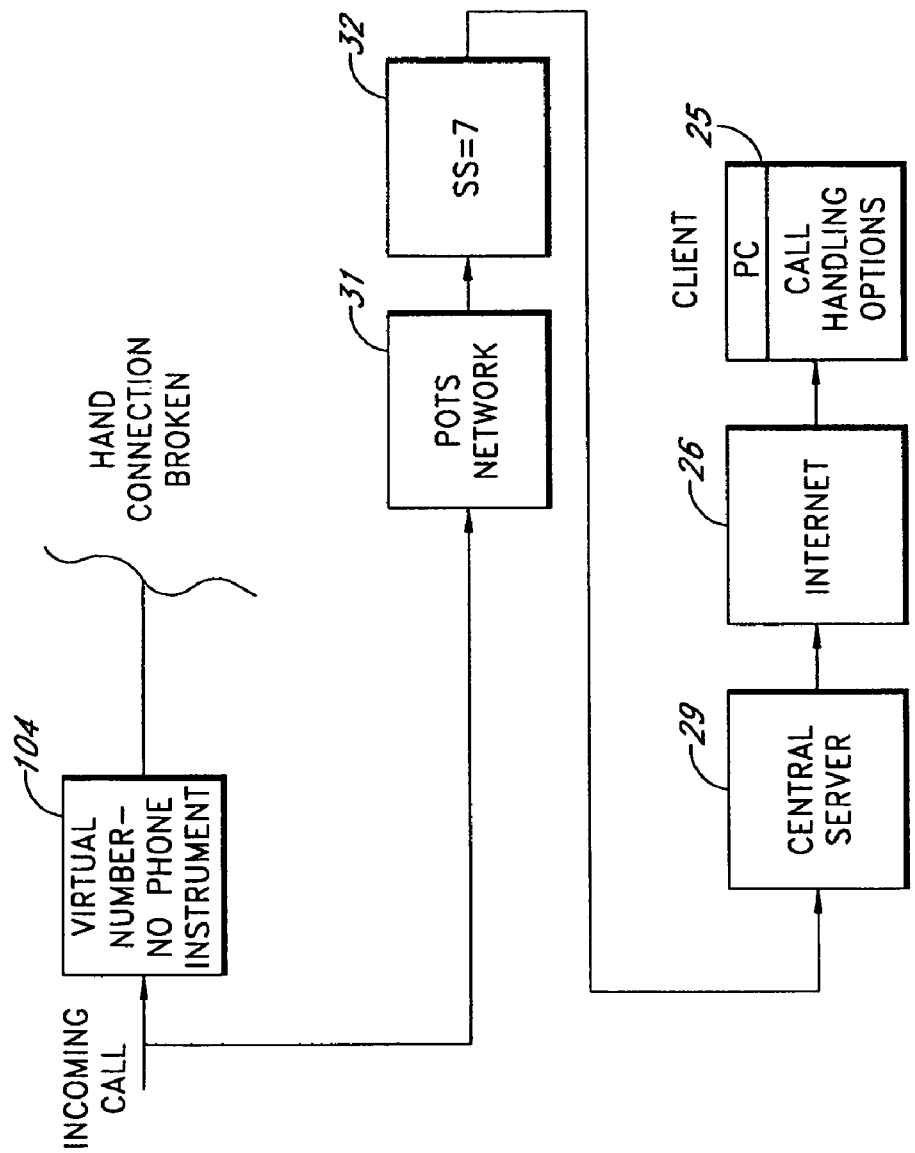
FIG. 15 is a schematic diagram illustrating a second embodiment of the call control system of the present invention.

Typically, the system only answers calls for the client when the client's telephone line is busy and he is logged on the Internet. However it can be arranged for the system to answer all of the client's incoming calls. This is illustrated in FIG. 15. FIG. 15 is a schematic diagram illustrating a second embodiment of the call control system of the present invention. In this embodiment of the invention, the hard connection from the POTS to the subscriber is broken. This is done by the central server system providing a virtual phone number to the client without providing a telephone instrument. This is illustrated in block 104. The virtual telephone number is given to the client who optionally uses it in his advertising so that all calls will be made to that number but in fact those calls will be intercepted by the system of the present invention.

Throughout the following description, the term "Web site" is used to refer to a user-accessible network site that implements the basic World Wide Web standards for the coding and transmission of hypertextual documents. These standards currently include HTML (the Hypertext Markup Language) and HTTP (the Hypertext Transfer Protocol). It should be understood that the term "site" is not intended to imply a single geographic location, as a Web or other network site can, for example, include multiple geographically distributed computer systems that are appropriately linked together. Furthermore, while the following description relates to an embodiment utilizing the Internet and related protocols, other networks, such as networked interactive televisions, and other protocols may be used as well. In addition, unless otherwise indicated, the functions described herein are preferably performed by executable code and instructions running on one or more general-purpose computers. However, the present invention can also be implemented using special purpose computers, state machines, and/or hardwired electronic circuits. In addition, a communications line is referred to as "busy" when the communication line is being utilized in such a way that a conventional incoming call will not be connected to the communications line. Thus, for example, if a user is utilizing a conventional line capable of only conducting one of a conventional voice session and a data session, but not both at the same time, for a data session, the line will be busy. With respect to the example processes disclosed herein, not all states need to be reached, and the states do not necessarily need to be performed in the same order as that illustrated. Unless otherwise specified, the term phone number refers generally to a telephonic address, such as, without limitation, a standard POTs telephone number, an E.164 phone number (ITU-T recommendation which defines the international public telecommunication numbering plan and telephone format used in the PSTN and certain data networks), or a VoIP address.

Figure 16:
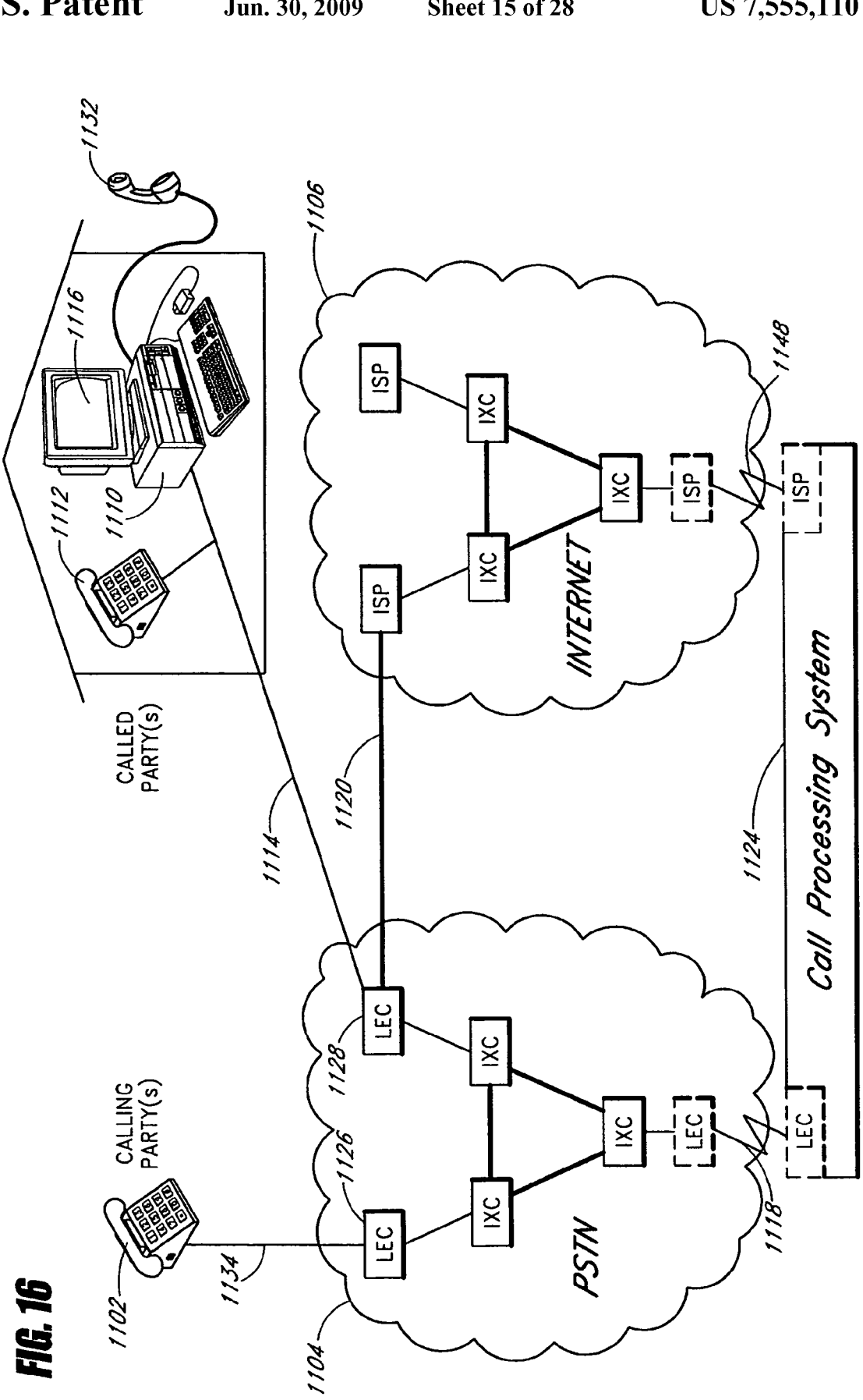
FIG. 16 illustrates an example telecommunications system that can be used in accordance with one embodiment of the present invention.

FIG. 16 illustrates an example telecommunications system that can be used in accordance with the present invention. As illustrated, the telecommunications system includes:
- a plurality of user telephone stations 1102, 1112.
- a plurality of user computer terminals 1110.
- a call processing system 1124 that acts as an Internet Answering Machine (IAM) system.

These devices are linked together using various line and trunk circuits to a Public Switched Network (PSTN) 1104 and to a common data network, such as the Internet 1106.

Figure 17:
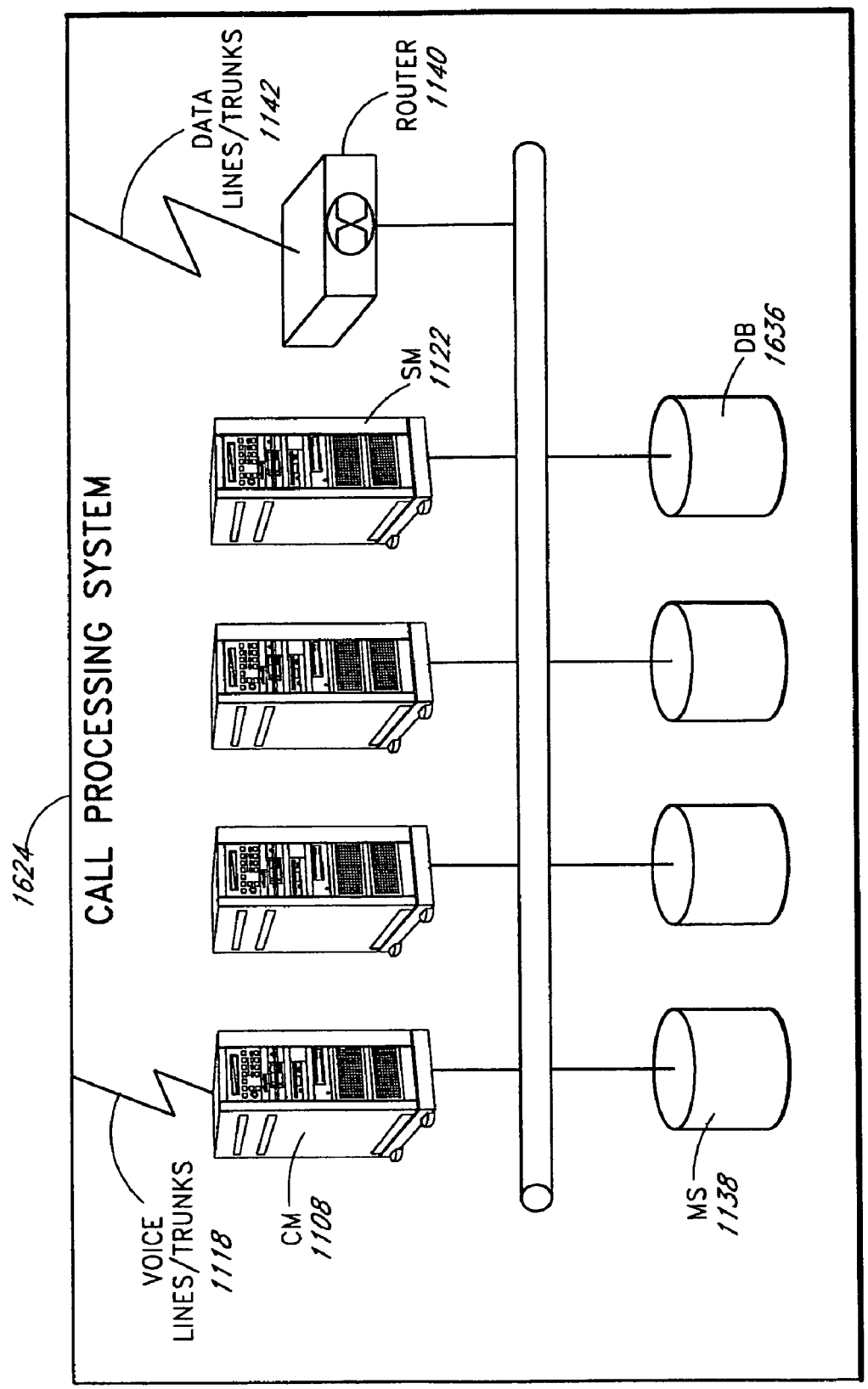
FIG. 17 further details the subsystems that comprise the IAM system depicted in FIG. 16 described above.

FIG. 17 further decomposes the IAM system 1124 into its functional components:
- a Call Management (CM) subsystem 1108, which serves as the interface to the PSTN 1104 to manage inbound and outbound telephone calls.
- a Router subsystem 1140, which serves as the interface to the Internet 1106 to manage communications between online IP client devices and the various IAM servers.
- an online presence detection Internet Session Management (SM) subsystem 1122, which monitors the status of subscriber data terminals to determine availability for call handling services.
- a shared Media Storage (MS) subsystem 1138, which persistently archives the caller's voice messages and the called party/subscriber's personal greeting(s).
- an IAM Database (DB) subsystem 1136 in which called party/subscriber IAM service parameters are stored.

These various subsystems are interconnected via a Local Area Network (LAN) and/or via a Wide Area Network (WAN). CallWave, Inc. operates one such IAM system. As is well known in the field of Internet telecommunications, an IAM service works with the "Call Forward On Busy" feature of a standard phone line to answer calls while the subscriber is online and is using the phone line to access the Internet. Once activated, callers no longer get annoying busy signals when the subscriber is online. Instead, callers hear a brief greeting after which they can leave a short message. The recording can be streamed in substantially real-time or sent to the subscriber over the Internet within seconds after the recording has completed. Just like a home telephone answering machine, the subscriber can elect to interact with the caller while they are still on the line or can call them back at a later time.

Referring back to FIG. 16, the user telephone stations 1102, 1112 are respectively connected to local exchange switches 1126, 1128 via telephone lines 134, 1114. The stations 1102, 1112 can optionally be conventional POTS (Plain Old Telephone Service) telephones or local extensions behind a corporate Private Branch Exchange (PBX), or can be wireless cellular phones connected via a cellular or other wireless network.

The telephone stations 1102, 1112 can be coupled to the same switch or different switches. If the telephone stations 1102, 1112 are coupled to the same switch, the switch will be local to both the calling and called parties, such as for intra-LATA or local calls. If telephone stations 1102, 1112 are coupled to different switches, each switch may be local only to one of the parties, as is the case for non-local calls such as inter-LATA (long-distance) calls. The PSTN can be configured to handle mobile, wireless stations via wireless communications towers configured to broadcast and receive cellular radio frequency communications. The wireless towers can be, for example and without limitation, CDMA or GSM cellular mobile base stations.

In the illustrated embodiment, the CM subsystem 1108 is coupled into the PSTN 1104 through voice trunk circuits 1118 directly interfacing with the Inter Exchange Carrier's (IXC) circuit switched or packet switched telephony network. Thus, advantageously the IAM system 1124 does not have to be directly serviced by the same Local Exchange Carrier's (LEC) switch or PBX as the calling or called terminals 1102 and 1112. Indeed, the IAM system 1124 or its individual subsystem components can be located in a different country than the called and calling parties. In this instance, the IAM system 1124 is optionally configured as, or to appear as, a telephone end office and can interface with the PSTN 1104 as a Class 5 switch. In other embodiments, the IAM system 1124 is locally attached to a LEC switch with a physical line or local trunk interface circuit. This switch may or may not be serving telephone stations 1102 and/or 1112.

The IAM voice trunk circuits 1118 are not limited to a particular signaling convention. For example, the present invention can be utilized with a Common Channel Signaling system, such as Signaling System 7 (SS7), having separate voice/user data and signaling channels. In addition, the present invention can be used with other signaling methods, such as the following trunk-side signaling interfaces: ISDN-PRI; Advanced Intelligent Network; and/or Service Node architectures. Preferably, the selected signaling system provides a suite of call presentation information to the IAM system 1124, including one or more of:

ANI—Automatic Number Identification: phone number and privacy indicator of the calling party ("Caller-ID").

DNIS—Dialed Number Identification: phone number of the IAM system's voice trunks 1118 that the call was forwarded to.

OCN—Original Called Number Identification: phone number of the original called party (subscriber to the IAM service).

Call Type—Forwarded call due to a BCF, RNA, or DND/CFA condition. In addition, directly dialed inbound calls can be handled as well. In this instance, the caller will be required to implement a second stage of dialing to enter the subscriber's phone number or the subscriber could be assigned a unique personal number that is directly dialed by their callers.

The telephone lines 134, 1114 may be shared with one or more computer terminals. For example, telephone terminal 1112 shares the telephone line 1114 with a computer terminal 1110. While in the illustrated example the computer terminal 1110 is a personal computer, the computer terminal 1110 can be an interactive television, a networked-enabled personal digital assistant (PDA), other IP (Internet Protocol) device, or the like. Alternatively, the computer terminal 1110 can be a personal computer having a monitor, keyboard, a mouse, a disk drive, sound card or similar sound reproduction circuitry such as a codec, streaming media playback software, such as the Media Player program available from Microsoft, speakers, and a modem, such as a standard V.90 56K dial-up modem. The modem can optionally be configured to dial-up a number under control of an application, such as a contact manager application or telecommunications client application phone dialer, stored and executing on the computer terminal 1110.

The telephone line 1114, can be used to establish a dial-up connection for computer terminals, such as terminal 1110 via the computer modem, to an Internet Service Provider (ISP) offering dial-in remote access service connections from the PSTN 1104 via trunk interface circuits 1120. The computer terminal 1110 can also be connected to the Internet 1106 via a broadband connection, such as a DSL line, a television cable line, or a T1 line.

In addition, the computer terminal 1110 can be equipped with a Voice over Internet Protocol (VoIP) software module and a headset or a handset 1132, including a microphone and speaker, allowing voice communications to be conducted over a computer network, such as the Internet 1106. VoIP communicates information via packet switching, which opens a connection just long enough to send a small packet of data. Each packet includes a destination address informing the network where to send the packet along with the actual voice data payload. If the receiving station is also a VoIP terminal, then when the receiving terminal receives the packets, VoIP software executing on the receiving terminal reassembles the packets into the original data stream. The data stream is then converted to a voice signal. If the receiving station is a conventional telephone, then a VoIP gateway converts the packets into a voice signal that is then connected to the PSTN 1104.

In one embodiment, the VoIP process is performed using the H.323 standardized protocol established by the International Telecommunications Union (ITU). Advantageously, H.323 provides specifications for real-time, interactive videoconferencing, data sharing and audio applications such as IP telephony. Alternatively, the Session Initiation Protocol (SIP), established by the Internet Engineering Task Force (IETF), can be used. SIP is generally more efficient than the H.323 protocol as SIP is specifically intended for IP telephony. Alternatively, proprietary protocols could be deployed where multi-vendor interoperability is not required.

Optionally residing and executing on the computer terminal 1110 is a communications management Client application 1116. The Client application 1116 is used to provide enhanced communication services, as discussed in greater detail below. The Client application 1116 is connected to and communicates with the IAM system 1124 via the Internet 1106, other public wide area computer networks, or the like.

The IAM system 1124 optionally hosts a Web site used by subscribers of the IAM service to setup and manage their accounts, to view information about incoming calls, and to instruct the IAM system 1124 on how to route incoming calls to one or more destination stations. Many of these same functions can be implemented by the Client application 1116 as well.

The CM subsystem 1108 manages communications with the Client application 1116 and with forwarded calls. The CM subsystem 1108 can interact with callers and called parties through voice prompts, voice commands, and/or DTMF (dual tone multi frequency) touch-tone entries. The CM subsystem 1108 is optionally configured to perform additional functions, such as acting as a telephone answering system that answers calls, playing outgoing greetings and announcements, recording incoming messages, and bridging calls. In addition, as will be described in greater detail below, the CM subsystem 1108 further provides a call screening process.

The SM subsystem 1122 monitors the Internet for online IP devices registered to IAM subscribers to determine their availability for handling inbound call screening and call handling services. When a user or subscriber connects to the Internet using, for example, a dial-up ISP, the Client application 1116 executing on the subscriber's computer terminal 1110 makes the subscriber's online presence known to the IAM system 1124. Presence detection can be performed by the SM subsystem 1122 polling or pinging the computer terminal 1110 via the telecommunications Client application 1116, or by the telecommunications Client application 1116 transmitting a "Login/I'm alive" message and subsequent periodic "keep alive" messages to the SM subsystem 1122. Just prior to the normal termination of the online Internet session, the Client application 1116 sends a "Logout" message to the SM subsystem 1122. Abnormal Internet session termination conditions are detected by the SM subsystem 1122 timing out the expected Client "Keep alive" message.

If, rather than using a dial-up connection, the user or subscriber is using a broadband, always on-connection, such as via a DSL line or cable modem, the Client application 1116 becomes active when the computer 1110 is turned on or powered up and stays on until the user manually shuts down the Client application 1116, or the computer 1110 is turned off or powered down.

Figure 19A:
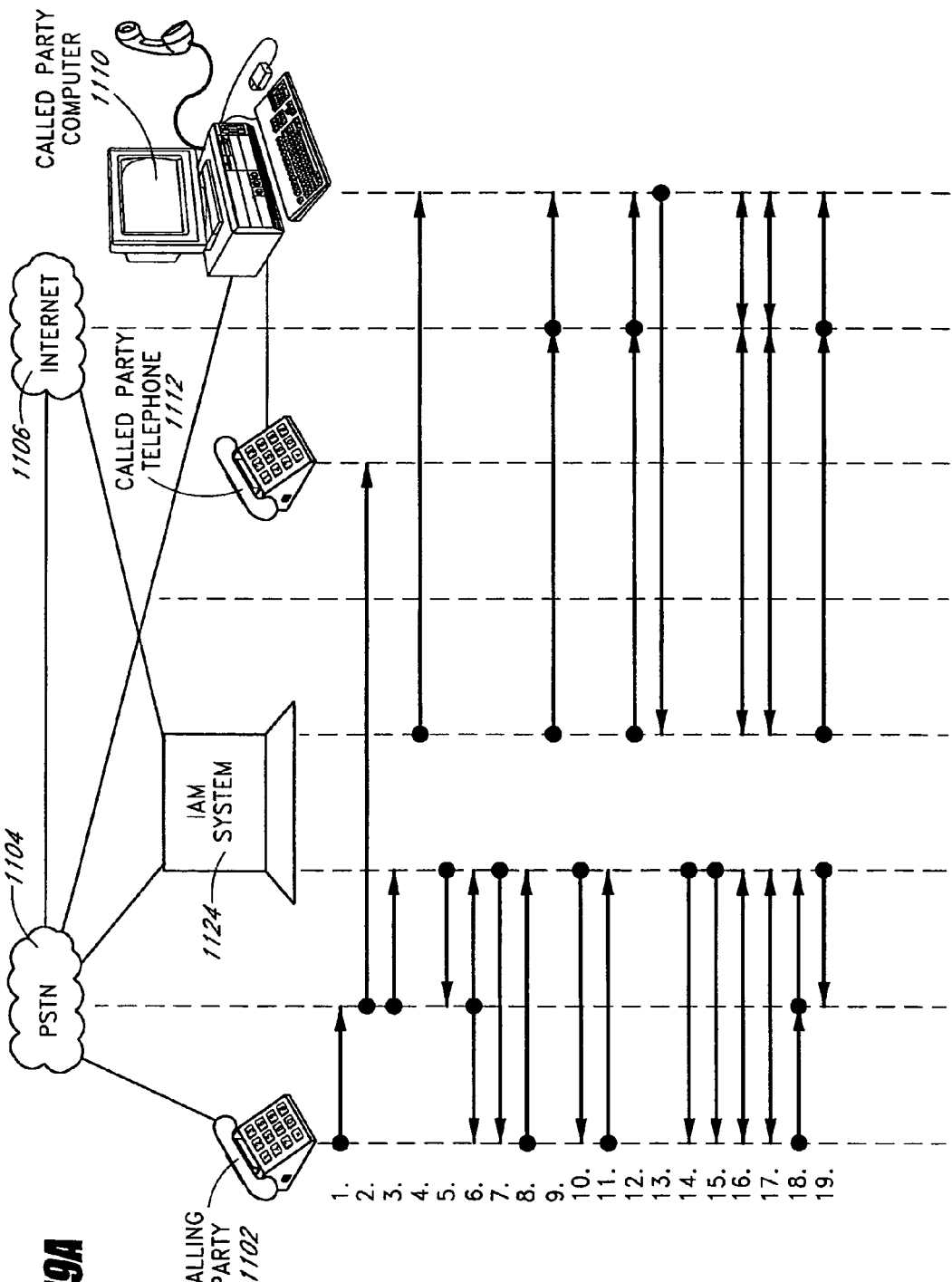

FIGS. 19A-19B illustrate one example embodiment of the present invention, including an abstraction of the previously described telecommunications system and an example call flow diagram. For clarity, the detailed breakout of the network elements and individual subsystems of the IAM system 1124 illustrated in FIGS. 16 and 17 are not shown in FIG. 19A. In this example, the calling party is associated with telephone terminal 1102 and the called party is associated with terminal 1112. In this embodiment, the called party is subscribed to an Internet call answering service that forwards calls to the remote IAM system 1124 upon the occurrence of selected conditions, wherein the IAM system 1124 transmits a notification to the called party regarding the call.

With reference to FIG. 16, the called party's station 1102 has been configured with the local switching system 1128 to forward calls on busy (BCF), ring-no-answer (RNA), or do-not-disturb (DND) to the voice trunk circuits 1118 connecting the CM subsystem 1108 to the PSTN 1104. The calling party initiates a call using the calling party telephone station 1102 by dialing the number of a called party's phone line 1114. The PSTN 1104 routes this call to the called party's local switching system 1128 causing the called party's telephone terminal 1112 to either ring or to forward the call immediately if the line 1114 is busy or set to do-not-disturb. If, for example, the called party does not answer within a certain amount of time or after a certain amount of rings, the associated switching system 1128 detects a no-answer condition and invokes a switch operation command termed "call forwarding on RNA". The call is then forwarded to a phone number of the CM subsystem 1108.

Based at least in part on the OCN of the forwarded call (i.e. the original called party's phone number), the CM subsystem 1108 queries the SM subsystem 1122 to determine whether the called party is a registered subscriber, is online or offline, and what the subscriber's call handling preferences are. If the called party's computer 1110 is online, the CM subsystem 1108 opens a communication channel over the public Internet 1106 to the Client application 1116 running on the called party's computer terminal 1110. The Caller-ID of the calling party, if available, and if not designated as private, is transmitted to the Client application 1116 and is displayed to the subscriber along with an optional sound notification. The sound notification can be in the form of ringing produced using the called party's computer terminal 1110 speakers.

The CM subsystem 1108 proceeds to play a greeting to the calling party. The greeting can be a "canned" greeting or a personalized greeting previously recorded by the subscriber and stored in the MS subsystem 1138. The CM subsystem 1108 records and stores the caller's message in the MS subsystem 1138, while simultaneously "streaming" the message speech through the opened Internet channel to the Client application 1116 on the called party's computer terminal 1110. The Client application 1116 uses the computer terminal's codec to play the streamed speech through the speakers on the called party's computer terminal 110, thereby allowing the called party to listen to and screen the call. Optionally, to prevent the calling party from hearing any sounds made by the called party during the screening process, the audio return path over the Internet channel to the CM subsystem 1108 is muted.

Figure 18:
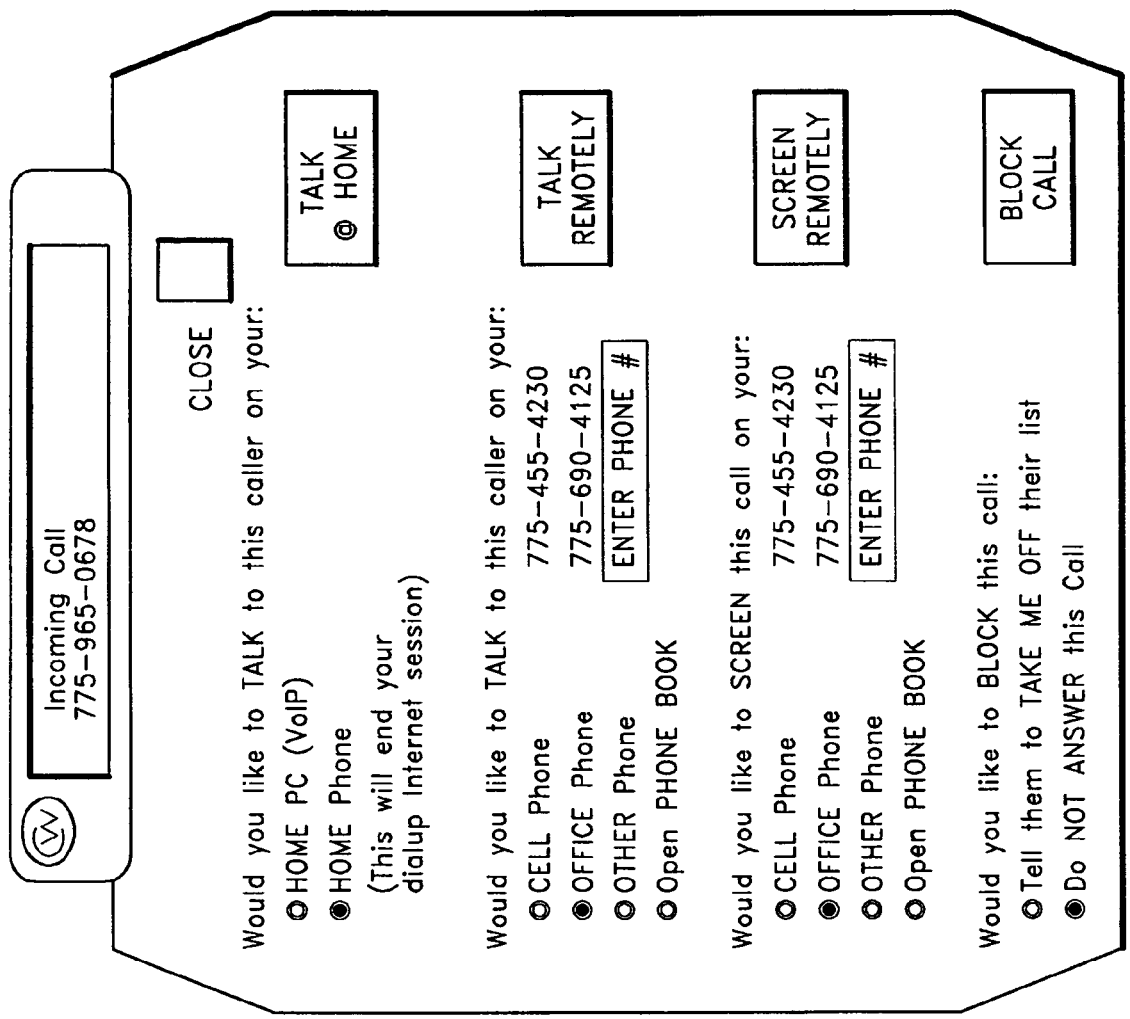
FIG. 18 displays an example menu of call screening/handling options available to the called party during the processing of the inbound call.

While monitoring the Caller-ID of the incoming call, via the Incoming Call field illustrated in FIG. 18 for example, and listening to the corresponding streaming message, the called party is presented with one or more of the following options (see FIG. 18 which depicts an example Client application popup dialog menu):

1. do nothing.
2. pickup (answer) the call to talk to the caller using a software telephone running on the "home PC" (the computer terminal 1110).
3. pickup (answer) the call to talk to the caller using the "home phone" on the phone line used to connect to the Internet (the user telephone station 1112).
4. pickup (answer) the call to talk to the caller after transferring the call to an alternate phone or to an alternate PC.
5. continue screening the call after transferring it to an alternate phone or to an alternate PC.
6. terminate the call substantially immediately—with a do not disturb message.
7. do not answer the call.

The called party may choose to ignore the incoming call. For example, the call may not have been urgent enough to interrupt what they are doing or the call may have been intended for another member of the household. Under option (1), the called party can close the call handling options dialog box illustrated in FIG. 18 using the "CLOSE" option, thereby informing the IAM system 1124 that no further instructions for caller interaction will be forthcoming. Alternatively, the called party, having screened the Caller-ID of the incoming call and/or the associated caller's message, can simply continue doing what they were doing before the call arrived. After the caller has left a complete message, as indicated by the caller terminating the call or after a predetermined recording time period, the IAM system 1124 downloads the recorded message to the subscriber's computer terminal 1110 and updates the Client application's call log, which lists the calls handled by the IAM system 1124 for the called party. The message is archived in the MS subsystem 1138 and is also available locally on the computer terminal 1110 for playback at the called party's convenience.

Under option (2), the called party may decide to pickup the call in progress to talk to the calling party using the computer terminal 1110. Having screened the call, the called party can signal the IAM system 1124 to indicate a desire to talk to the calling party using VoIP. For example, the called party can activate the "HOME PC (VoIP)" option displayed in FIG. 18. After the called party has selected option (2), the Client application 1116 sends an instruction by way of an Internet-based client/server control message to the IAM system 1124. Upon receiving the instruction, the IAM system 1124 interrupts the recording and streaming process and plays a canned audio prompt to the calling party. The audio prompt can be, for example, "please hold while your call is being connected," followed by audible ringing. The IAM system 1124 then bridges, in full duplex mode, the inbound call from the calling party to the CM subsystem 1108 with the outbound VoIP call from the CM subsystem 1108 to the called party computer 1110.

The IAM system 1124 will stay bridged between the calling party and called party for the duration of the call and may respond to internal events or called party actions. For example, the IAM system 1124 can selectively interrupt the bridged call if a time limit is exceeded and play an announcement to notify the calling party and/or the called party that the call will be terminated shortly. The IAM system 1124 can also initiate or transmit a warning message directly to the Client application 1116 that then displays a visual notice regarding call termination or the like on the called party's computer terminal 1110.

FIGS. 19A-19B illustrate an example call process workflow that can be used when a called party is online and can answer screened calls via a VoIP session. In this example, after screening the call, the called party agrees to talk directly to the caller. Of course, after screening the call the called party could have elected to decline the call. With reference to FIGS. 19A-19B, at state 1401, the calling party phone 1102 (hereinafter, referred to as the "calling party") calls the called party phone line 1114 connected to the telephone 1112 and computer 1110. In this example, the computer 1110 is using the phone line 1114 to access the Internet; i.e. the computer is online and hence the phone line is busy.

At state 1402, the PSTN 1104 detects that the called party phone line 1114 is busy. At state 1403, in accordance with a call forwarding service, the PSTN 1104 forwards the call on busy to the IAM system 1124 via the voice trunk circuits 1118. At state 1404, the IAM system 1124 transmits an incoming call alert to the computer 1110 that is displayed to the called party by the Client application 1116. At the same time or shortly thereafter, at state 1405 the IAM system 1124 answers the forwarded incoming call. At state 1406, the PSTN 1104 establishes a full duplex, 2-way talk path with the calling party. At state 1407, the IAM system 1124 plays a greeting to the calling party. At state 1408, the calling party optionally begins leaving a voice message that is recorded by the IAM system 1124. Alternatively, similar to a telephone answering machine, the calling party can begin speaking to the called party even while the IAM system 1124 is playing the greeting. At state 1409 the IAM system 1124 begins streaming the message being left by the calling party in substantially real-time to the Client application 1116 or other media player executing on the computer 1110, which then plays the message to the called party.

At state 1410 of FIGS. 19A-19B, the IAM system 1124 generates a tone or other audio signal to indicate to the calling party that the calling party should begin recording a message. At state 1411, the calling party begins leaving a voice message. At state 1412, the IAM system 1124 begins streaming the message being left by the calling party in substantially real-time to the Client application 1116 or other media player executing on the computer 1110, which plays the message to the called party.

At state 1413, the called party notifies the IAM system 1124 that the called party wants to take the call. At state 1414, the IAM system 1124 interrupts the calling party, via a tone or voice notification. At state 1415, the IAM system 1124 requests that the calling party hold or wait while the IAM system 1124 connects the calling party to the called party. At state 1416, the IAM system 1124 bridges the calling party with the called party computer 1110, via the VoIP software module 1130, by establishing a VoIP session. This entails bridging the two calls together through the IAM system so that the caller and the called party can converse (state 1417):

the inbound call from the calling party 1102 connected into the CM subsystem 1108 through the PSTN 1104; is bridged with the outbound call from the CM subsystem 1108 connected through the Router subsystem 1140 and the Internet 1106 to the VoIP session running on the subscriber's computer terminal 1110.

Either party can terminate the call at state 1418 by hanging up their telephone (calling party station set 1102, or the called party can terminate the VoIP session on the computer terminal 110). At state 1419, the IAM system 1124 releases the bridging resources and signals completion of the call by sending a corresponding control message to the called party which is either displayed or played to the called party via the Client application 1116.

In another embodiment, the SM subsystem 1122 detects the presence of the called party on different IP devices, such as other computers or web-enabled cellular phones, at other locations. For example, the session manager SM subsystem 1122 optionally interfaces with other instant messaging services, such as:

AOL®'s Instant Messenger™,
MSN®'s Instant Messenger™,
Yahoo!® Messenger,
ICQ where presence of the called party can be detected on other IP networks and at other geographic locations. The same call/session dialog described above is similarly performed in this embodiment.

Under option (3), the called party may decide to pickup the call in progress to talk to the calling party via a POTS telephone, such as the telephone terminal 1112. Having screened the call, the called party can signal the IAM system 1124 to indicate a desire to talk to the calling party. If the called party activates, by way of example, the "TALK@HOME" key illustrated in FIG. 18 with the Home Phone radio button depressed, the Client application 1116 sends an instruction to the IAM system 1124 and then substantially immediately terminates the called party's dial-up Internet session in order to make available the called party's phone line 1114. Upon receiving the instruction from the Client application 1116, the IAM system 1124 interrupts the recording and streaming process and plays a canned voice prompt, such as "please hold while your call is being connected," followed by audible ringing. The IAM system 1124 then proceeds to originate a new call on a free outbound voice trunk 1118 from the IAM system 1124 to the called party's phone line 1114. The call from the IAM system 1124 to the called party can be a local, intra-state, inter-state, or International PSTN call, as needed. Optionally, the call originated by the IAM system 1124 is to be jurisdictionally interstate so as to be rated and billed or charged as an interstate call. For example, in one embodiment, a six digit Information Element in the SS7 call setup message may be configured with the geographic area code and prefix of the Call Processing IAM System 1124 so as to cause the rating of the outgoing call to be Inter-state rather than Intra-state.

When the called party's phone line 1114 is answered a brief announcement is played to the called party and the IAM system 1124 then bridges, in full duplex mode, the inbound call between the calling party and IAM system 1124 with the outbound call between the IAM system 1124 and called party's line 1114.

In addition, the user can specify call handling rules that determine, at least in part, the call treatment for an incoming call based on one or more conditions. A rule can specify, for example, that if one or more conditions are met for a call, the call will be processing in accordance with a corresponding specified treatment. For example, the following conditions and automatic treatments can be defined:

Conditions:
Time-of-Day (can include a range of times), Day of Week (can include a range of days), Day of Year (holiday)
Calling Party Number (Caller ID, non-local area code, phone type, caller
name)
Called Party Number
Subscriber presence (IP device)
Telephony presence (phone)
Treatments:
Take a voice message (using selective greeting(s))
Take the call on home PC
Take the call on home phone
Take the call on work phone
Take the call on another phone
Remote screen on another phone(s) or other device(s)
Block call (for example, using an audio message, a SIT tone or the like)
Do not answer call
Multiparty conference By way of example, a subscriber can specify that if a call from a specified calling party number is received at a specified time of day (8:00-5:00), during the work week (Monday-Friday), the call should be forwarded to a specified phone, which can be the subscriber's work phone. By way of another example, a subscriber can specify that if a call to a specified phone number associated with the subscriber is received, on a holiday, remote screening should be performed using a different one of the subscriber's phone numbers.

If the call treatment specifies that the caller is to be connected to the subscriber using a given device, the subscriber can optionally still be provided with the ability to manually specify further call treatment, such as similarly described above. For example, the called party can be presented with one or more of the following options: take a voice message (using selective greeting(s)); take the call on home PC; take the call on home phone; take the call on office phone; take the call on another phone; remote screen on another phone(s) or other device(s); block call; do not answer call. Depending on the device the subscriber is currently using, the options can be provided via a visual menu, a voice menu, or the like.

Figure 20A:
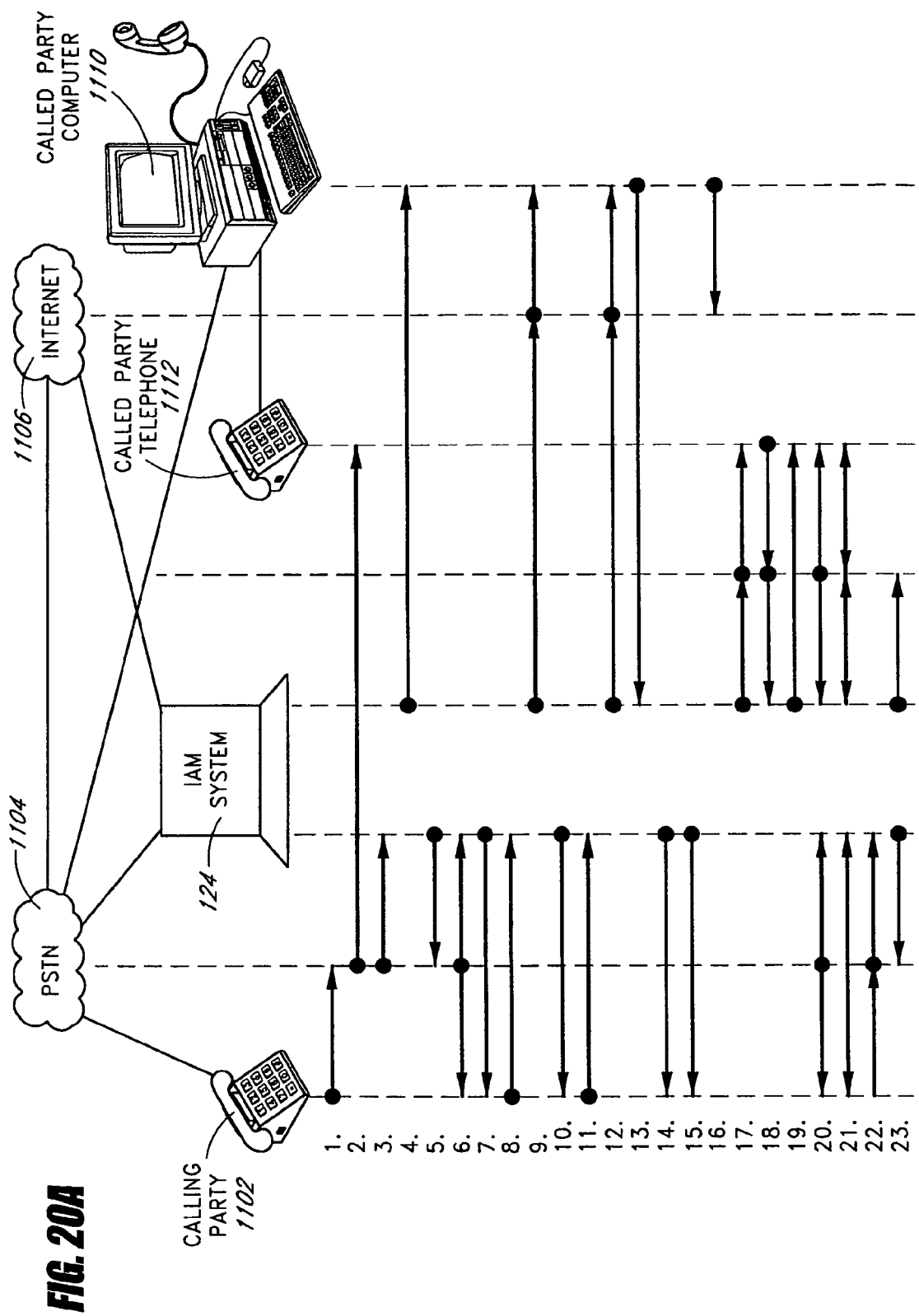

FIGS. 20A-20B illustrate an example call process workflow that can be used when a called party requests to interrupt the caller message and to talk to the caller using the home telephone. With reference to FIGS. 20A-20B, at state 1501, the calling party calls the called party phone line 1114 connected to the telephone 1112 and computer 1110. In this example, the computer 1110 is using the phone line 1114 to access the Internet or other computer network, and so is online. At state 1502, the PSTN 1104 detects that the called party phone line 1114 is busy. At state 1503, in accordance with a call forwarding service, the PSTN 1104 forwards the call on busy to the IAM system 1124 via the voice trunk circuits 1118. At state 1504, the IAM system 1124 transmits an incoming call alert to the computer 1110 that is displayed to the called party by the Client application 1116. At the same time or shortly thereafter, at state 1505 the IAM system 1124 answers the forwarded incoming call. At state 1506, the PSTN 1104 establishes a full duplex, 2-way talk path with the calling party. At state 1507, the IAM system 1124 plays a greeting to the calling party. At state 1508, the calling party optionally begins leaving a voice message that is recorded by the IAM system 1124. Once again, the calling party can begin speaking to the called party even while the IAM system 1124 is playing the greeting. At state 1509 the IAM system 1124 begins streaming the message being left by the calling party in substantially real-time to the Client application 1116 or other media player executing on the computer 110, that then plays the message to the called party.

At state 1510 of FIGS. 20A-20B, the IAM system 1124 generates a tone or audible signal to indicate to the calling party that the calling party should begin recording a message. At state 1511, the calling party begins leaving a voice message. At state 1512, the IAM system 1124 begins streaming the message being left by the calling party in substantially real-time to the Client application 1116 or other media player executing on the computer 110, which plays the message to the called party.

At state 1513, the called party notifies the IAM system 1124 that the called party wants to take the call via the home telephone 112, and the IAM system 1124 instructs the Client application 1116 to terminate the online session of the computer 1110 by disconnecting from the Internet 1106. At state 1514, the IAM system 1124 interrupts the calling party, via a tone or voice prompt. At state 1515, the IAM system 1124 requests that the calling party hold or wait while the IAM system 1124 connects the calling party to the called party. At state 1516, the Client application 1116 terminates the online session of the computer 1110 by disconnecting from the Internet 1106 thereby idling the called party's telephone line 1114. At state 1517, the IAM system 1124 initiates a new call to the called party phone 1112. At state 1518, the called party answers the new incoming call from the IAM system 1124. At state 1519, the IAM system 1124 generates a call announcement to the called and/or calling party. At state 1520, the IAM system 1124 bridges the call between the calling party phone 1102 and the called party phone 1112. The calling and called parties can now conduct a normal telephone conversation at state 1521. Again, either party can terminate the call by simply hanging up their telephone (state 1522). At state 1523, the IAM system 1124 then releases the bridging resources and terminates the remaining call by optionally notifying the calling/called party that the other party has hung up and then disconnecting the call.

Under option (4), the called party may decide to pickup the call in progress to talk to the calling party using a communications device other than the telephone terminal 1112 or the computer 1110. Having screened the call, the called party signals the IAM system 1124 by, for example, activating the "TALK REMOTELY" button option illustrated in FIG. 18, to indicate a desire to talk to the calling party. As similarly discussed above with respect to option (3), based on the called party selecting option (4), the Client application 1116 sends a corresponding instruction to the IAM system 1124 along with a specification of the desired destination station phone number. The destination number specification can be an index into the subscriber's electronic phone book or may literally be the desired destination phone number. For example, the called party can select via the "Would you like to TALK to this caller" option that the called party wants to talk to the calling party using the called party's cell phone, office phone, other phone, or at a phone associated with a phone number entered by the called party in the "ENTER PHONE #" field.

Upon receiving the instruction from the Client application 1116, the IAM system 1124 interrupts the recording and streaming process and plays a voice prompt to the caller. The IAM system 1124 then proceeds to originate a new call on a free outbound voice trunk circuit 1118. In contrast to option (3) described above, the Client application 1116 does not terminate the online Internet session of the subscriber's computer terminal 1110. In fact, the Client application 1116 may continue online call monitoring operation while the above described transferred call is in progress. Multiple subsequent inbound calls could be simultaneously handled in this manner.

By way of example and not limitation, the destination station of the outbound call from the IAM system 1124 can include:
  a wireless or cellular phone or device;
  a called party's phone line and/or extension at work;
  another POTS line of the called party (e.g. a second home phone number); or
  a neighbor's or friend's phone line.

In addition, the called party can optionally specify the destination station by manually entering a phone number while the call is being screened. This new entry could be automatically journaled in an electric phone book available to the Client application 1116 or an extension to the options menu could popup to query the subscriber to determine if this is desired. Alternatively, the called party selecting an existing entry from the phone book can optionally dynamically assign the destination station. The phone book entries can be persistently stored locally on the computer terminal 110, in a centralized medium like the IAM DB subsystem 1136, or in both.

Under option (5), the called party may decide to allow the call in progress to be remotely screened using a communications device other than the telephone terminal 1112 or the computer 1110. This can optionally be in addition to continued screening of this call on the subscriber's computer 1110 or instead of continued screening of this call on the subscriber's computer 1110. The called party signals the IAM system 1124, using the "SCREEN REMOTELY" option illustrated in FIG. 18, to indicate a desire to remotely screen the incoming call. Once again, as similarly discussed with respect to options (3) and (4) above, based on the called party selecting option (5), the Client application 1116 sends a corresponding instruction to the IAM system 1124 along with a specification of the desired destination phone number. The destination number selection and specification is identical to that utilized in option (4) above, however the Screen Remotely options are used, rather than the Talk Remotely options. For example, the called party can select via the "Would you like to SCREEN to this caller" option that the called party wants to screen the calling party using the called party's cell phone, office phone, other phone, or at a phone associated with a phone number entered by the called party in the "ENTER PHONE #" field.

Upon receipt of this instruction, the IAM system 1124 initiates an outbound call from the CM subsystem to the specified destination phone number. The call setup signaling information for this outbound call is modified by the IAM system 1124 to deliver the calling party number from the inbound call in the outbound call's ANI field. This allows the forwarded destination station to display the "original Caller-ID" to use as a first level filter for remotely screening the call. Should the remote called party decide to ignore this call, they simply do not answer it and the IAM system 1124 will abort the transferred call attempt after a programmable time interval or a programmable number of ring cycles.

If the remote called party answers the transferred call, the IAM system 1124 plays a brief greeting prompt to the remote party to announce the remote screening call in progress. The caller message streaming can start at the beginning of the recording or cut over to live recording in real time. The output talk path from the remote party back to the IAM system 1124 is active but is muted with respect to the original calling party call. This allows the remote party to monitor the inbound call without the original calling party knowing that they are doing so. If the remote party decides to pickup the call in progress to talk to the calling party, they instruct the IAM system 1124 to bridge the two calls together by depressing a DTMF key or by uttering a voice command. Upon receiving this instruction, the IAM system 1124 interrupts the recording and streaming process and plays a canned audio prompt to the calling party. Once again, the audio prompt can be, for example, "please hold while your call is being connected," followed by audible ringing. The IAM system 1124 then bridges, in full duplex mode, the inbound call from the calling party to the CM subsystem 1108 with the outbound call from the CM subsystem 1108 to the remote called party station.

Once again, the IAM system 1124 will stay bridged between the calling party and remote called party for the duration of the call and may respond to internal events or called party actions. For example, the IAM system 1124 can selectively interrupt the bridged call if a time limit is exceeded and play an announcement to notify the calling party and/or the remote called party that the call will be terminated shortly. The IAM system 1124 can also transmit a warning message (such as a short text message) over the Internet 1106 to the remote station set that then displays a visual notice regarding call termination or the like.

Under option (6), the called party may decide to not accept calls from the calling party. Having screened the call, the called party can signal the IAM system 1124 to abort the caller's message recording and to communicate the request to not be called in the future. For example, the called party can activate the "BLOCK CALL" option illustrated in FIG. 18. The called party can either select a do not answer option or a "Tell them to TAKE ME OFF their list" option. As in the cases above, based on a user action the Client application 1116 sends a corresponding instruction to the IAM system 1124. Upon receiving the "Tell them to TAKE ME OFF their list" instruction from the Client application 1116, the IAM system 1124 interrupts the recording and streaming process, plays a voice prompt to the caller, such as: "The person you have called does not accept solicitations, please remove this phone number from your calling list. Thank you and goodbye." The IAM system 1124 then disconnects the call. The options dialog box could pop an additional query to determine if the subscriber would like the IAM system 1124 to always apply this treatment to future calls from this Calling phone number. This automatic call handling rule would be stored in a table of subscriber preference settings local to the IAM system 1124 (for example in a simple extension table of the subscriber's phone book). If directed to do so, the IAM system 1124 would automatically screen-out future calls from this caller and not "bother" the subscriber with needing to handle them.

Option (7) is a variant of option (6). The called party can monitor the Caller-ID of the incoming call and decide to not accept calls from this calling party. The IAM system 1124 could be optionally configured to delay answering the incoming call for a fixed time interval or for a specific number of ring cycles in order to allow the subscriber time to review the Caller-ID. If the Client application 1116 instructs the IAM system 1124 to block the call in this manner before the incoming call has been answered, the IAM system 1124 will ignore the call (i.e. let it ring). If the Client application 1116 instruction comes after the incoming call has been answered, the IAM system 1124 will apply the call treatment described above for option (6). Alternatively, the IAM system 1124 could be configured to instead default to a standard Internet answering call when the Client application 1116 instruction comes after the incoming call has already been answered. Once again, the options dialog box could pop an additional query to determine if the subscriber would like the IAM system 1124 to always apply this treatment to future calls from this Calling phone number. Again, these automatic call handling rules would be stored in the IAM system 1124 and, when directed to do so, the IAM system 1124 would automatically screen-out future calls from this caller and not "bother" the subscriber with needing to handle them.

The above scenarios describe situations in which the called party's computer 1110 is on-line and serves as the initial IAM call screening device. Alternatively, the IAM system 1124 could be configured to automatically forward the call notification announcement and streamed caller message to an alternate device such as a POTS or wireless telephone or another online IP device. This alternative call screening device selection could be configured to vary based on the availability of the online presence of the called party's computer 1110 or alternate IP devices, on the Caller-ID of the calling party 1102, on the dialed number for the Called party 112, on the reason that the call was directed to the IAM system 1124 (for example, call forwarding on busy, ring-no-answer, or do-not-disturb conditions), on time of day, day of week, etc. Configuration rules governing the automatic call handling treatment can be stored in the IAM DB subsystem 1136.

The following process describes a typical IAM call screening scenario when the called party's computer 1110 is offline. When the called number forwards on busy, ring-no-answer, or do-not-disturb, and arrives on one of the IAM voice trunks 1118 along with the signaling information, the CM subsystem queries the SM subsystem 1122 and/or the IAM DB subsystem 1136 using the incoming call's OCN (the original called party number) to determine that the call is for a registered subscriber, to determine the subscriber's online/offline presence status, and to retrieve that subscriber's call handling preference rules. Assuming that the subscriber has previously configured the account to handle diverted offline calls, the IAM system carries out the specified call handling treatment. This could be simply to answer the call and take a message.

Alternatively, it could include one of the seven call management options previously described. For example, the subscriber may have specified that automatic remote call screening on their cell phone was desired when their home computer 1110 was not online. In this case, the CM subsystem 1108 originates another call to the destination device, based on the previously described configuration rules. Additionally, the CM subsystem 1108 may optionally delay answering the incoming calling party's call for a predetermined amount of time or number of rings. This gives the called party additional time to answer the call originated from the CM subsystem 1108.

Normally, when the IAM system 1124 originates a call, the calling party ID passed in the SS7 and/or ISDN-PRI trunk signaling is the calling party ID of the trunks originating the call. In one embodiment, the CM subsystem 1108 modifies the network signaling to replace the calling party ID of the trunks to be that of the phone number of the original calling party. Thus, a Caller-ID device will advantageously display the phone number of the original calling party. The call is processed in an analogous above described fashion for handling a remote screening call forwarded by the subscriber from the online computer 1110 to a wireless station. If the called party answers the call, the IAM system 1124 plays a brief announcement of the call to the subscriber and the inbound call is answered by the IAM system 1124 (if not already answered due to timeout reasons). For example, the CM subsystem 1108 might announce the call as "This is an Internet Answering Machine call for John Doe". The IAM system 1124 then bridges the inbound calling party call with the outbound called party call. The IAM system 1124 optionally mutes the return talk path to prevent sound traveling back to the calling party so that the calling party is unaware that their call is being screened. Preferably, though not required, the called party is bridged onto the call as the called party is either listening to a personal/system greeting or, as the calling party is beginning to leave a message for the called party. In this manner, the called party can further screen the call.

Once the called party begins to screen the call, the called party may decide not to connect to the calling party. The called party, having screened the caller who is in the process of leaving a message, can hang up, thereby terminating the bridged call without the calling party being aware that the screening process took place. The calling party can continue to leave a message for the called party after the bridged call is terminated. Alternatively, the called party may decide to pickup the incoming call to talk to the calling party. Having screened the calling party, the called party can signal the CM subsystem 1108, by entering a touch-tone signal or providing a voice command, to indicate a desire to talk to the calling party. The IAM system 1124 will then bridge in full duplex mode the call between the calling party and CM subsystem 1108 with the call between the CM subsystem 1108 and called party.

The IAM system 1124 will stay bridged between the calling party and called party. The IAM system 1124 can selectively interrupt the bridged call if a predetermined time limit is reached and play an announcement to the calling and/or the called party that the call will be terminated shortly. Optionally, this announcement will only be played to the called party. In another case, the IAM system 1124 can selectively interrupt the bridged calls to announce to the called party that the call will be terminating unless the called party authorizes billing by entering a touch-tone command or by providing a verbal authorization to charge the called party's telephone number or a credit card.

In another embodiment, an external bridging system (hardware and/or software), including a connecting switch, is used to bridge calls. The CM subsystem 1108 can instruct the connecting switch located within the PSTN 1104 equipped with the call bridging system to create a 3-party conference call between the calling party, the called party, and the IAM system. This process advantageously reduces the number of voice ports needed on the IAM system 1124. In this scenario, the called party can optionally signal the switch with touch-tone or voice commands to cause the IAM system 1124 to connect back into the bridged call.

The example embodiments described above referred to calls forwarded from a called party's line. Another embodiment uses a personal number uniquely assigned to each subscriber by which calls to that number can be screened. The personal number can be, for example a telephone number that has been acquired through governmental telephone number administration bodies, provisioned in the PSTN network, assigned to the IAM system 1124 and registered to an individual subscriber.

The personal number call screening process will now be described. A calling party 1102 at a phone dials a phone number published by a subscriber to the IAM system 1124. The call routes through the PSTN 1104 and terminates on the IAM voice trunk 1118 along with its associated call signaling information. Thus, for example, rather than using an existing wireless or POTs phone number, a subscriber can publish a private phone number, wherein all calls to the private phone number undergo an automatic screening process, as previously described. This technique enables the subscriber to better manage their incoming call costs.

Using the called party personal phone number or normal phone number as a search key or index, the IAM system 1124 extracts or retrieves call treatment actions and conditions stored in association with the called party personal number or normal phone number. The call treatment conditions and actions can include some or all of those described above. For example, the conditions can include one or more of:

Time-of-Day (can include a range of times), Day of Week (can include a range of days), Day of Year (holiday)
    Calling Party Number (Caller ID, non-local area code, phone type, caller name)
    Called Party Number
    Subscriber presence (IP device)
    Telephony presence (phone)

The call treatments can include one or more of:

Take a voice message (using selective greeting(s))
    Take the call on computer
    Take the call on POTS phone (specify home, work, other POTS phone)
    Take the call on a wireless phone
    Remote screen on another phone(s) or other device(s)
    Block call (for example, using an audio message, a SIT tone or the like)
    Do not answer call
    Multiparty conference The following is a more detailed description of example call treatment actions that can be executed or orchestrated by the IAM system 1124:

Do not answer action: the incoming calling party phone number is screened against a list of phone numbers or subscriber-specified other criteria (such as no caller id available), wherein if the calling phone number matches the listed phone numbers and/or the other criteria, the incoming call is not answered;

Take call on computer (online/offline status action): if the called party is online when a call is received, initiate a VoIP session with the Client application 1116 running on the subscriber's IP device 1110 and screen the call as described above;

Take the call on POTS phone action: originate a call to a specified POTS line and bridge the POTS call with remote screening as described above;

Take the call on POTS phone action: originate a call to a wireless phone action and bridge the wireless call with remote screening as described above; or multi-party conference action: in which the call screening session described above is broadcast to multiple phones and IP Clients substantially at the same time.

In one embodiment, the multi-party conference action can include the following states. A first call processing apparatus, such as the IAM system 1124, receives a call from a first user for a second user. A voice communication from the first user is received at the first call processing apparatus. At least a portion of the voice communication is multicasted to a plurality of client devices, which can include for example POTs, wireless, cellular and/or VoIP phone devices, at substantially the same time so that the first user's call can be screened. An instruction is received via a first of the plurality of client devices to connect the first user to a first of the plurality of client devices. The second user is then bridged to the first of the plurality of client devices.

In another embodiment, the multi-party conference action can include the following states. A first call processing apparatus, such as the IAM system 1124, receives a call from a first user for a second user. A call alert is then multicasted to a plurality of client devices, which can include for example POTs, wireless, cellular and/or VoIP phone devices, at substantially the same time so that the first user's call can be screened. In addition, a voice communication received from the first user can be multicasted to the plurality of client devices at substantially the same time. The call alert can include at least a portion of Caller ID information associated with the first call. An instruction can then be received via a first of the plurality of client devices to connect the first user to a first of the plurality of client devices. The second user's call is then bridged to the first of the plurality of client devices.

Still another embodiment of a call transfer process will now be described. By way of example, a call can be received from a caller for a called party at the call processing system, such as, by way of example, the call processing system 1124. The call may have been placed by the caller to a virtual telephone line or a number associated with the called party, wherein when a call is placed to that number, the call is connected to the call processing system. The call may also have been placed to a phone associated with the called party, and the call may have been forwarded as a result of a call forwarding on busy, a call forwarding on ring-no-answer, or a call-forward-all calls (sometimes called do-not-disturb) condition. Upon receiving the call, the call processing system can automatically transfer or connect the call, via a call bridging operation or otherwise, to a first target phone, such as a wireless, VoIP, or landline POTS phone, associated with the called party. The transfer can optionally be initiated based at least in part on a prior instruction from the called party stored in computer readable memory, such as in an account database record.

In addition, a caller identifier can optionally be provided to the called party via the first phone. For example, as similarly described above, if the first phone is a wireless phone, POTS phone, or other phone capable of displaying Caller ID information, the caller identification can be provided via the ANI field as a phone number to be presented on a display associated with the phone. The called party can optionally use the identification information to screen the call.

To further allow the called party to screen the call, the call processing system can play a greeting to the caller and ask the caller to leave a message. The call processing system can play a greeting prompt to the called party to announce the remote screening call in progress. The caller message can be streamed to the called party's first phone. Optionally, the output talk path from the remote called party back to the call processing system is active but the output talk path is muted with respect to the original calling party call. This allows the called party to monitor the inbound call without the calling party knowing that they are doing so.

In addition, the called party can, via a phone key press, voice commands, or otherwise, instruct the call processing system to accept the call or to forward or bridge the caller's call to another target/second phone, such as a POTs phone, a wireless phone, a VoIP phone, a networked computer, or other communication device. Optionally, the called party can specify whether the call is to be transferred with supervision, wherein the call processing system will maintain the outcall to the first phone until the new target phone is answered, or without supervision, wherein the outcall to the first phone is terminated even before the new target phone is answered.

Further, the called party can specify whether the call should be transferred with call screening or without call screening. Optionally, the called party can set defaults with respect to supervision and call screening, wherein the default can be stored on the call processing system or in other computer readable memory. For example, the called party can set the defaults by configuring the called party's account. Then, further manual and/or auto-transfer call processes can be performed in conformance with the supervision and/or call screening defaults.

An example call transfer process will now be described. After receiving a call intended for a called party, the call processing system can place an outcall to a telephone associated with the called party, and can play a message or prompt to the called party, instructing the caller as follows: "You have a call, press the 1 button to accept the call (on the current telephone), the 2 button to have the call connected to your home phone without screening, the 3 button to have the call connected to your home phone with screening, the 4 button to have the call connected to your work phone without screening, the 5 button to have the call connected to your work phone with screening, the 6 button to connect the call to your VoIP phone without screening, the 7 button to connect the call to your VoIP phone with screening, the 8 button to have the call processing system record a message from the caller, the 9 button to have a message played by the call processing system to the caller informing the caller that you refuse to take the call, or the * button to disable further auto-transfer calls."

The prompt can optionally include speaking the phone numbers associated with the destination (for example, "press the 2 button to have the call connected to your home phone 5555 555-5555"). Several different prompts can optionally be stored by the call processing system, and selectively provided. For example, if the initial outcall is to the user's home phone, then the home phone options ("press . . . the 2 button to have the call connected to your home phone without screening, the 3 button to have the call connected to your home phone with screening") can optionally be omitted.

In this example, the called party can press the "1" button to accept the call, the "2" button to have the call connected to the home phone without screening, the "3" button to have the call connected to the home phone with screening, the "4" button to have the call connected to the work phone without screening, the "5" button to have the call connected to the work phone with screening, the "6" button to connect the call to the VoIP phone without screening, the "7" button to connect the call to the VoIP phone with screening, the "8" button to have the call processing system record a message from the caller, or the "9" button to have a message played to the caller informing the caller that the called party refuses to take the call. Optionally, the called party can prevent or disable future auto-transfer calls by pressing an appropriate button, such as the "*" button. If the called party gave a call transfer instruction (such as by pressing the 3, 4, 5, 6, or 7 button in this example), in response to receiving the called party instruction, the call processing system can retrieve the corresponding phone number from the user account database record or elsewhere, stored in computer readable memory, and transfer the call to the retrieved phone number.

The called party can similarly be instructed to press one or more buttons in order to have the call transferred with or without call screening.

Thus, optionally, the user does not have to key in or remember the phone number the user wants the call to be transferred to each time a call comes in. In addition, in this example embodiment, the initial target phone does not have to be set up or programmed with the call transfer phone numbers, and so the user can use a wide variety of phone terminals, such a hotel phones, work phones, and so on, to receive calls and to instruct the call processing system to forward the calls to another destination.

The term key or button press, as used herein, can include the pressing of a physical key or button, a soft key or button displayed on a touch sensitive or other display, a corresponding spoken number or command, or other form of instruction.

Optionally, the called party can provide the instruction to connect the call to another phone before initiating the conversation with the caller, such as while screening the call, or during the conversation with the caller, such as after accepting the initial call bridged to the called party by the call processing system.

Optionally, the called party or other user can access the call via the target phone and instruct the call processing system, via a key press, such as a single key press or two or more key presses, voice instruction, or otherwise, to transfer or connect the call, via a call bridging operation or otherwise, to still another communication device.

Optionally, in order to insulate the called party to the foregoing process, the calling party can be prevented from hearing all or a part of the called party's key press(es) or voice instruction(s). For example, the call processing system can tear down or mute the audio path from the target phone to the caller's phone. If the call has been transferred and the called party wants to transfer to another line, the detection of a called party key press can be performed very quickly, such as in 10 ms or less, to reduce or minimize the audible transmission of the DTMF tone resulting from the key press to the caller.

Thus, by way of example, if a called party receives the forwarded, bridged, or otherwise transferred call on the called party's wireless phone or other target phone, in order to reduce the amount of wireless time or minutes used, to save battery power, to avoid the call being dropped due to a low battery charge, and/or to communicate via a medium that provides better voice quality, the called party can have the call further forwarded, bridged or otherwise transferred to a POTs phone, wireless cellular phone, VoIP phone, or other communication device.

By way of further example, a call can be received from a caller for a called party at the call processing system. The call processing system can automatically transfer or connect the call, via a call bridging operation or otherwise, to a wireless, POTs, networked computer, or VoIP phone associated with the called party. The transfer can optionally be initiated based at least in part on a prior instruction from the called party.

In addition, a caller identifier can optionally be provided to the called party via the target phone. For example, as similarly described above, the caller identification can be provided via the ANI field as a phone number to be presented on a display, such as a Caller ID display, associated with the target phone. The called party can optionally use the identification information to screen the call. In addition, the called party can, via a phone key press, voice commands, or otherwise, instruct the call processing system to forward or bridge the caller's call to another target phone, such as a another POTs phone, a wireless phone, a VoIP phone, or other communication device. For example, the call processing system can provide prompts similar to those described above or otherwise, and the called party can provide corresponding responses. By way of example, the call processing system can provide the following prompt: "You have a call, press the 1 button to accept the call (on the current telephone), the 2 button to have the call connected to your home phone without screening, the 3 button to have the call connected to your home phone with screening, the 4 button to have the call connected to your work phone without screening, the 5 button to have the call connected to your work phone with screening, the 6 button to connect the call to your VoIP phone without screening, the 7 button to connect the call to your VoIP phone with screening, the 8 button to have the call processing system record a message from the caller, or the 9 button to have a message played by the call processing system to the caller informing the caller that you refuse to take the call."

If the call is transferred to second target phone or line, some or all of the same call transfer and processing options can be offered again to the called party once the call is transferred to the second phone, or still other options can be offered.

Optionally, a user can specify the auto-transfer number via one or more user interfaces provided by or coupled to the call processing system. For example, the user interface can be provided via the IAM client, such as that discussed above, executing on the user's computer terminal, via an IAM client executing on a smart phone, such as a smart phone using a Microsoft, Symbian, or Palm operating system, via a TUI (telephone user interface) that can provide voice or other prompts over the phone and via which the user can provide instructions via telephone key presses and/or voice commands, or otherwise. For example, if the user is on travel, the user can set the auto-transfer number via the TUI or otherwise to a phone number/line associated with the hotel where the user is staying.

If the user is setting the auto-transfer number via a telephone/telephone line that provides the phone number associated with the calling line, such as via Caller ID, or otherwise provides caller identification signaling information, upon receiving the call set-up information, the call processing system can use such signaling information to automatically authenticate the user and to access the user's account information. The user can optionally also be prompted to enter a password to further provide authentication. Once the authentication is performed, the user can be allowed to specify a new auto-transfer phone number.

Optionally, for broadcast purposes, the user can specify that incoming calls are to be auto-transferred to a plurality of different phones, including one or more POTs phone, wireless phone, VoIP phones, and/or other target phone devices. The auto-transfer can include call screening as described above. Thus, an incoming call can be screened by a plurality of users using a plurality of the corresponding target phone devices. A user can then elect to accept or further transfer the call to a second target phone or line with or without screening and with or without supervision, as similarly described above. Then, for example, the called party or other user can access the call via the second target phone and instruct the call processing system, via a key press, voice instruction, or otherwise, to transfer or connect the call, via a call bridging operation or otherwise, to a third communication device, and so on.

Thus, by way of example, if a called party receives the forwarded, transferred or bridged call via the call processing system on the called party's home POTs or other landline phone as the called party is about to leave home, or otherwise lose access to the landline POTs phone, the called party can elect to manually transfer the call to the called party's wireless, mobile cell phone in order to continue the conversation with the caller after leaving home.

By way of further example, if the called party instructs the call processing system to connect the incoming call to a designated communication line, the call processing system can initiate an outcall to the designated communication line. While the outcall is "ringing", optionally, a ringing tone or a waiting tone can be played to the caller. Optionally, if the user instruction to transfer the call occurred during the call, wherein the caller and called party were conducting a conversation, the caller and called party can continue the conversation on the original phone line until the call on the target line is answered.

Optionally, if the outcall is not answered after a certain predetermined time period (such as after a number of seconds), after a certain number of rings, or if the new target line is busy, the outcall can be terminated, and a call transfer failed message, tone, or other indicator can be played or provided to the called party and/or the caller. If the outcall is answered, the outcall and the caller's can be bridged or otherwise connected. Optionally, a message, tone, or other indicator can be provided or played on the caller's phone, the original called party's phone, and/or the new, target phone, notifying the caller and/or the called party that the call has been transferred. The connected between the call processing system and the original called party phone can be dropped.

Optionally, the foregoing call transfer process may only be offered to the called party if the called party has designated an alternate phone number/line and/or is authorized or has permission to utilize the call transfer process. If the called party has not specified an alternate number/line designator (wherein the phrase "number" includes an address for a VoIP terminal or other communication designator) and/or does not have authorization to use the call transfer call process, optionally an instruction, such as in the form of a key press, from the called party to utilize the call transfer process can be ignored, or a message can be played to the called party notifying that the called party has not provided an alternate number and/or does not have authorization to use the transfer process.

Figure 21:
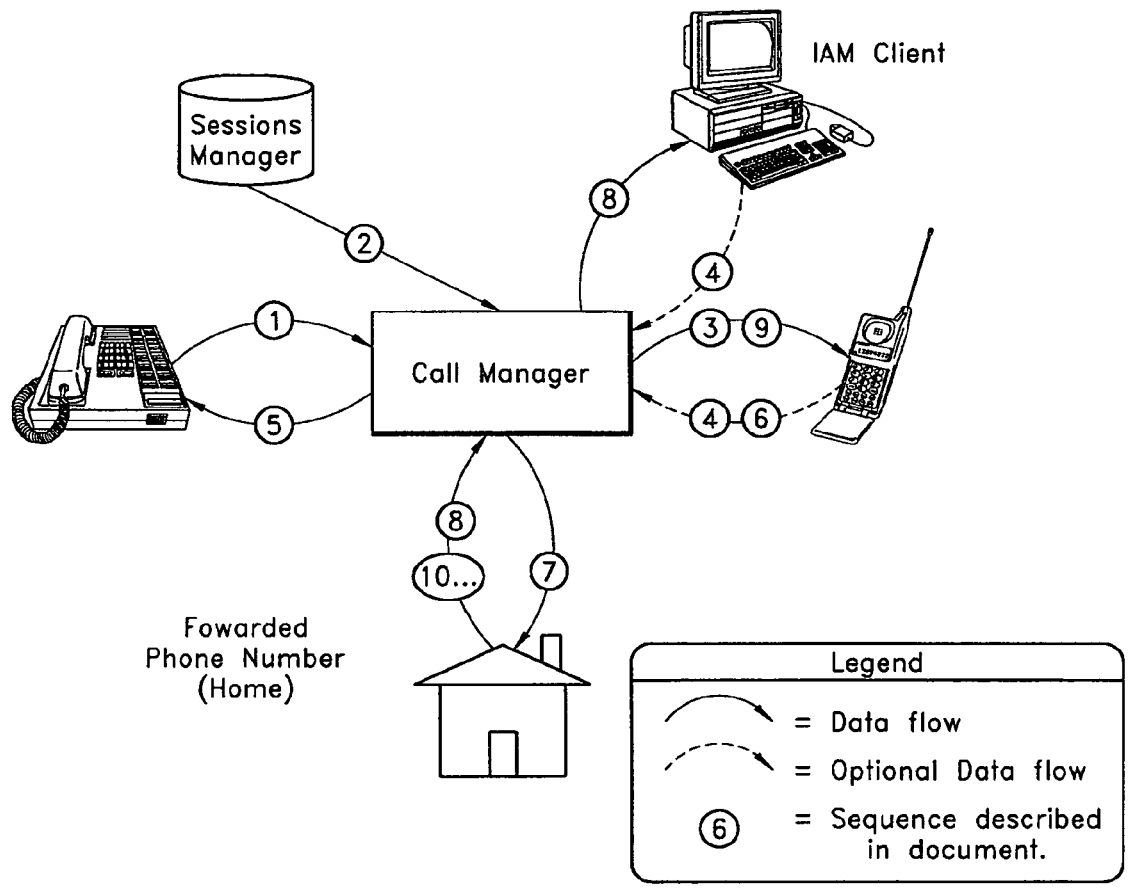
FIG. 21 illustrates an example call transfer process.

An embodiment of a call transfer process will now be discussed in greater detail with reference to FIG. 21, wherein a call is automatically transferred to a first destination associated with a called party, who can optionally then cause the call to be transferred to still another destination. The components illustrated in FIG. 21 can optionally correspond to components of the same name or type discussed above with reference to FIGS. 16-20. As with the other processes and corresponding figures described herein, not all states need to be reached, and the states do not necessarily need to be performed in the same order as that illustrated. In addition, certain state processes do not need to be performed serially, and two or more states processes can be performed in parallel. The processes can include additional states as well. While the following example assumes that the auto-transfer destination is a wireless, cellular phone, the destination can be a POTs phone, a VoIP terminal, or other destination or communication device.

State 1. An incoming call (incall) intended for a subscriber or other user is presented to a call processing system, such as that previously described.

State 2. The call processing system receives subscriber information, such as from the Session Manager by way of example, which can retrieve the subscriber information from a subscriber database. The subscriber information can include a target destination, such as a phone number/line identifier (such as a VoIP line identifier) to which calls are to be automatically transferred.

State 3. The call processing system optionally transmits a call notification/message to the subscriber/user IAM client and places an outgoing call (outcall) to the auto transfer destination. The user can use either the IAM client or the auto-transfer destination terminal to accept the call or to further transfer the call as discussed below. State 3 can performed in parallel with state 4.

State 4. If, for example, the auto transfer destination is a wireless cell phone, one or more of the following next processes can occur.

(a) the outcall can be answered at the called party/customer wireless phone;

(b) the called party notifies on instructs the call processing IAM system that the called party wants to take the call via the IAM client or otherwise. The call processing IAM system bridges the calling party with the called party computer hosting the IAM client, by establishing a VoIP session via a VoIP software module. The two calls are bridged together through the by establishing a VoIP session IAM system so that the caller and the called party can converse;

(c) an outcall timer expires, wherein if the called party does not answer the call or does not otherwise take the call, the outcall is dropped.

State 15. The call processing system answers the incall.

State 6. If the outcall was successfully connected to the wireless cell phone (or other destination telephone or terminal), the called party can press a key to generate a tone, such as DTMF 2, to transfer the call to their home. Once the IAM system receives the tone, the Session manager can retrieve the corresponding transfer destination, such as a home phone number, from the subscriber database. A short confirmation prompt can be played by the call processing system to the called party if the outcall is queued. If the outcall is not queued, as might occur if there are no available ports, an explanation of why the outcall could not be queued can be provided, and the called party can accept the call on the wireless cell phone by pressing the appropriate button, such as a '1". After the prompt, the called party returns to screening or talking to the caller. (Note: the called party could also optionally take the call on their cell phone immediately by pressing "1".)

State 7. If the outcall was successfully queued, an outcall is placed from the call processing system to the home or other designated destination.

State 8. The outcall to the home phone number, or other destination, is answered. This outcall is optionally immediately connected and the caller can then talk to the called party, where the called party can talk from the home phone.

State 9. If the call transfer was performed with supervision, a message is optionally played by the call processing system to the called party via the called party's cell phone, where the message informs the called party that the call has been connected to the home phone line, or other designated destination, and then the call between the call processing and the wireless cell phone is hung up or otherwise disconnected. If the call transfer is unsupervised call, the call between the call processing and the wireless cell phone is dropped at state 7.

State 10. The called party can optionally forward the call back to their cell phone, or to another phone/phone line during the call with the called party by pressing an appropriate phone key, such as the "2" key.

A description of example embodiments of making the auto-transfer process available, of calculating an outcall duration (the time after bridged call is originated by call manager), of presenting the call transfer process to the caller and the called party, and of maintaining call processing records will now be provided.

Optionally, the auto-transfer process is configured for individual subscribers or other users via one or more of the following "class of service" controls stored in the subscriber or other user database. For example, a user/subscriber can selectively enable or disable the auto-transfer process via a user accessible web page which can be hosted by the IAM system. By way of further example, the user/subscriber can also enable or disable the ability to use the web page to enable or disable the auto-transfer process. The user/subscriber can also selectively enable the auto-transfer process for calls placed while the user/subscriber is online and connected to the call processing IAM system via an IAM client. The user/subscriber can also selectively enable the auto-transfer process for calls placed while the user/subscriber is not connected to the call processing IAM system via the IAM client. Similar controls are provided for calls placed to the user/subscriber virtual telephone line or a number without a physical line tied to it. The user can also optionally specify a call duration. Further, the user/subscriber can selectively specify that only calls that have Caller ID information available should be auto-transferred, or can specify that even calls without Caller ID information available should be auto-transferred.

Optionally, the user and/or the system operator can specify a time period and/or number of rings before an auto-transfer incall is answered by the call processing system and a caller message is taken. Different time period can optionally be specified for different users/subscribers. For example, a new user can be provided a shorter incall answer time period, such as 15 seconds, than the time period, such as 25 seconds, for a user with a premium service, such as might be provided upon payment of an appropriate one time and/on periodic fee. Optionally, the user and/or the system operator can specify a time period and/or number of rings before an auto-transfer outcall is abandoned by the call processing system, wherein different time periods can be specified for different users/subscribers as similarly described for the incall.

In addition, the amount of guidance or help provided to a user/subscriber with respect to the auto-transfer process can be specified, as well as whether screening should be provided, and/or whether the auto-connect process is to be provided. By way of example, the user and/or system operator can specify that a phone number associated with the call processing system should be used as the caller ID for the IAM system outcall.

An example table is provided below listing example auto-transfer controls, one or more of which can be provided by the call processing system. The table lists example control names and descriptions. Optionally, there can be associated default values. Different users and/or different class or sets of users can be assigned different default values. The user can set the values/states via a Web page, a TUI interface, or otherwise. With reference to the table below, CVL is a voice line, such as a virtual telephone line or a number without a physical line tied to it. For example, the user can designate which terminal/line calls to the CVL number will be connected to. By way of illustration, the user can specify that calls to the CVL number as such be connected to a voice mail system, a cell phone, a home phone, a work phone, or other telephone/line. The user can optionally change the destination via a call processing system account manager. The corresponding values can be stored in a database accessible by the call processing system Call Manager or other call processing system.

TABLE 1

Auto-Transfer Controls

| Control Name | Description |
| --- | --- |
| FwdAutoTransferAllowed | Specifies whether the subscriber has the auto-transfer feature for calls to a subscriber's target or forwarded number. |
| FwdAutoTransferOnlineEnabled | Specifies whether auto-transfer is enabled for calls to a subscriber's target or forwarded number when the subscriber is online (connected to the call processing IAM system via the IAM client). |
| FwdAutoTransferOfflineEnabled | Specifies whether auto-transfer is enabled for calls to a subscriber's target or forwarded number when the subscriber is offline. (not connected to the call processing IAM system via the IAM client). |
| CVLAutoTransferAllowed | Specifies whether the subscriber has the auto-transfer feature for calls to a subscriber's CVL Number. |
| CVLAutoTransferOnlineEnabled | Specifies whether auto-transfer is enabled for calls to a subscriber's CVL Number when the subscriber is online. |
| CVLAutoTransferOfflineEnabled | Specifies whether auto-transfer is enabled for calls to a subscriber's CVL Number when the subscriber is offline. |
| ConnectDuration | Used to determine the duration of the connected call, as described in greater detail below. |
| AutoTransferCallerIdRequiredEnabled | Specifies whether the auto-transfer should only occur if the caller ID (or other caller identifier) is available. |
| AutoTransferIncallRingTimerSeconds | Specifies the number of seconds (or other time unit) before an auto-transfer incall is answered by the call processing system, a greeting is played, and a message is taken. The called party can screen the caller message and decide to accept the call. Optionally, this setting is not exposed to the subscriber. This parameter can be configured by the system operation, and the subscriber can selectively |

TABLE 1-continued

Auto-Transfer Controls

| Control Name | Description |
|---|---|
| | be allowed or not allowed to conFIG.the incall ring time. |
| AutoTransferOutcallRingTimerSeconds | Specifies the number of seconds, or other time unit, to ring an outcall before it is abandoned. Optionally, this setting is not exposed to the subscriber. This parameter can be configured by the system operation, and the subscriber can selectively be allowed or not allowed to conFIG.the incall ring time. |
| AutoTransferPresentationStyle | Specifies the subscriber's experience when answering an auto-transfer outcall. For example, a Tutorial with Screening, Screening, or Auto Connect mode can be specified. |
| AutoTransferUseMrtCallerId | Specifies the phone number to be used as the Caller ID or ANI for the outcall. |

In addition, the user can specify an auto-transfer phone number (AutoTransferPhoneNumber) which is stored in a corresponding database field. The AutoTransferPhoneNumber is the phone number to which auto-transferred calls for the subscriber are to be transferred. Optionally, the value of the field can be empty or null until specified by the user/subscriber.

With respect to the connect outcall timing, optionally a connect outcall (including auto-transfer and/or manual outcalls) has a maximum call duration set and an associated warning type. The maximum call duration specifies how long the call is allowed to be connected before the call processing system terminates the call. Optionally, a maximum call duration of zero (or other designated value) indicates that the call is not disconnected by the call manager system unless the processing system, or a selection portion thereof is shut down.

The warning type specifies how long before the end of the outcall (as specified by the connect outcall timing) the subscriber receives a first and a second warning (or still additional warnings), and what prompts are used for these warnings. The following table describes example warning types, although other warning types and other timings can be used as well. In addition, the call processing system can optionally automatically provide warnings that announce an expiration time that is shorter that the actual expiration time to take into account users whose perception of time is incorrect:

TABLE 2

Outcall Duration by call type

| | First Warning | | Second Warning | |
|---|---|---|---|---|
| Warning Type | Timing (seconds) | Prompt | Timing (seconds) | Prompt |
| Short | 120 | "You have two minutes left" | 45 | "You have thirty seconds left"(*) |
| Long | 180 | "You have three minutes left" | 45 | "You have thirty seconds left"(*) |

Optionally, the maximum outcall duration and warning type for a call are determined by the call processing system by finding a row in a database table that matches the subscriber's connectDuration, incall type (such as Forwarded, CVL No. 1, CVL No. 2), and the transfer type (such as auto-transfer or manual transfer). Associated call durations and warning types (short or long) can be provided in the table as well. The following table illustrates example values of the database table. Different users can be entitled to different classes of services. For example, some users can be associated with a Class 1 level of services, while other users can be associated with a Class 2 level of services, wherein Class 1 can offer a higher level of services than Class 2 in one or more categories.

TABLE 3

Outcall Duration by call type

| Connect Duration | Incall Type | Transfer Type | Maximum Call Duration (Minutes) | Warning Type |
|---|---|---|---|---|
| 1 | Forwarded | Auto | 60 | Long |
| (used by a | | Manual | 60 | Long |
| relatively | CVL No. 1 | Auto | 60 | Long |
| high class of | | Manual | 60 | Long |
| service) | CVL No. 2 | Auto | 60 | Long |
| | | Manual | 60 | Long |
| 2 | Forwarded | Auto | 30 | Short |
| | | Manual | 30 | Short |
| | CVL No. 1 | Auto | 30 | Short |
| | | Manual | 30 | Short |
| | CVL No. 2 | Auto | 30 | Short |
| | | Manual | 30 | Short |
| 3 | Forwarded | Auto | 10 | Short |
| (used by the | | Manual | 10 | Short |
| low class of | CVL No. 1 | Auto | 10 | Short |
| service) | | Manual | 10 | Short |
| | CVL No. 2 | Auto | 10 | Short |
| | | Manual | 10 | Short |

Optionally, the call duration can be based at least in part on a toll level on the outcall. For example, calls placed to SIP (Session Initiation Protocol) devices could be allowed to continue without a limited duration or for an extended duration, such as 2 or 4 hours. Optionally, the outcall duration table data can be cached in solid state memory, and can be periodically refreshed.

If an outcall duration database row cannot be found that matches the subscriber's connectDuration, incall type, and the transfer type, optionally an exception is logged and default connect duration (defaultConnectDurationMinutes) and default warning type (defaultWarningType) parameter settings are read from memory, such as a timing cache (OutcallTimingCache), wherein the foregoing parameters are described in the configuration description below.

A connectDuration of zero is allowed. Optionally, calls for subscribers that have a connectDuration of zero will have the default behavior described above applied.

Example configuration parameters will now be discussed. Fewer or additional configuration parameters can be used. A given call processing system Call Manager can have one or more of the following dynamic configuration parameters that control the use and application of the Auto-Transfer feature. The default values described below are examples, and other default values can be used as well. Certain example time units are used, such as seconds or minutes, however other time units can be used as well:

[OutcallTimingCache] secondsBetweenSync—How often the table storing the connect call duration by call type information is refreshed in seconds or other units.

[PortManager] shutdownFirstWarningDelaySeconds—How long between when a Call Manager, or other designated call processing system subsystem, shutdown is requested and the first shutdown warning to subscribers on out-calls.

[PortManager] shutdownSecondWarningDelaySeconds—How long between the first warning and the second warning (for out-calls) when the Call Manager is shutting down. By way of example, the value can have a default value, such as 300 seconds.

[PortManager] shutdownFinalWarningDelaySeconds—How long between the second warning and the final warning (for out-calls) when the Call Manager is shutting down. By way of example, the value can have a default value, such as 120 seconds.

[PortManager] shutdownNowDelaySeconds—How long between the final warning (for out-calls) and forced hang-up (optionally for all calls) when the Call Manager is shutting down. By way of example, the value can have a default value, such as 30 seconds.

delayIncallAnswerAfterOutcallAnswerSeconds—How long to delay answering the incall after the auto-transfer outcall has been answered. This is intended to give the subscriber a chance to answer and request a connection before the caller hears the greeting. Optionally, this parameter is used if the Auto-Transfer Presentation Style is Tutorial or Screening. By way of example, the value can have a default value, such as 2 seconds.

[OutcallTimingCache] defaultConnectDurationMinutes—Default duration returned if a corresponding database row is not found (an exception is optionally also logged). By way of example, the value can have a default value, such as 30 minutes.

[OutcallTimingCache] defaultWarningType—Default warning type returned if a corresponding database row is not found (an exception is also logged). The value optionally defaults to a value, such as long or short.

[OutcallTimingCache] shortFirstWarningSeconds—Seconds, or other time unit, of warning for first 'short' type warning. By way of example, the value can have a default value, such as 120 seconds.

[OutcallTimingCache] shortSecondWarningSeconds—Seconds, or other time unit, of warning for the second 'short' type warning. By way of example, the value can have a default value, such as 45 seconds.

[OutcallTimingCache] longFirstWarningSeconds—Seconds, or other time unit, of warning for first 'long' type warning. By way of example, the value can have a default value, such as 180 seconds.

[OutcallTimingCache] longSecondWarningSeconds—Seconds, or other time unit, of warning for second 'long' type warning. By way of example, the value can have a default value, such as 45 seconds.

EnableTransferFromOutcallTui—Default value is optionally set to true. If true, the transfer from outcall functionality is supported.

MinSecondsReminingForTransferFromOutcall—The number (or greater) of seconds, or other time unit, that needs to be available on the connected call for the transfer from outcall to be allowed. This prevents an outcall from being transferred if the call does not have sufficient time to connect. By way of example, the value can have a default value, such as 60 seconds.

Example call logging will now be described.

A CDR (call detail record) is optionally logged and stored for the incoming call and/or the auto-transferred call in association, with an identifier to associate the incoming call and the auto-transferred call. One or more of the following call details can be recorded:

An indication (such as one or more bits or alphanumeric characters) that the call is an auto-transfer call.

An indication as to whether a call auto-transfer was attempted and whether the subscriber answering the auto-transfer call chose to take the call.

The auto-transfer connect duration.

The called number type for the auto-transfer outcall.

The auto-transfer connect phone number for the auto-transfer call.

An indication that an auto-transfer outcall ended because the call was transferred With respect to connected calls, some or all of the following example information can be stored in corresponding CDR log fields ConnectedPhoneNumber—The phone number used for an outcall for a given call. This field is populated if an outcall was attempted for the call, optionally even if the outcall failed.

ConnectDurationSeconds—The connect duration, such as the number of seconds that the call was connected. This could be zero if the call outcall failed, or if the call was screened but not connected.

Figure 22:
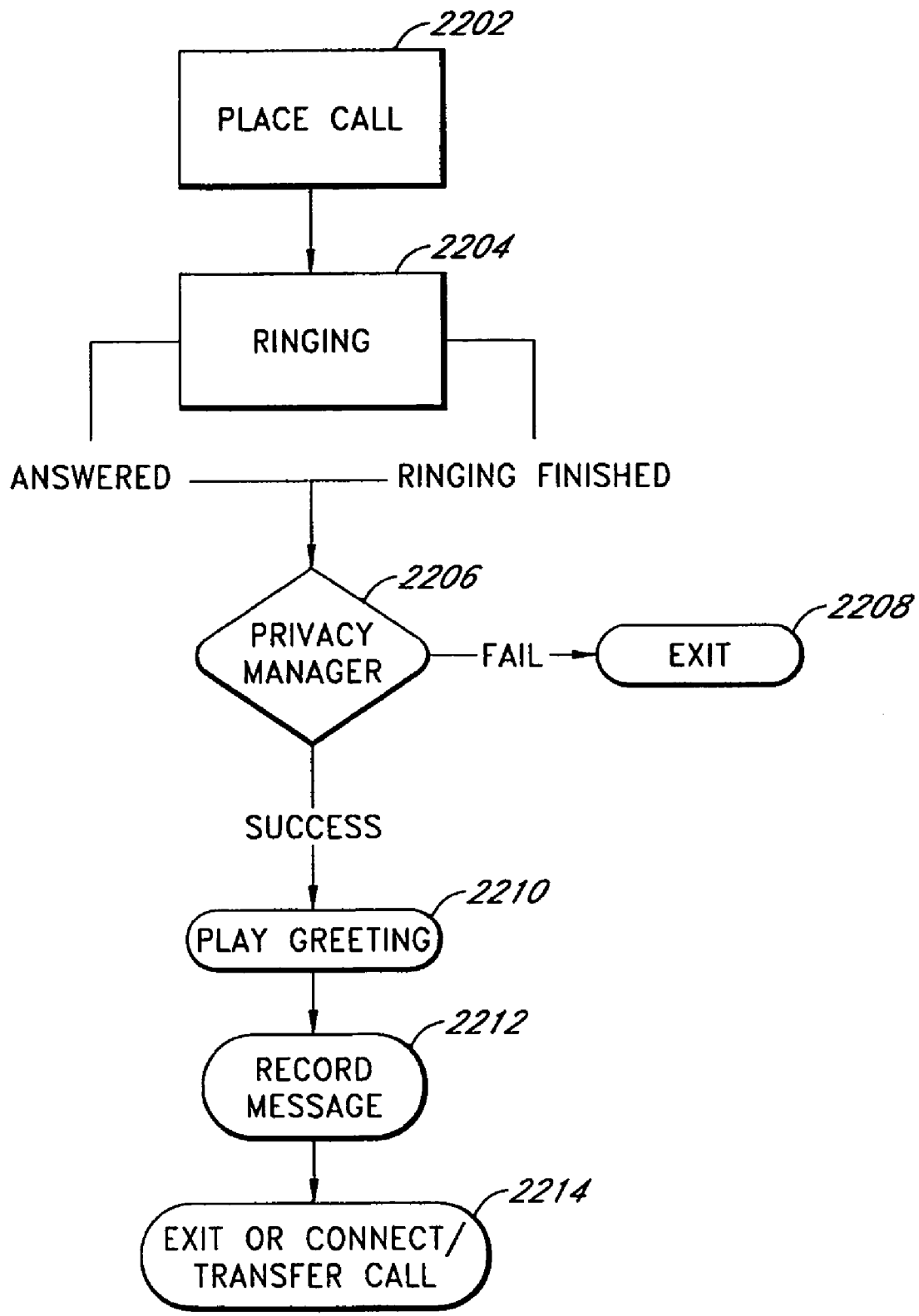
FIG. 22 illustrates a call transfer process with respect to the caller.

Example call processing system TUI (Incall) and auto-transfer processes and states from the caller's perspective will now be described with reference to FIG. 22. The caller places a call which is received at the call processing system at state 2202. At state 2204, the caller hears the ringing tone during a ringing state.

At state 2206, a determination is made as to whether auto-transfer outcall is be placed. For example, while in the ringing state, an auto-transfer outcall is placed if the appropriate conditions are met, optionally including one or more of:

The Call Manager AutoTransferEnabled configuration parameter is set to true.

The subscriber is online and AutoTransferEnabledOnline is set to true or the subscriber is offline and both AutoTransferEnabledOffline and OfflineAnsweringEnabled are set to true.

AutoTransferCallerIdRequired is set to false for the called party/subscriber, or the caller ID for the given call is available and not private, or AutoTransferUseMrtCallerId is set to true.

AutoTransferPhoneNumber for the called party/subscriber contains a valid phone number.

Either the Call Registry is not configured or there are no outcalls in progress to the selected auto-transfer phone number.

In this example, the process stays in the ringing state until the outcall has been answered or until the ringing has been played for a predetermined amount of time (such as the time specified by the AutoTransferOutcallRingTimerSeconds parameter) or rings. If the auto-transfer outcall fails because the outcall destination is busy, the process proceeds to exit state 2208, and the caller optionally will still hear a full ring count.

At state 2210, a greeting message can be played to the calling party by the call processing system, and at state 2212 the call processing system can begin recording a message from the caller, which can then be streamed to the auto-transfer destination once the outcall process to the destination terminal is completed. At state 2214, the called party can cause the greeting and/or message recording states to be interrupted or bypassed by accepting the call as described below with respect to FIG. 23.

Figure 23:
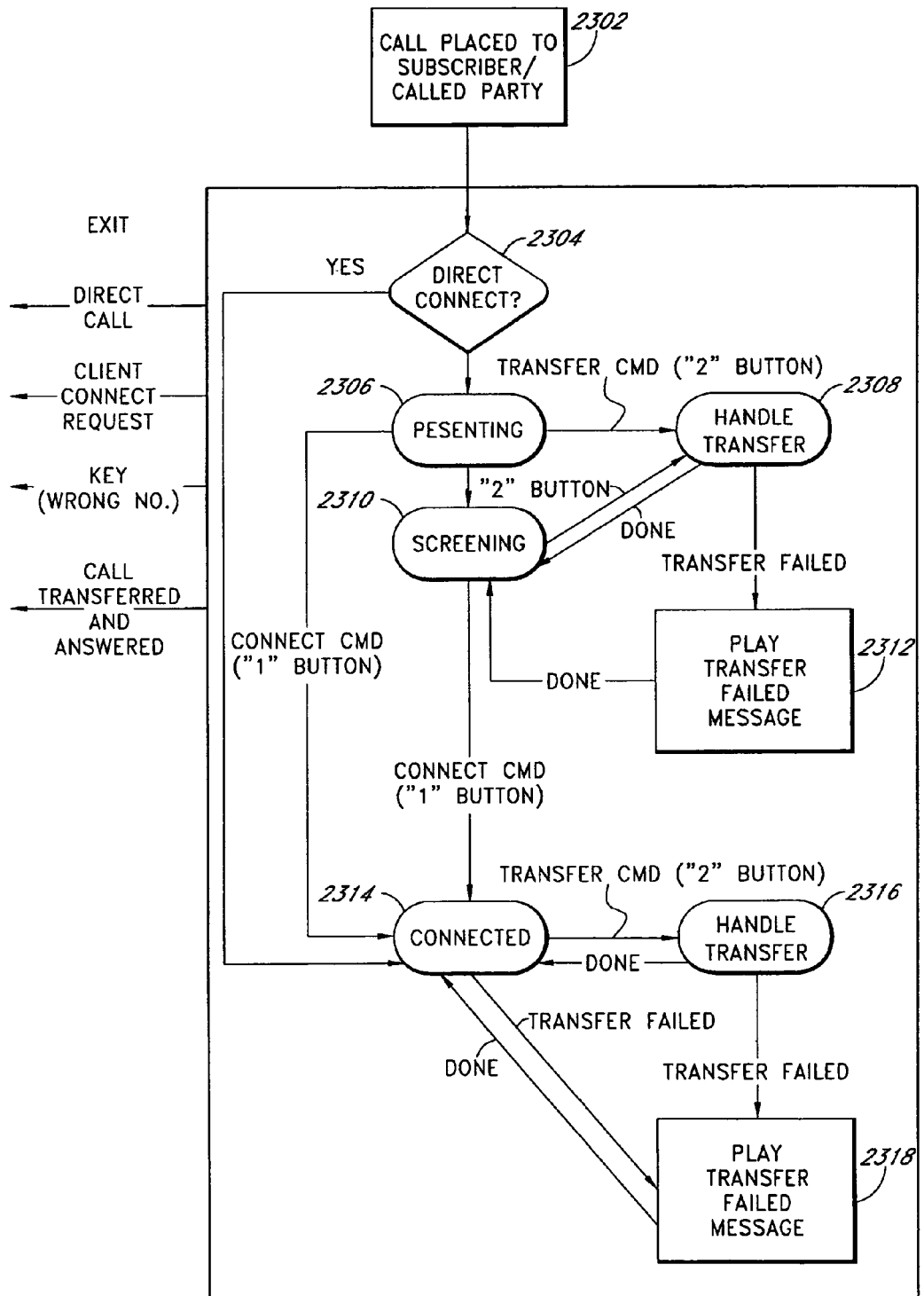
FIG. 23 illustrates a call transfer process with respect to the called party.

Example call processing system TUI (Outcall) and auto-transfer processes and states from the called party's perspective will now be described with reference to FIG. 23. At state 2302, a call is placed by a caller to the called party. The called party can be a subscriber to the call processing system services. At state 2304, a determination is made as to whether the call can be directly connected to the called party, without screening, which causes the call to ring through to the called party's phone/terminal as with a regular phone call. For example, a determination can be made as to whether the auto-transfer presentation style parameter AutoTransferPresentationStyle is set to auto connect for the called party.

If the called party has instructed that the call be directly connected to the called party, then the process proceeds to the connected state at state 2314. If the called party presses the appropriate phone key, such as the "2" key in this example, during the connected state, the call enters the handle transfer state at state 2316, wherein an attempt is made to transfer the call to a destination telephone terminal associated with the key press. If the transfer is successful, the process is done and returns to the connected state at state 2314. If the transfer is not successful, the process proceeds to the transfer failed state at state 2318, and a transfer failed message is played by the call processing system to the called party. The process then returns to the connected state at state 2314.

If the called party has not instructed that the call be directly connected to the called party, and/or if the called party has instructed that call screening be performed (such as by causing the AutoTransferPresentationStyle parameter to be set to Tutorial With Screening or Screening), then the process proceeds to the presenting state at state 806. In the presenting state, the called party is optionally informed that the call is an auto-transfer call and, unless instructed otherwise by the called party, the process enters the call screening state at state 2310.

In the screening state, the audio in progress in the original call, between the caller and the call processing system, is presented or played to the called party. Thus, for example, when prompts are being played to the original caller, the called party also hears the prompts, and when the call processing system records a message, the audio from the calling party is presented to the called party via the auto-transferred call.

If the called party presses the appropriate phone key, such as the "2" key in this example, during the presenting or screening states, the process enters the handle transfer state at state 2308, wherein the call is transferred to a destination telephone or other terminal associated with the key press, and the call can optionally be screened on the new destination terminal. When this state returns, the call enters the screening state at state 2310. By way of further example, optionally if the called party presses a transfer key, such as "2", during the presenting state, the process will skip the rest of the presenting message and proceeds to the handle transfer state.

In the handle transfer state, an attempt is made to transfer the call to a destination telephone terminal associated with the key press. If the transfer is successful, the process is done and proceeds or returns to the screening state at state 2310. If the transfer is not successful, the process proceeds to the transfer failed state at state 2312, and a transfer failed message is played by the call processing system to the called party. The process then proceeds to the screening state at state 2310.

If the called party presses an appropriate phone key, such as "1" in this example, during the presenting or screening states, the process skips or stops call screening, and the process proceeds to the connected state at state 2314, where the call is processed as similarly discussed above.

The process can optionally be exited upon the occurrence of one or more events, including, by way of example, one or more of the following occurrences:
 a called party phone hang up/call termination;
 a connect request issued by a client application executing on a computer associated with the called party;
 a key press indicating that the caller called the wrong number; or
 the call was successfully transferred to the appropriate phone/terminal and answered.

By way of further example, if the called party is online and the IAM client is executing on a computer associated with the called party, the call processing system notifies the IAM client of the call transfer and streams of the caller message to the IAM client. The called party can then elect to take the call via the IAM client, or instruct the call processing system to transfer the call to another phone/terminal.

Optionally, the prompts played during the handle transfer state are played to the called party only, and the caller is prevented from hearing the prompts. If a call transfer is already in progress, a transfer in progress prompt message is played. If a call transfer fails, the transfer is no longer considered in progress. The called party can press an appropriate key, such as the phone "2" key, to attempt the transfer again. Optionally, a call will only be transferred if there is more than a predetermined amount of time (MinSecondsReminingForTransferFromOutcall) left on a corresponding outcall timer. If there is an insufficient amount of time left, optionally the call processing system plays a "not enough time left" prompt. If the transfer is successful, and transfer successful prompt can be played.

The following example prompts are used in the Auto-Transfer TUI.
 OfferTakeCall—"You have a call. Press 1 at any time to take the call."
 OfferTransfer—"Press 2 to transfer the call to your other number."
 CallForSpokenName—"This is a call for <spoken name>."
 OtherTookCall—"We're sorry but someone else took the call. Goodbye."
 CallerHangup—"Thank you for using CallWave. Goodbye."
 EarlyCallerHangup—"We're sorry but the caller hung up. Goodbye."
 FirstWarning—"You have <T1> seconds left."
 SecondWarning—"You have <T2> seconds left."
 Timeout—"I'm sorry but your time is up. Goodbye."
 Help—"To take the call, press ONE. To disable future calls, press STAR."
 NotEnoughTimeForTransfer—"Not enough time left"
 Transferring—"Transferring"
 TransferInProgress—"A transfer is already in progress"

For the FirstWarning and SecondWarning prompts, in this example, the ConnectDuration value determines the <T1> and <T2> values and the total allowed length of the call.

When the outcall is placed, the number provided in the outcall ANI or caller ID field is selected based on the setting of certain configuration parameter. If a first Caller ID configuration parameter is set, a number stored in the first Caller ID configuration parameter is provided as the Caller ID number. If a second Caller ID configuration parameter is set the subscriber's CVL number is used as the Caller ID number. If neither the first or second Caller ID configuration parameter are set, optionally the call processing system uses the caller's phone number as the Caller ID of the outcall. In addition, optionally a number associated with the call manager system can be included in an NPA field, and at least a part of the selected portion of the caller phone number in an NXX-YYYY field.

In situations wherein a message recording is interrupted, optionally notifications or prompts can be added to the recorded message that provides a notification or explanation for the interruption. For example, if a caller has begun recording a message and the recording is interrupted when the subscriber connects to the caller, a short explanatory prompt will be appended to the interrupted to message file, such as "Recording interrupted by call transfer." This notification can prevent the subscriber mistakenly believing that the message was interrupted as a result of a call processing system failure.

If a user party's IAM client is online when the call processing system receives a call for the user during a call, optionally the client indicates (via a ringing tone and/or other audible notification, and/or via a text and/or other visual notification), and/or that an auto-transfer is being attempted while in the active call state. In addition, the IAM client can display a log that indicates which transferred calls were connected and how long the calls were connected. Optionally, the subscriber can initiate a manual connect request before the call processing system's Call Manager has answered the call.

Optionally, once an auto-transfer process is in progress, an IAM client "take the call" button or menu selection, that permits the user/subscriber to take the call on the IAM client terminal and/or other redirect the call, is disabled and/or not displayed. If a recording was made by the call processing system, the recording can be transferred to the IAM client terminal for later playback by the user/subscriber, and a call list can be displayed providing information regarding the auto-transferred call, including information regarding the duration of the recorded message.

Optionally, if the user/subscriber of the IAM activates the "take the call button" before the call is auto-transferred, the automatic transfer is cancelled.

The following table shows an example IAM Client call log display as a result of different call outcomes for a transferred, or attempt transferred call, although other log entry displays and information can be used as well.

| Case | Call Outcome | IAM Call Log Entry Display |
|---|---|---|
| 1 | Not connected, no message left | <if available, Caller ID and/or Caller Name> No message <date> <time> |
| 2 | Not connected, message left | <if available, Caller ID and/or Caller Name> <message duration> <date> <time> |
| 3 | Connected, message left | <if available, Caller ID and/or Caller Name> <message duration> <date> <time> |
| 4 | Connected, no message left | <if available, Caller ID and/or Caller Name> Forwarded <date> <time>, <connected phone number and/or associated identifier> <connected call duration> |

In another example process, a user can conFIG. their phone or line (e.g., a mobile cell phone) so that incoming calls are forwarded to another destination. Thus calls dialed directly to the phone number associated with the phone (or that otherwise is directed to the user's phone) can be automatically forwarded, forwarded after a predetermined number of rings, and/or forwarded in response to a user action, such as a key press (e.g., a do not disturb key, ignore call key, or other key) to a predetermined destination. The user can specify (e.g., via an account manager, and IVR, or otherwise) that calls are to be forwarded to the call processing system, such as to a virtual telephone line or a number (a phone number assigned by the call processing system to the user) or a pilot hunt group. A pilot hunt group is a group of numbers associated with a pilot number. The pilot number can also be a member of the hunt group. A hunt group enables an incoming call to be directed to an idle telephone station in a preprogrammed group when the called station is busy. In an example embodiment, when the pilot number is dialed, a "hunt" process is performed to find a vacant line (e.g., non-busy). By way of further example, calls not answered can be configured to forward to a predetermined location, such as the next line in a hunt group or to another predetermined line.

As similarly discussed above, the user may have specified that calls received by the call processing system are to be connected to a specified destination, with screening. For example, the specified destination can be the user's mobile phone. Thus, if a call is directed to the user's cell phone, the user can instruct that the call be forwarded to the call processing system, which will then connect the caller back to the user's mobile phone, with screening. Then, as similarly discussed above, the user can accept the call, further transfer the call to a second target phone or line with or without screening and with or without supervision, or have the call processing system record a message from the caller, which can be later retrieved via a computer or phone as similarly discussed above.

Thus, optionally, a user is provided with call screening via the user's cell phone, even when calls are initially dialed to the phone number associated with the cell phone.

Optionally, depending on the user's phone and/or mobile phone service provider, the user can assign different ring tones and/or ring tone volume to different received calls. For example, the phone can compare a phone number associated with an incoming call (e.g., wherein the phone number is received with the call signaling information) with numbers stored in the phone's contact database. If a match is found, and a specific ring tone is assigned to the number stored in the contact database, the phone can provide the specified ring tone.

Thus, for example, the user can assign a unique or selected tone to calls received from the call processing system to thereby identify when calls are being received from the call processing system, or from a specified caller. Optionally, the call processing number can provide a first number in the caller ID signaling field for calls without screening, and provide a second number in the caller ID signaling field for calls with screening. The user can associate a different ring tone for each number. Thus, the user can tell when a call in screening mode is being received.

Thus, in an illustrative example, a call can be received directly (without the call processing system involvement) on a called party mobile cell phone. The subscriber can press an "ignore" call key. The call is then forwarded to the call processing system which answers the calling party call (e.g., after a predetermined number of rings, such as 1, 2, 3, 4, 5 or 6 rings), provides a greeting, and asks the calling party to leave a message. The call processing system substantially immediately places an outbound call to the called party mobile phone, with screening, wherein the called party can hear the calling party and the calling party does not hear the called party. The mobile phone can display caller identification information (such as a name or phone number) associated with the call processing system and/or the calling party. The identification information can specifically indicate that the call is in screening mode. For example, a specific caller ID phone number can be used for calls in screening mode. The called party can press a "take call" key to accept the call, or press an "ignore" key to refuse the call. The call processing system optionally provides verbal or displayed prompts as to what key the called party is to press to accept or refuse a call.

Thus, as described above, embodiments of the present invention provide flexible, user definable call screening processes that can advantageously optionally be used even when the user is online. Further embodiments advantageously enable the user to define to which telecommunication terminals the screened call is to be broadcast to and under what conditions. Further, certain embodiments allow calls received at a call manager system to be transferred to a first called party communication terminal, and then to one or more other terminals.

Optionally, calls can be processed, dropped, re-originated, forwarded, and/or bridged so as to improve the call quality, reduce call costs, and/or for other reasons. For example, in one embodiment, a caller places a call via a calling terminal (such as terminal 1102 illustrated in FIG. 16) to a called party, who may be a subscriber of services offered by the call processing system 1124, as described above. The call may have been forwarded to the call processing system, or the call may have been placed by the caller to a virtual telephone line or a number associated with the called party, wherein when a call is placed to that number, the call is optionally connected at least initially to the call processing system and then optionally connected to the called party. For example, the call processing system can place an outcall to a telephone terminal associated with the called party, such as terminal 1112 illustrated in FIG. 16, and then bridge the inbound call from the caller and the outbound call to the called party, as similarly described above.

Because the call processing system is involved in receiving the inbound call from the caller and placing the outbound call to the called party, the call processing system optionally can continuously monitor the call (including voice, data, and/or signaling information) for instructions from the called party and/or the caller as described herein. For example, the call processing can monitor and detect key presses, voice commands, and the like provided by a caller and/or a called party.

The call may have been placed by the caller from a wireless phone or other phone terminal or line that has poor quality. For example, the call may suffer from echoes, static, voice delays, dropouts, and/or the like. If the called party and/or caller determine that the caller's connection is of poor quality, then either party can provide a command, via a key press or a voice command, or otherwise, instructing the call processing system that is monitoring the call to re-originate a new call to the caller or to the called party. For example, the call processing system can originate a call to the caller (with or without supervision, as described above), and bridge the call to the caller and the original (or a new) outbound call to the called party. The original inbound call from the caller can be dropped before or after the new outbound call is answered by the caller as appropriate or desired.

For example, optionally, the new call can be directed back to the caller's cell phone, which may be desirable if the caller's connection had dropped; or the call can be directed to the caller's wireline home phone number, work phone number, or number or communication device specified by the called party or the caller. Advantageously, the caller and called party can then continue their conversation with a small or negligible interruption and a higher quality connection. Furthermore, the call processing system may be able to determine through network signaling how the calling party's line was disconnected. For example, a VoIP trunk call could "fail" due to excessive packet loss, corruption, or delay, without an associated signaling channel message indicating that the call was cleanly or purposefully disconnected by the caller. This would indicate that the call disconnect was unintentional. If the call processing system determines or infers that the call disconnect was unintentional and/or if the called party is still connected to the call processing system, the system can prompt (via a voice or text prompt) the called party as to whether a callback should occur. If the called party responds affirmatively, the call processing system can perform the callback.

By way of further example, the called party (who may be a service subscriber of the call processing system 1124) receives a call from a caller via the call processing system. For example, as similarly described above, the call may have been placed by the caller to a virtual telephone line or a number associated with the called party, and thereby received by the call processing system. The telephone number may also be a phone number ported by way of Local Number Portability to the call processing system 1124. By way of further example, the call may have been placed to a conventional phone number associated with the called party, and then forwarded to the call processing system. The call from the caller may have been a local, Inter-state, Intra-state, inter-LATA, or intra-LATA toll call, such as where the caller is charged a per time unit fee or the like. The called party may want to save the caller the expense of the call, such as if a child, girlfriend, or boyfriend is calling from out-of-state.

Thus, either party can enter a key press, provide a voice command, or otherwise instruct the call processing system that is monitoring the call to re-originate a new call to the caller and/or to the called party via a specified phone number or communication device. For example, the call processing system can originate a new call to the caller, and bridge the call to the caller and the original or a new outbound call to the called party. The new call back to the caller can be to the number the caller called from, the caller's home phone number, the caller's work phone number, the caller's mobile cell phone, the caller's IP phone, or other number or communication terminal specified by the called party. In response to the entered command, the call processing system originates a new call to the specified recipient (supervised or unsupervised) and bridges the call to the caller and the outbound call to the called party.

A variety of processes can be used to specify or select the recipient phone or communication terminal to which the re-originated call is to be placed to. For example, one or more of the following processes can be used:

the called party enters or selects the caller phone number, communication terminal, or IP address via key presses, voice commands, or the like;

the caller can be voice or text prompted by the call processing system to enter or select the caller phone number, communication terminal identifier, or IP address via key presses, voice commands, or the like. For example, a call participant, such as the called party can be prompted "please enter the phone number to which the call is to be re-originated with," and the user can dial the desired number. By way of further, example, the prompt can be a voice prompts that states "press the 1 button to have the call re-originated to the caller's home phone number, the 2 button to have the call re-originated to the caller's work number, the 3 button to have the call re-originated to the caller's mobile number, the 4 button to have the call re-originated to 555-555-5555," and so on. The prompts can optionally be provided (and the called party response received) during the original inbound call from the caller, during an outbound call from the call processing system to the caller, and/or via a client application, such as the IAM application discussed above, executing on a computer terminal or the like associated with the caller; and/or the caller phone number, communication terminal identifier, or IP address can be pre-specified by the caller and/or the called party, stored in a database or other data store hosted by the call processing system and/or a caller or called party client system, and then automatically retrieved by the call processing system in response to a caller and/or a called party instruction.

The subscriber's transfer to phone number, communication terminal identifier, or IP address can be dynamically determined based on the location of the subscriber's mobile phone. The association between a subscriber locations and a list of phone numbers, communication terminals, or IP addresses is pre-specified by the caller and/or called party, stored in a database or other data store hosted by the call processing system and/or a caller or called party client system, and then automatically retrieved by the call processing system.

By way of illustration, in the following example, the caller provides the phone number to which the new call is to be re-originated to. In response to an instruction, such as a DTMF key press, (for example, a "4" key or other key press), by the called party and/or the caller, the call processing system prompts (via a voice or text prompt) the calling party to enter the phone number the caller would like the new call originated to. Alternatively, in response to a called party DTMF command, the system can just generate a tone and the called party can ask the caller to enter the call back number. Optionally, this can be configured by a subscriber through a member zone or account set-up, or it automatically happens after a specified number of uses (with a voice prompt playing after a specified timeout and no phone number has been entered). After the prompt, the caller speaks, dials, or otherwise enters or selects the phone number or communication device to be called. The number entered or selected by the caller is used by the call processing system to originate the new call, which then can be bridged with the outcall to the called party as described above. The entered number is optionally stored in call processing system memory and associated with the original calling number. Optionally, subsequent calls originated from the same original calling number would not require that the previously entered number be reentered by a call participant in order to re-originate a call to that number. Instead, the called party/subscriber can press "4", or other designated key, and the call processing system will originate a new call to the previously entered number stored in the call processing system memory.

By way of further illustration, in the following example, the called party provides the phone number to which the new call is to be re-originated to. In response to an instruction, such as a DTMF key press, (for example, a "4" key or other key press), by the called party the call processing system prompts (via a voice or text prompt) the called party to enter or select the number the called party would like the new call originated to. Optionally, the return voice path to the caller is muted so that the caller does hear the prompt. Further, where the prompt is a voice prompt, the voice prompt is optionally mixed, and played at a lower volume than the caller's voice volume, so that the called party does not miss the conversation from the caller while the prompt is being played. After the prompt, the called party could dial, speak, or select the number to be called. The number entered or selected by the called party is used to originate the new call to the caller, which can be bridged with the outcall to the called party. The entered number is optionally stored in call processing system memory and associated with the original calling number. Optionally, subsequent calls originated from the same original calling number would not require that the previously entered number be reentered for call re-originating. Instead, the calling party (subscriber) can press "4", or other designated key, and the call processing system will originate a new call to the previously entered number stored in the call processing system memory.

By way of still further illustration, in the following example, the phone number to which the new call is to be re-originated to is retrieved from an electronic contact database (sometimes referred to as an address book) or other data store. For example, a called party or subscriber may have provisioned a client-based or server-based address book or other contact data store that has a defined association between a potential calling party, which may also be a subscriber, and the potential calling party mobile cell number, home number, VoIP number, work number, and/or other numbers. If a call is received from one of these numbers, the called party can optionally provide an instruction, such as by pressing the "4" key or by providing an appropriate voice instruction, and the call processing system will substantially immediately re-originate back the call to a specified default number from the contact database, and/or be prompt the called party to choose between one or more of the contact database numbers.

For example, if a caller calls from a cell phone and the called party's address book contains a single association, then pressing "4" will cause the call processing system to immediately (or after a confirmation prompt and called party prompt responses) place an outbound call to the number in the address book, and to then bridge this new call with the outcall to the called party. If there are multiple entries, the called party can be asked via voice and/or text prompts to choose from the multiple entries. Callbacks can be used to auto-populate a subscriber's address book.

By way of yet further example, the call re-origination process can include a client application executing on a user's computer. The subscriber or other user may be near a computer terminal, such as a personal computer or networked television, which is running a client application monitoring the call based on information transmitted to the client from the call processing system. The information can include the caller phone number and/or name, the called party phone number to which the call was placed, the current duration of the call, and so on. The client application can be, by way of example, the Client application 1116 illustrated in FIG. 16 and discussed above, used to supervise and monitor a call.

For example, a called party may have seen the caller ID/Caller Name or other identifier presented via the client application at the beginning of the call and the called party may have optionally screened the call from their personal computer, networked television, or other computer system. The called party may have taken the call on the called party's mobile cell phone or optionally directed the inbound call to a conveniently available landline phone. Once the called party takes the call, an option is presented on the called party's personal computer that allows the user to re-originate a call back to the caller as similarly described above. The phone number can be selected from an optional pull down list presented via the client application, the called party's contact database, a number available in a call log presented by the client application, or otherwise selected. Note that a called party can call a caller back before even answering the call.

By way of still further illustration, in the following example, the phone number to which the new call is to be re-originated to can be selected from an address book stored or available on a called party's wireless phone. The called party can receive a call on the called party's wireless phone, and send a data message to the call processing system containing the phone number (using instant messaging, SMS messaging, email, and so on) to the call processing system. The call processing system then originates a call to the number provided by the called party, and bridges the new call in to the outbound call from the call processing system to the called party.

The above examples illustrate how a calling or called party can have a call re-originated and how a secondary number can be associated with the called party's calling number. In addition, these "personal" associations can optionally be exported to all or one or more subsets of subscribers or users of the call processing system services. By way of example, if a caller calls a subscriber who instructs the call processing system to re-originate a call to a number entered by the called party, the entered call back number (also referred to as a re-origination number) can be stored in a call processing system database or other data store and made available globally to all or one or more subsets of subscribers or users of the call processing system services. The next time the calling party calls a user or subscriber of the call processing service, the called party may not have to enter the callback or re-origination number, as the number is already available in the call processing system. For example, the call processing system can play a prompt to the called party instructing the called party to press a certain key or provide a voice command to re-originate the call to the already stored number.

By way of illustration, the prompt can instruct: "press the 1 button to have the call re-originated to the caller's home phone number, the 2 button to have the call re-originated to the caller's work number, the 3 button to have the call re-originated to the caller's mobile number, the 4 button to have the call re-originated to 555-555-5555," and so on.

In addition, the call processing system provides the ability to re-originate caller and/or subscriber calls to a multiplicity of phone numbers. The multiple calls can be placed in parallel, in sequence, or use a combination of parallel and serial calling. For example, a subscriber may have configured their service to first ring their office number. Upon detecting that this first callback was not immediately answered (for example, after waiting for a predetermined delay like 6-10 seconds, or after a predetermined number of rings, such as 2 or 4 rings), additional calls can be simultaneously or substantially simultaneously placed to the subscriber's home phone number, cell phone number, and/or other phone numbers specified by the subscriber and/or selected by the system. The three (or more) calls will continue to ring until one of the calls is answered, at which time the remaining calls are abandoned by the call processing system. Optionally, instead, the calls can be configured to ring for up to a predetermined number of ring cycles or up to a fixed time, and the answered calls can then be conferenced together.

The list of multiple calling locations and associated sequencing instructions can be explicitly specified by the subscriber, automatically set by the call processing system by inferring user preferences based on past call treatment, by a combination of these methods, or using still other methods.

Other call handling processes can be used to handle unanswered re-originated calls as well. For example, if a re-originated call is not answered, the call processing system can optionally: call the intended recipient back on the original calling or called party phone number, hold the original recipient call active or on hold until the re-originated call is answered and then automatically disconnect this original call, and hold the original recipient call active or on hold until the re-originated call is answered and then conference bridge or otherwise connect the multiple calls together.

By way of further example, the subscriber can provide the phone number to which the new call is to be re-originated to. The subscriber configures or registers phone numbers with the call processing system via a web interface, a telephone user interface, a paper form, or otherwise. The phone numbers entered are optionally stored in call processing system memory and associated with the subscriber's account. In addition, "location data" can be further associated with phone numbers entered by the subscriber. This "location data" can be used to simplify the call transfer process for the subscriber. The location data can be associated with phone numbers by, for example, the subscriber calling the call processing system from a mobile phone with location capabilities and dialing through an IVR (Interactive Voice Response) system to select one of the pre-configured phone numbers to the call processing system with LBS (Location Based Services) capabilities. For example, LBS can be used to determine the geographical position of a cell phone or other terminal in a mobile network based on their cell identifier (ID). This information can then be translated into latitude and longitude information. In addition, triangulation of the mobile phone, performed using two or more cell towers, Assisted GPS, TDOA (time difference of arrival), EOTD (Enhanced Observed Time Difference), AFLT (Advanced Forward Link Trilateration), and/or other locator technologies, can be used to further refine the estimate of the cell phone location.

In addition or instead, the location data can be associated with phone numbers by the user selecting a pre-configured phone number from a list of numbers and then transmitting the selection over a data network to the call processing system (e.g., from a data application running on a mobile phone or by a user sitting at home on a broadband connection connected to a computer or other terminal, with their mobile phone nearby). The location of the pre-configured phone numbers is then known to the system. This enables the call processing system to (1) ease the interaction with the subscriber since the system would not have to prompt the subscriber as to which phone number calls should be re-originated to, (2) automatically call an alternative phone number when a user is near a particular location (3) automatically call an alternative number based on a condition such as, by way of example, a preconfigured schedule or if a subscriber's phone number is turned off, out-of-range, busy, or a ring-no-answer condition occurs (in the latter cases the call processing system could optionally re-originate calls to the last registered location).

Once a calling party's call has been transferred or re-originated, the caller or the called party can optionally transfer the call back to the original calling device or number at any time by pressing an appropriate key, such as the "4" key, providing an appropriate voice command, or otherwise.

As discussed above, the call processing system can process VoIP calls. One potential drawback to VoIP calls is that packets can be dropped or lost, or packet arrival can be delayed, which can have an adverse impact on the voice quality of the call. Optionally, the call processing system can continuously or periodically monitor a VoIP call, keep track of the number of lost packets within a predetermined time period, and/or keep track of packet latencies. If the number of lost packets within the period of time meets or exceeds a first specified threshold, or if the packet latency meets or exceeds a latency threshold stored in, and retrieved from, computer readable memory, the system optionally interrupts the call and prompts the caller to determine if the caller wants to transfer the caller inbound call from the caller and/or the outbound call to the called party to a circuit switched call or other call medium. If the called party responds affirmatively (via a key press, voice command, text command, or otherwise), the call processing system originates a new call using the specified method and/or network to one or both call participants and bridges the calls. This reconfigured call may optionally cause the caller and/or the called party the subscriber additional expense.

Further, an option to re-originate one or both calls on a circuit switched network can be offered as a user selected option, which can be triggered, for example, if the user dials the "5" key or other appropriate key.

Optionally, during a call between a caller and a called party, such as during the calls described above, the caller and/or called party can instruct the call processing system to conference-in a third party. This conferencing process can be performed using one or more of the methods described above and the call processing system can bridge and mix the three or more calls together. By way of example and not limitation: the called party or caller can enter or select the third party number via key presses, voice commands, or the like; the called party or caller can be voice or text prompted by the call processing system to enter or select the third party number; the third party number can be pre-specified by the caller and/or the called party, stored in a database or other data store hosted by the call processing system and/or a caller or called party client system, and then automatically retrieved by the call processing system in response to a caller and/or a called party instruction; or using other of the above described processes.

The call conferencing process can be invoked by way of example by the caller and/or called party dialing the "6" key or other selected key or voice command. One or more parties can optionally be integrated or conferenced into the call by repeated entries of the "6" or other appropriate key by a call participant, and then the selection and/or entry of other parties' phone numbers as similarly described above.

If a third party is unavailable, such as, for example if their phone line is busy, then the call processing system can optionally camp-on the line and add the third party when their line is freed up.

Further, embodiments can be used in conjunction with call waiting. As previously discussed, a caller can place a call via a calling terminal to a called party. The call may have been forwarded to the call processing system, or the call may have been placed by the caller to a virtual telephone line or a number associated with the called party, wherein when a call is placed to that number, the call is optionally connected to the call processing system. For example, the call processing system can place an outcall to a telephone terminal associated with the called party, and then bridge the inbound call from the caller and the outbound call to the called party. As previously described, the call processing system can constantly or periodically monitor calls being processed by the call processing system. If a new call comes in for a called party while the called party is already busy speaking to another caller on a call being processed by the call processing system, a call waiting message, tone or other prompt can be invoked. The new incoming call can optionally be screened by the called party while the called party is still listening to the original caller. The voice channel of the new call voice channel is mixed, but optionally at a lower volume, with the current call. The subscriber can then provide a command, such as by pressing the "7" or other appropriate key, to switch between calls, or the call can provide another command, such as by pressing the "8" or other appropriate key, to join the two calls to the called party together in a conference call.

Optionally, because the call processing system can continuously monitor the call, if the call processing system detects the inbound call has terminated before the outbound call to the called party has terminated, the call processing system can prompt the called party for auto-callback instructions. For example, the call processing system can offer to automatically reconnect to the called party in response to a confirming key press or voice command.

In another embodiment, a called party can instruct the call processing system to record a call while the call is in progress. As similarly discussed above, the call processing system can constantly or periodically monitor a call being processed by the call processing system. For example, during a call, the caller or called party can optionally press a "9" key or other designated key, and in response, the call processing system will record the call, including the voice communication between the caller and the called party. Once the call is completed, the recording can be sent to the subscriber (caller and/or called party) as a voice attachment to an email message; into a client application, such as client application 1116, executing on their computer system, such as personal computer or networked television; and/or optionally, the recorded call can be sent to a message store and the caller and/or called party, if so authorized, can call the call processing system to retrieve the recording as a voice message.

Optionally, the call processing system may only respond to commands (such as those relating to initiating a call re-origination, call conferencing, call recording, and so on) from a subscriber or other authorized person participating in the call. For example, the call processing system may determine if a caller is a subscriber by reading the Caller ID signaling information associated with the caller's call, and determining if the Caller ID information matches or corresponds to a phone number a subscriber stored in a database, such as the IAM database subsystem 1136 illustrated in FIG. 16. The call processing system can determine that the called party is a subscriber using a variety of techniques. If the caller's call was placed to a virtual number assigned to a subscriber, then the call processing system assumes that the call was intended for the subscriber. If the call was forwarded as a result of, for example, a call forwarding on busy, a call forwarding on ring-no-answer, or call-forward-all calls condition, then the number from which the call was forwarded can be used as a search key or index into the database to determine if number matches a subscriber's number, and that the call was forwarded from a subscriber line and is intended for the subscriber.

Other optional techniques for determining if a call participant is a subscriber include accessing a cookie or cookie-type file stored on a call participant smart phone or other communication terminal, and based on the information in the cookie or file, determining if the call participant is a subscriber. By way of further example, call participants can optionally be requested to enter a user identifier and/or password to authenticate the participant as a subscriber.

Figure 24:
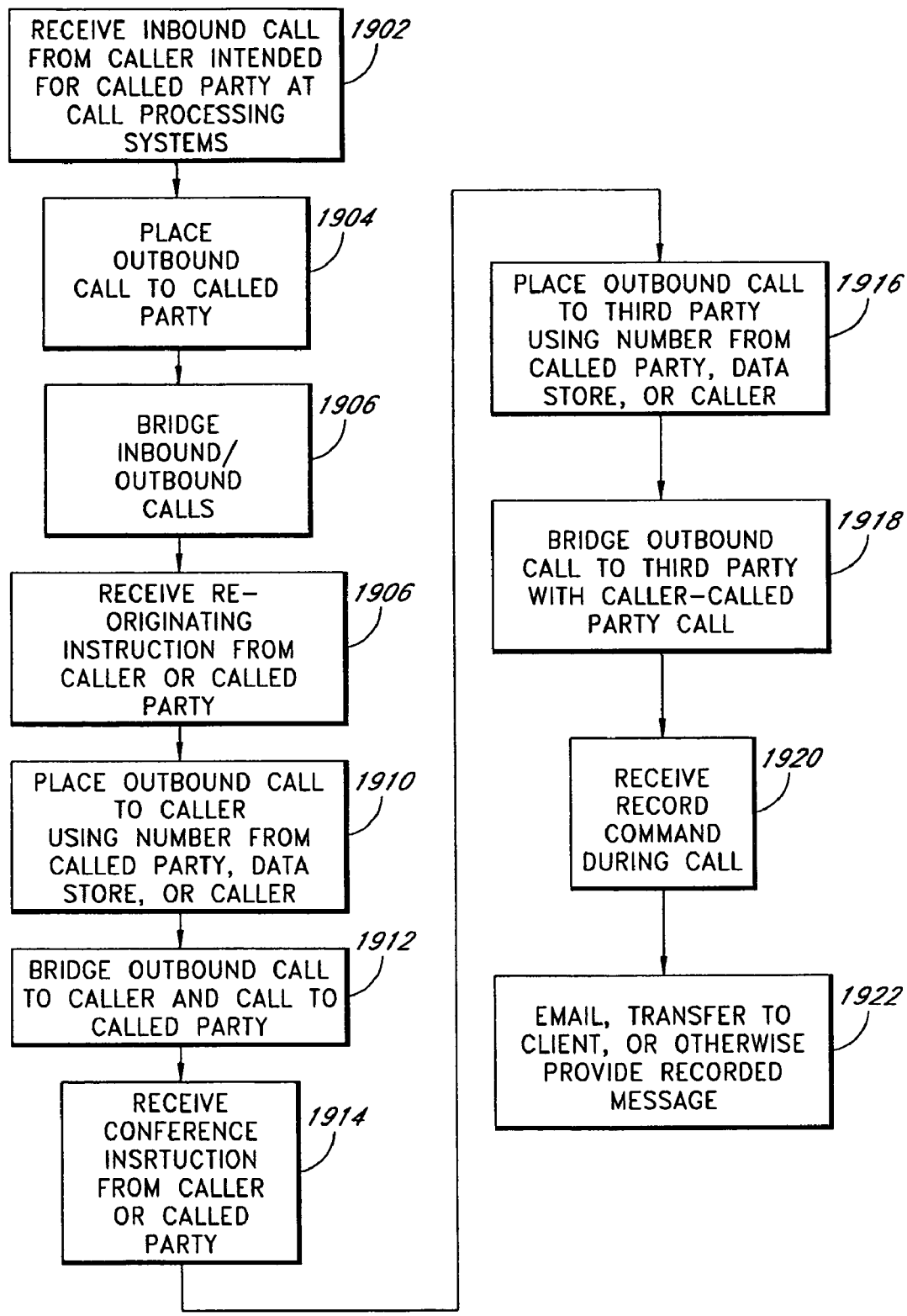
FIG. 24 illustrates another call process.

FIG. 9 illustrates an example call process. Not all states need to be reached, and the states do not necessarily need to be performed in the same order as that illustrated. In addition, certain state processes do not need to be performed serially, and two or more states processes can be performed in parallel. The call process can include additional states as well. With reference to FIG. 24, at state 2402, the call processing system receives an inbound call from a caller intended for a called party. At state 2404, an outbound call is placed by the call processing system to a communications terminal or line associated with the called party. At state 2406, the inbound and outbound calls are bridged or otherwise connected. At state 2408, the call processing system monitors the bridged call and detects when the called party or caller (as authorized) provides a re-originating instruction.

At state 2410, an outbound call is placed to the number associated with the re-origination instruction. By way of example and not limitation, the called party or caller can enter or select the number via key presses, voice commands, or the like; the called party or caller can be voice or text prompted by the call processing system to enter or select the number; the number can be pre-specified by the caller and/or the called party, stored in a database or other data store, and then automatically retrieved by the call processing system in response to a caller and/or a called party instruction; and so on. At state 2412, the outbound call to the new caller number is bridged with the existing (or a new) outbound call to the called party.

Optionally, at state 2414, the caller or called party provide an instruction to conference in one or more third parties via a key press, voice instruction, or otherwise. At state 2416, the call processing system places an outbound call to a number associated with the third party. By way of example, the called party or caller can enter or select the third party number via key presses, voice commands, or the like; the called party or caller can be voice or text prompted by the call processing system to enter or select the third party number; the third party number can be pre-specified by the caller and/or the called party, stored in a database, and then automatically retrieved by the call processing system in response to a caller and/or a called party instruction; or otherwise. At state 2418, the outbound call to the third party is bridged to the call between the caller and the called party. At state 2420, a call record command from one or more of the call participants (as authorized) is detected and received by the call processing system. At state 2422, the call processing system records the call between the caller, the called party, and/or the third party. Once the call is completed, the recording can be sent to one or more of the call participants as a voice attachment to an email message; via a client application executing on a call participant computer system; and/or sent to a message store for later retrieval. Further, the processes illustrated in FIGS. 22 and 23 can be performed in conjunction with the process illustrated in FIG. 24. For example, the called party can transfer the inbound call to another phone associated with the called party.

Figure 25A:
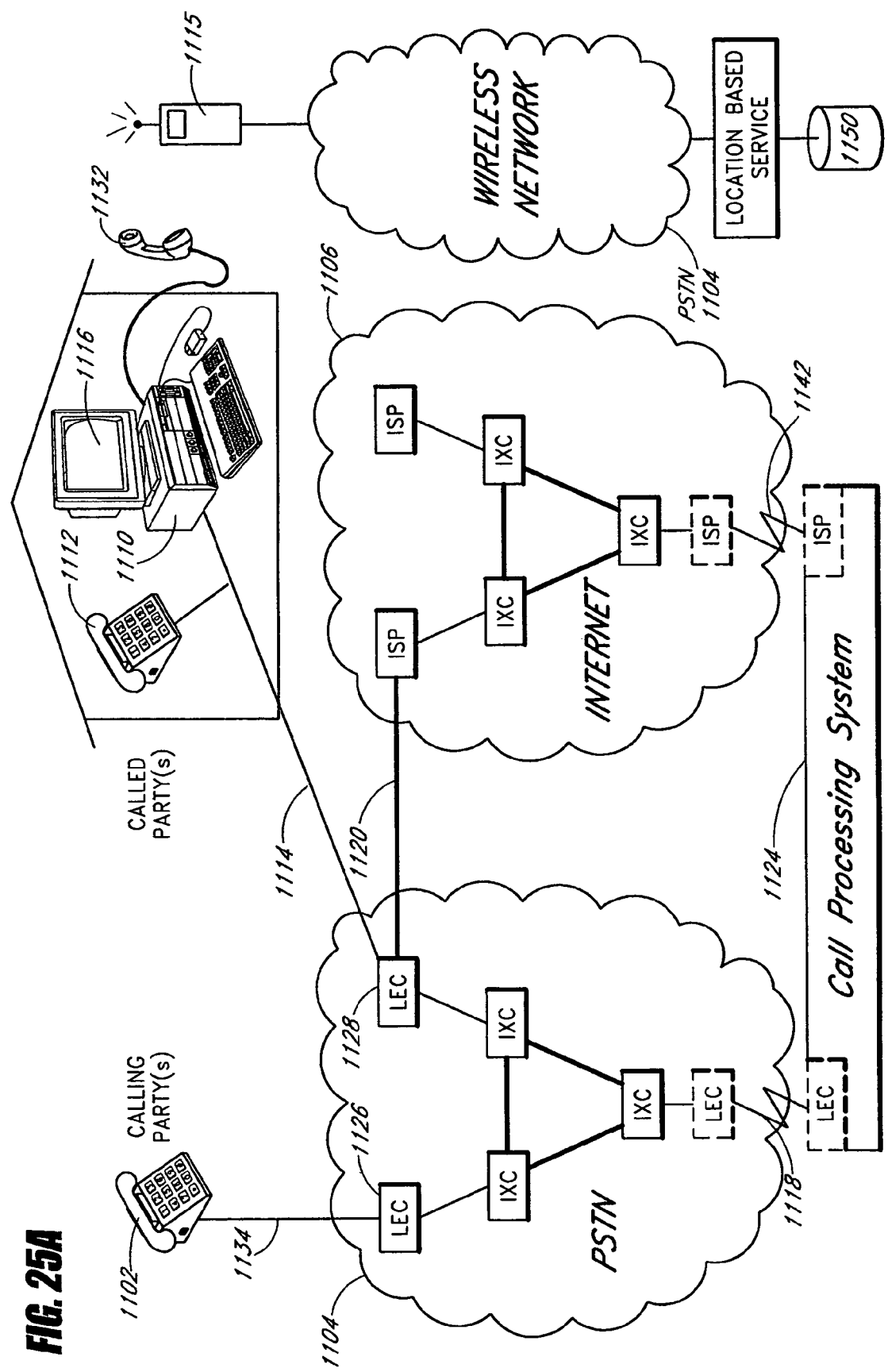
FIGS. 25A-B illustrate another call process exemplifying the use of Location Based Services.
Figure 25B:
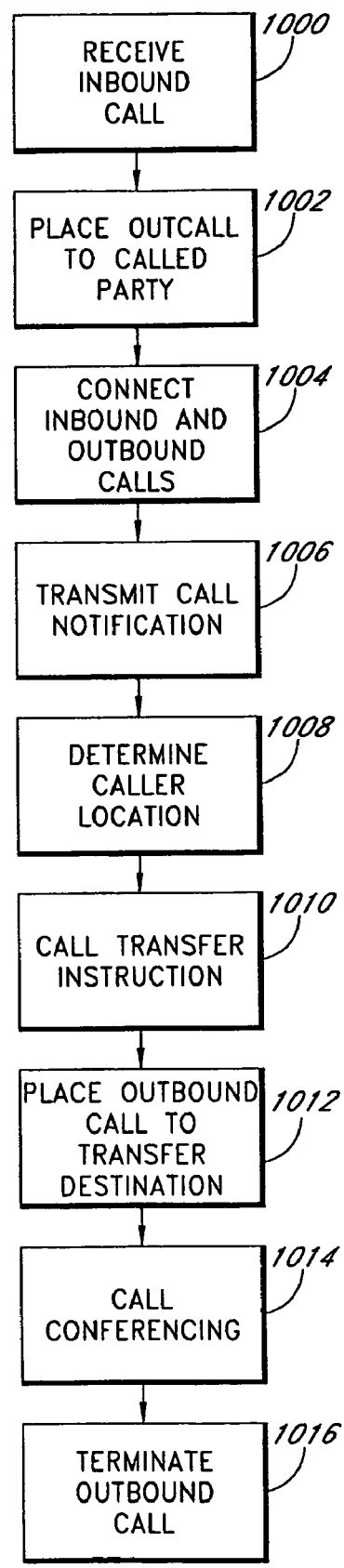

An example call transfer process will be described using Location Based Services, call screening to a mobile device, and transfer to a home number. With reference to FIGS. 25A-B, at state 1000, a call is received at a Call Processing System 1124 from a calling party 1102 over phone line 1134, PSTN 1104, and trunk lines 1118. The call from 1102 may have been redirected from a busy line 1114 or may have been directed to a virtual phone number assigned to the subscriber which terminates directly on the Call Processing System 1124. At state 1002A, after receiving the inbound call, the Call Processing System 1124 places an outcall using Call Manager 1108 over PSTN trunks 1118, to a mobile device 115 associated with the called party. The outgoing call to the called party's mobile device can optionally include the calling party's 1112 Caller ID, the Call Processing System's Caller ID 1124, or even the called party's personal or virtual telephone number as the Caller ID. Upon answer of the outbound call to the mobile device 115, the Call Processing System 1124 can optionally announce the call and can play a prompt to the called party instructing the caller with on how to take the call, transfer the call, conference the call and then bridges the inbound call with the outbound call at state 1004A. The talk path to the called party is muted to allow the called party to screen the call without the caller's knowledge of the screening process.

At state 1006A, if the called party is online, the Call Processing System sends a call notification including but not limited to one or more of the Caller's phone number, name, city, state, or calling device (e.g., cell phone). At state 1008A, the Call Processing System 1124 determines called party's location using Mobile Location Based Services 150 and then matches the location with a phone number from a preconfigured subscriber list stored in the Call Processing System's data base or file store 1136 or Client storage Personal Computer 1110. At state 1010A, the subscriber decides to transfer the call to a phone number 1112 to save costs and/or improve the quality of the call, by way of example. Because the system utilizes LBS to determine where to direct the call, the subscriber did not have to choose from a list where to direct the call or enter a destination phone number. At state 1012A, the Call Processing System 1124 makes a new outbound call from Call Manager 1108 using voice trunks 1118 to phone 1112. At state 1014A, upon answer of phone 112, Call Processing System 1124 conferences inbound call over line 1134 with outbound call to mobile device 115 with outbound call over 1114 to phone 1112. At State 1016A, the outbound call to mobile device 115 is terminated when called party 115 hangs-up or otherwise ends the call.

By way of further illustration, in one example embodiment the call processing system receives an inbound call from a calling party intended for a called party. The call processing system determines if a certain condition has occurred or exists. By way of example, and not limitation, the condition, can relate to the inability to connect to the called party's mobile phone device via a voice channel or to the phone general inaccessibility. By way of further illustration, the condition can be:

the mobile device being out of range;
the mobile device being busy;
the mobile device being turned off;
a ring-no-answer condition occurring on the mobile device;
a do-not-disturb condition occurring on the mobile device/line;
a specified/preconfigured (e.g., specified by the called party) scheduled event occurring (e.g., time and/or day);

The call processing system then determines the called party's location via a location based service, such as described above, associated with the called party's mobile device. Based at least in part on the mobile device location, the call processing system selects a phone number stored in computer readable memory (e.g., in a database record associated with the called party). The call processing system then causes the calling party to be connected to a communication device associated with the selected phone number. For example, the call processing system can originate an outbound call to the communication device and bridge or otherwise connect the outbound call with the calling party's call.

Figure 26:
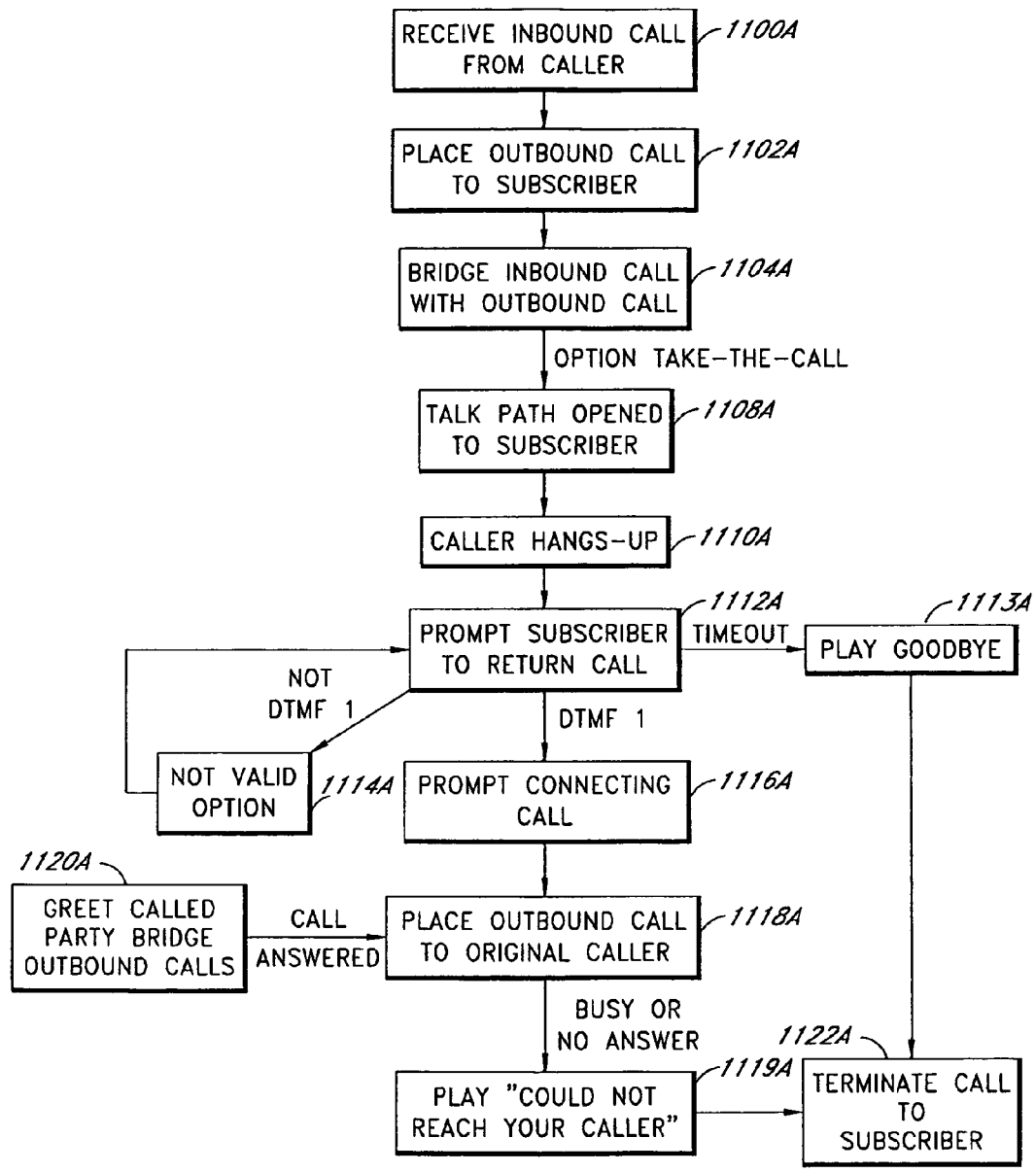
FIG. 26 illustrates an example call transfer process using auto-callback.

An example call transfer process will be described using auto-callback. At state 1100A of FIG. 26, a call intended for a called party, such as a subscriber or other user, is received at a Call Processing System 1124 from a calling party station 1102 over phone line 1134, PSTN 1104, and trunk lines 1118. The call from station 1102 may have been redirected from a busy line 1114 or may have been directed to a virtual phone number assigned to the subscriber which terminates directly on the Call Processing System 1124. At state 11102A, after receiving the inbound call, the Call Processing System 1124 places an outcall using Call Manager 1108 over PSTN trunks 1118, to a mobile device 115 associated with the called party. The outgoing call to the called party's mobile device can optionally include the calling party's 1112 Caller ID, the Call Processing System's Caller ID 1124, and/or the called party's personal or virtual telephone number as the Caller ID.

At state 11104A, upon answer of the outbound call to the mobile device 115, the Call Processing System 1124 can optionally announce the call and can play a prompt to the called party instructing the caller with on how to take the call, transfer the call, and/or conference the call, and then bridges the inbound call with the outbound call. The talk path to the called party is optionally muted during this state to allow the called party to screen the call without the caller's knowledge of the screening process. At state 11108A, the subscriber selects an option to take the call. The Call Processing System 1124 opens the talk path over the connection to the mobile device 115 and the conversation between the caller and called party begins.

In this example, at state 1110A, the subscriber decides s/he would like to call the called party back (e.g., so the caller does not have to pay for the call). The subscriber asks the caller to hang-up phone station 1102 or to otherwise terminate the call, which results in the tearing down of the inbound call from the caller station 1102 over line 1134 to Call Processing System 1124. At state 1112A, the Call Processing System 1124 detects the caller call termination, such as the hang-up of station 1102, and substantially immediately prompts subscriber if s/he would like to return this call by pressing the 1 key. If the subscriber does not respond within a predetermined time period, such as 5 seconds, the process proceeds from state 1112A to state 1113A and the Call Processing System plays a "Goodbye" voice prompt and at state 1122A tears down the call to the subscriber station 115. If the subscriber presses an improper key (e.g. a key other than the 1 key), the process proceeds from state 1112A to 1114A, at which the determination is made that an improper key was pressed, a prompt is played so informing the subscriber ("Sorry, that is not a valid option"). The process returns from state 1114A to state 1112A, where the prompt regarding returning the call is replayed.

If the subscriber presses the 1 key (providing a DTMF 1) at state 1112A, indicating that the call is to be returned, the process proceeds to state 1116 and the Call Processing System plays a "connecting" voice prompt to the subscriber and transitions to State 1118A where a new outbound call from Call Manager 1108, using voice trunks 1118, to station 1102 is made.

Upon answer of the phone station 1102 at state 1120A, the Call Processing System 1124 plays a greeting voice prompt and conferences outbound call over line 1134 with outbound call to mobile device 115. When the parties finish their conversation and hang-up or otherwise provide a termination indication, calls are terminated and the process proceeds to state 1122A. (Note: if original party 1102 terminates his/her call before the subscriber, the Call Processing System 1124 will optionally again prompt the subscriber to return the call and/or call another party.)

If there is no answer at state 1118, then the process proceeds to state 1119A and the Call Processing System 1124 plays a notification, such as an "I'm Sorry, we could not reach your caller" voice prompt, and the process proceeds to state 1122A where the outbound call to the subscriber 115 is terminated.

It should be understood that certain variations and modifications of this invention would suggest themselves to one of ordinary skill in the art. The scope of the present invention is not to be limited by the illustrations or the foregoing descriptions thereof.

What is claimed is:

1. A method of providing a called party the ability to screen calls, the method comprising:

receiving, at a call processing system, a call from a calling party intended for a called party;

playing a greeting to the calling party;

placing an outbound call from the call processing system to a first phone address associated with the called party;

transmitting, in substantially real-time, at least a first portion of the voice communication from the calling party to a first communication device associated with the first phone address so that the called party can screen the call;

providing at least the following call handling options to the called party:

accept the call on the first communication device;

transfer the call to a first alternate destination, with screening, wherein at least one portion of the voice communication from the calling party will be transmitted to the first alternate destination and the calling party will be prevented from hearing the called party for at least a first amount of time;

transfer the call to a second alternate destination with screening;

receiving a call handling instruction from the called party via the first communication device; and processing the call from the caller in accordance with called party's instruction.

2. The method as defined in claim 1, wherein the first alternate destination is a home phone associated with the called party and the second alternate destination is a work phone associated with the called party.

3. The method as defined in claim 1, further comprising providing the called party with an option to have the call processing system transfer the call to the first alternate destination, without screening.

4. The method as defined in claim 1, further comprising providing the called party with an option to have the call processing system record a message from the calling party.

5. The method as defined in claim 1, further comprising providing the called party with an option to have a call refusal message provided to the calling party.

6. The method as defined in claim 1, wherein the first communication device is a wireless phone.

7. The method as defined in claim 1, wherein the first communication device is a POTs phone.

8. The method as defined in claim 1, wherein the first communication device is an Internet Protocol phone.

9. The method as defined in claim 1, wherein the first alternate device is a wireless phone.

10. The method as defined in claim 1, wherein the first alternate device is a POTs phone.

11. The method as defined in claim 1, wherein the first alternate device is an Internet Protocol phone.

12. The method as defined in claim 1, wherein the called party selects one of the call handling options via a key pad key.

13. The method as defined in claim 1, wherein the call handling options are provided while the outbound call is in progress.

14. The method as defined in claim 1, wherein the call handling options are audibly provided to the called party.

15. The method as defined in claim 1, wherein the call handling options are visibly displayed to the called party.

16. The method as defined in claim 1, wherein the call handling options provided by the call processing system are selected by the call processing systems so as not to include the first communication device as the first or second alternate destinations.

17. The method as defined in claim 1, further comprising determining, based on an instruction, whether the call is to be transferred to at least one alternate destination with supervision, wherein the call processing system maintains the outbound call to the first communication device until the at least one alternate destination is answered, or without supervision, wherein the call processing system terminates the outbound call to the first communication device after receiving the call handling instruction from the called party and before the call processing system completes the outbound call to the at least one alternate destination.

18. The method as defined in claim 1, further comprising transferring the call to the first alternate destination, wherein the call processing system maintains the outbound call to the first communication device until the first alternate destination is answered.

19. A method of providing a called party the ability to screen calls, the method comprising:
   receiving, at a call processing system, a call from a calling party intended for a called party;
   placing an outbound call from the call processing system to a first phone address associated with the called party;
   transmitting, in substantially real-time, at least a portion of a voice communication from the calling party to a first communication device associated with the first phone address so that the called party can screen the call;
   providing at least the following call handling options to the called party:
      accept the call on the first communication device;
      transfer the call to a first alternate destination;
   receiving a call handling instruction from the called party via the first communication device; and
   processing the call from the caller in accordance with called party's instruction.

20. The method as defined in claim 19, further comprising providing the user the option to transfer the call with screening.

21. The method as defined in claim 19, further comprising providing the user the option to transfer the call without screening.

22. The method as defined in claim 19, wherein the first alternate destination is a home phone associated with the called party.

23. The method as defined in claim 19, further comprising providing the called party with an option to transfer the call to a second alternate destination.

24. The method as defined in claim 19, wherein the first alternate destination is associated with a phone number assigned by the call processing system to the called party.

25. The method as defined in claim 19, wherein the first alternate destination is associated with a virtual phone number.

26. The method as defined in claim 19, wherein the first alternate destination is a work phone associated with the called party.

27. The method as defined in claim 19, further comprising providing the called party with an option to have the call processing system record a message from the calling party.

28. The method as defined in claim 19, further comprising providing the called party with an option to have a call refusal message provided to the calling party.

29. The method as defined in claim 19, wherein the first communication device is a wireless phone.

30. The method as defined in claim 19, wherein the first communication device is a POTs phone.

31. The method as defined in claim 19, wherein the first communication device is an Internet Protocol phone.

32. The method as defined in claim 19, wherein the first alternate device is a wireless phone.

33. The method as defined in claim 19, wherein the first alternate device is a POTs phone.

34. The method as defined in claim 19, wherein the first alternate device is an Internet Protocol phone.

35. The method as defined in claim 19, wherein the called party selects one of the call handling options via a key pad key.

36. The method as defined in claim 19, wherein the call handling options are provided while the outbound call is in progress.

37. The method as defined in claim 19, wherein the call handling options are audibly provided to the called party.

38. The method as defined in claim 19, wherein the call handling options are visibly displayed to the called party.

39. The method as defined in claim 19, wherein the call handling options provided by the call processing system are selected by the call processing systems so as not to include the first communication device as the first alternate destination.

40. The method as defined in claim 19, further comprising receiving an indication from the called party as to whether the call is to be transferred to at least one alternate destination with supervision, wherein the call processing system maintains the call to the first communication device until the at least one alternate destination is answered, or without supervision, wherein the call processing system terminates the call to the first communication device after receiving the call handling instruction from the called party and before the at least one alternate destination is answered.

41. The method as defined in claim 19, further comprising transferring the call to the first alternate destination, wherein the call processing system maintains the call to the first communication device until the first alternate destination is answered.

42. The method as defined in claim 19, wherein a time duration between the call processing system receiving the call intended for the called party and answering the call is programmable.

43. The method as defined in claim 19, wherein the call intended for the called party is answered after a programmable number of rings.

44. The method as defined in claim 19, wherein the call is terminated by the call processing system after a predetermined amount of time.

45. The method as defined in claim 19 wherein the call is terminated after an amount of time selected, based at least in part, on a transport type used to connect the call to the called party.

46. The method as defined in claim 19, wherein a list of received calls and/or messages are transmitted to the called party.

47. The method as defined in claim 19, wherein the phone address is an E.164 telephone number.

48. A method of providing a called party the ability to screen calls, the method comprising:
   receiving, at a call processing system, a call from a calling party intended for a called party;
   placing an outbound call from the call processing system to a first phone address associated with the called party;
   transmitting, in substantially real-time, at least a portion of a voice communication from the calling party to a first communication device associated with the first phone address so that the called party can screen the call;
   providing at least the following call handling options to the called party:
      transfer the call to a first alternate destination, with supervision, wherein the call processing system maintains the call to the first communication device until the at least one alternate destination is answered;

transfer the call to the first alternate destination, without supervision, wherein the call processing system terminates the call to the first communication device after receiving the call handling instruction from the called party and before the at least one alternate destination is answered;

receiving a call handling instruction from the called party via the first communication device; and, processing the call from the caller in accordance with called party's instruction.

49. The method as defined in claim 48, wherein the first alternate destination is a home phone or work phone associated with the called party, and the communication device is a mobile phone.

50. The method as defined in claim 48, further comprising providing the called party with an option to have the call processing system record a message from the calling party.

51. The method as defined in claim 48, further comprising providing the called party with an option to have a call refusal message provided to the calling party.

52. The method as defined in claim 48, wherein the first communication device is a wireless phone.

53. The method as defined in claim 48, wherein the first communication device is a POTs phone.

54. The method as defined in claim 48, wherein the first communication device is an Internet Protocol phone.

55. The method as defined in claim 48, wherein the first alternate device is a wireless phone.

56. The method as defined in claim 48, wherein the first alternate device is a POTs phone.

57. The method as defined in claim 48, wherein the first alternate device is an Internet Protocol phone.

58. The method as defined in claim 48, wherein the called party selects one of the call handling options via a key pad key.

59. The method as defined in claim 48, wherein the call handling options are audibly provided to the called party.

60. The method as defined in claim 48, wherein the call handling options are visibly displayed to the called party.

* * * * *

UNITED STATES PATENT AND TRADEMARK OFFICE
CERTIFICATE OF CORRECTION

PATENT NO.        : 7,555,110 B2
APPLICATION NO.   : 11/294682
DATED             : June 30, 2009
INVENTOR(S)       : Robert A. Dolan et al.

It is certified that error appears in the above-identified patent and that said Letters Patent is hereby corrected as shown below:

On Sheet 1 of 28, Figure 1, reference numeral 20, line 1, Change "2ND" to --1ST--.

On Sheet 7 of 28, Figure 8, box 66, line 2, Change "FOM" to --FROM--.

On Sheet 12 of 28, Figure 13, box 92, line 3, Change "OFR" to --OR--.

On column 6, line 29, Change "and or" to --and/or--.

On column 9, line 49, Change "Network" to --Telephone Network--.

On column 28, line 41, Change "State 15." to --State 5.--.

On column 28, line 55, Change ""1"." to --"1".--.

On column 31, line 7, Change "conFIG.the" to --config. the--.

On column 31, line 18, Change "conFIG.the" to --config. the--.

On column 33, line 54, Change "OutcallTui" to --OutcallTUI--.

On column 33, line 57, Change "SecondsRemining" to --SecondsRemaining--.

On column 34, line 14, After "transferred" insert --.--.

On column 34, line 33, Change "is be" to --is being--.

On column 36, line 26, Change "SecondsRemining" to --SecondsRemaining--.

On column 37, line 55, Change "conFIG." to --config.--.

On column 40, line 22, Change "a per" to --as per--.

UNITED STATES PATENT AND TRADEMARK OFFICE
CERTIFICATE OF CORRECTION

PATENT NO.         : 7,555,110 B2
APPLICATION NO.    : 11/294682
DATED              : June 30, 2009
INVENTOR(S)        : Robert A. Dolan et al.

It is certified that error appears in the above-identified patent and that said Letters Patent is hereby corrected as shown below:

On column 44, lines 24-25, Change "(time difference of arrival)," to --(Time Difference Of Arrival),--.

Signed and Sealed this

Twenty-ninth Day of December, 2009

David J. Kappos
*Director of the United States Patent and Trademark Office*